(12) United States Patent
Reiners et al.

(10) Patent No.: US 7,685,037 B2
(45) Date of Patent: Mar. 23, 2010

(54) TRANSACTION AUTHORISATION SYSTEM

(75) Inventors: Wolfram Johannes Bernd Reiners, Wangen (DE); David Bruce Burstein, Cape Town (ZA); Christeffel Paul Nel, Durham (ZA)

(73) Assignee: 3MFuture Ltd., Mahé (SC)

( * ) Notice: Subject to any disclaimer, the term of this patent is extended or adjusted under 35 U.S.C. 154(b) by 1171 days.

(21) Appl. No.: 10/473,018

(22) PCT Filed: Mar. 25, 2002

(86) PCT No.: PCT/IB02/00881

§ 371 (c)(1),
(2), (4) Date: Sep. 25, 2003

(87) PCT Pub. No.: WO02/077745

PCT Pub. Date: Oct. 3, 2002

(65) Prior Publication Data

US 2004/0148259 A1    Jul. 29, 2004

(30) Foreign Application Priority Data

Mar. 26, 2001    (ZA) .................................. 2001/2461

(51) Int. Cl.
G06Q 40/00    (2006.01)
(52) U.S. Cl. .............................. 705/35; 705/38; 705/39
(58) Field of Classification Search .................. 705/35, 705/38, 40, 39
See application file for complete search history.

(56) References Cited

U.S. PATENT DOCUMENTS

| 6,216,115 | B1 | 4/2001 | Barrameda et al. |
| 6,996,542 | B1 * | 2/2006 | Landry ........................ 705/40 |
| 7,020,639 | B1 * | 3/2006 | Slater .......................... 705/75 |
| 2001/0051902 | A1 | 12/2001 | Messner |

OTHER PUBLICATIONS

Customer Service Issue Arises In B-to-B Banks are looking to a new type of vendor that offers online customer service software for their business customers. Amy K. Spees. Bank Technology News. New York: Dec. 2000. vol. 13, Iss. 12; p. 60.*

BankDirect Launches New Online Service; Customers Now Able to Check New Account Status Instantly PR Newswire. New York: Jul. 18, 2000. p. 1.*

* cited by examiner

*Primary Examiner*—Lalita M Hamilton
(74) *Attorney, Agent, or Firm*—Perkins Coie LLP

(57) ABSTRACT

A transaction authorization system (200) includes a client terminal (20) in the form of a computer (22) running a network browser. The computer (22) is connected to the internet (24). The system (200) also includes an account administration server (26) which is connected to the internet (24) and which hosts a web server which may be accessed by the network browser running on the computer (22). The system (200) further includes an account database (30) which stores a record of the status (i.e. disabled or enabled) of an electronic on line bank account. The system (200) is configured to enable a user, via the computer (22), to set the status of the account in the database (30). When a transaction request is issued to a merchant (201) the authorizing institution is able to interrogate the database (30) to determine the status of the account and thereby to authorize or decline the transaction.

26 Claims, 55 Drawing Sheets

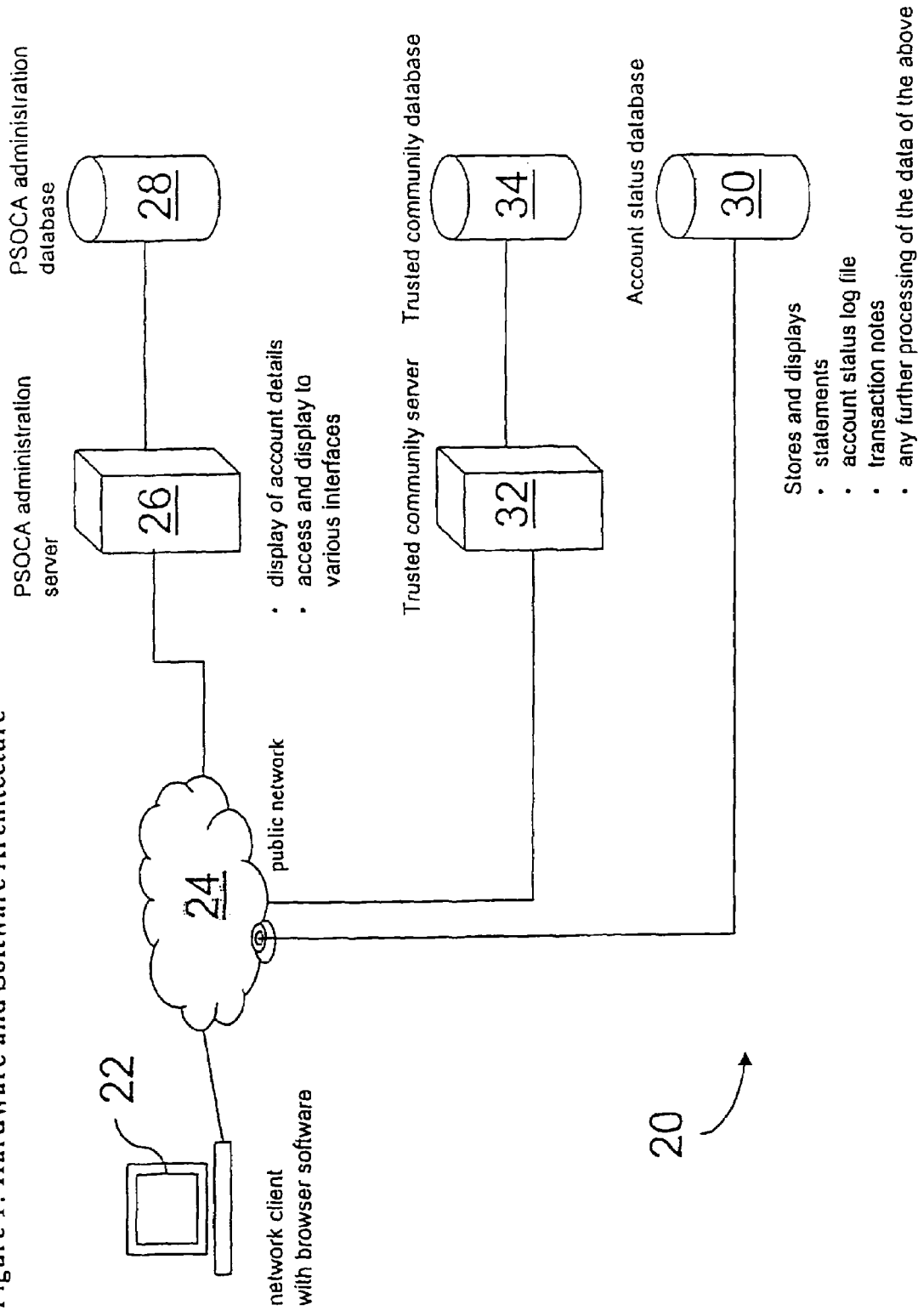
Figure 1: Hardware and Software Architecture

Figure 2: Process Overview

Name of processes:

36 – security through authentication (PSOCA stand alone)
38 – security through authentication by a trusted community (PSOCA part of product portfolio)
40 – PSOCA activation and display
46 – user processes transaction by using data on PSOCA
48 – security through additional authorisation (in real time)
44 – PSOCA deactivation
42 – queries on account status log file to resolve disputes (historic)

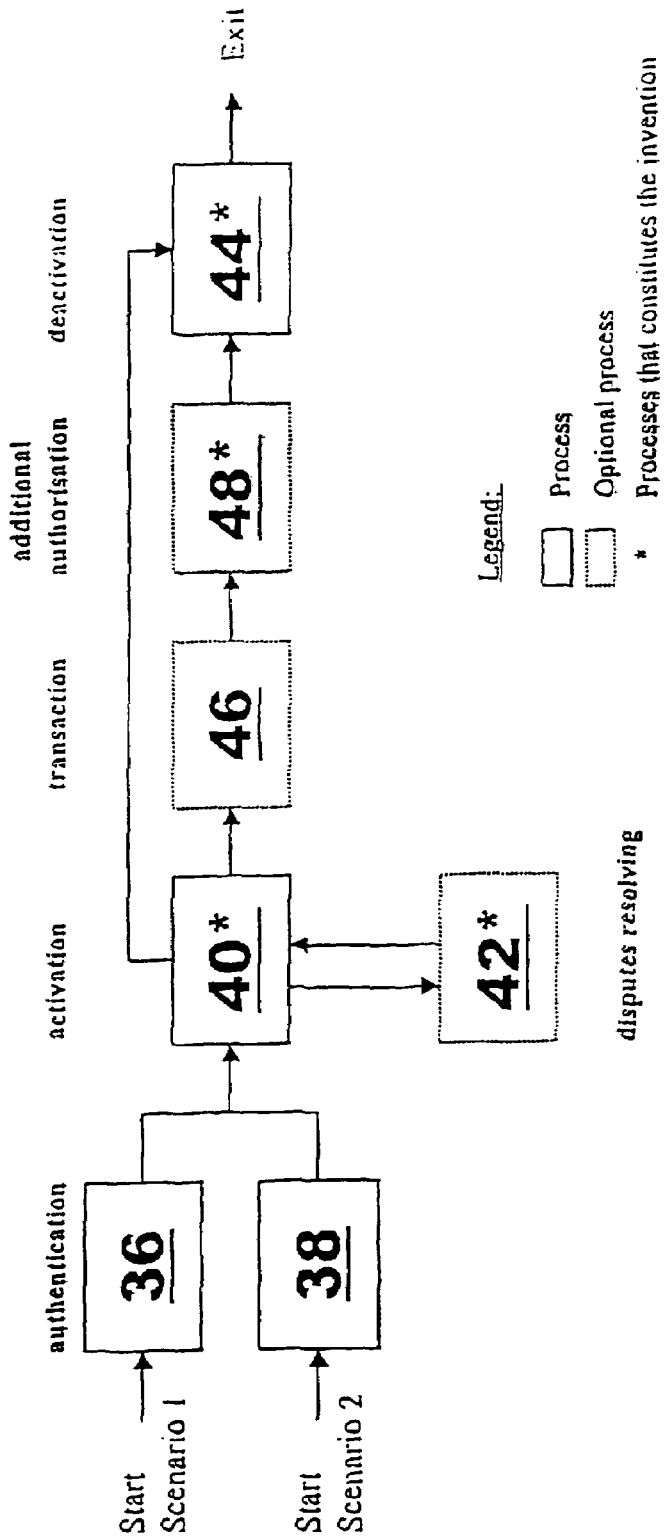

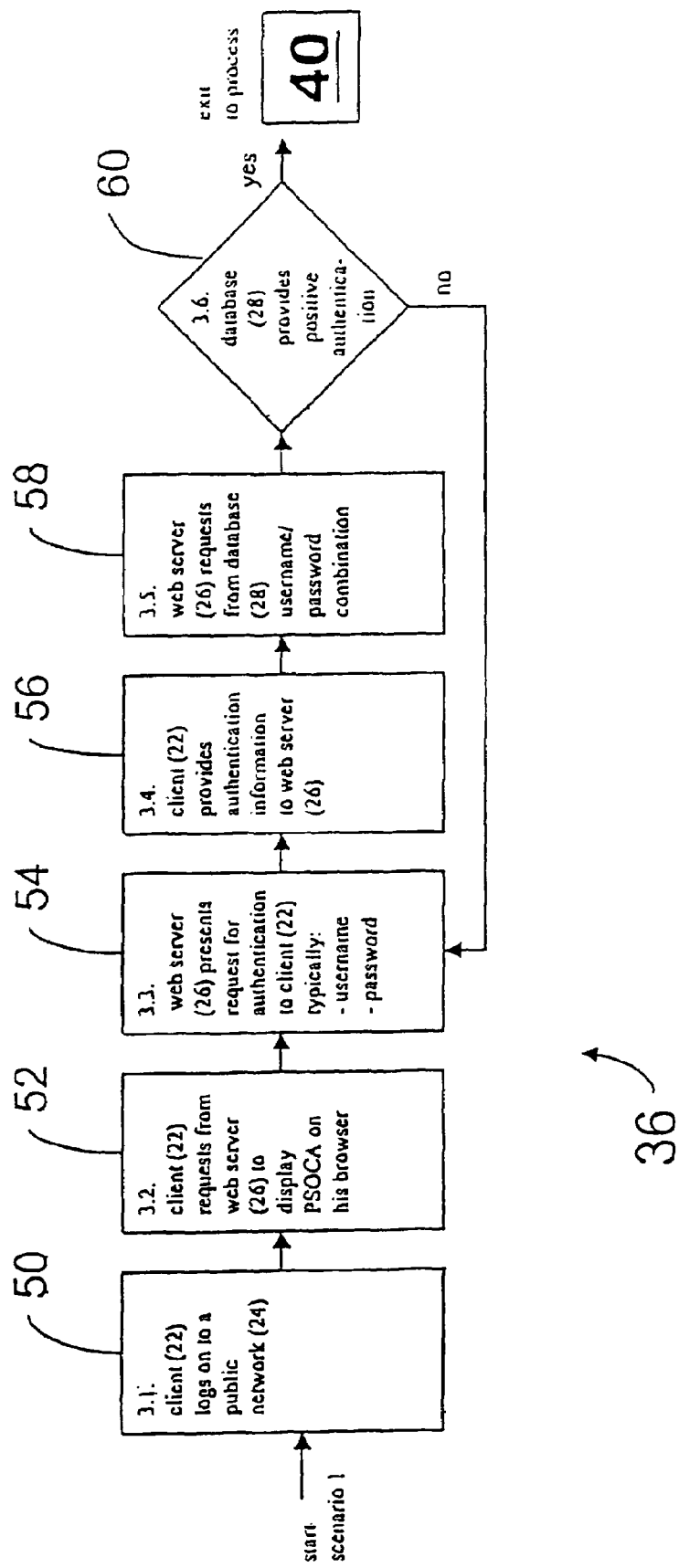
Figure 3: A - security through authentication (PSOCA stand alone)

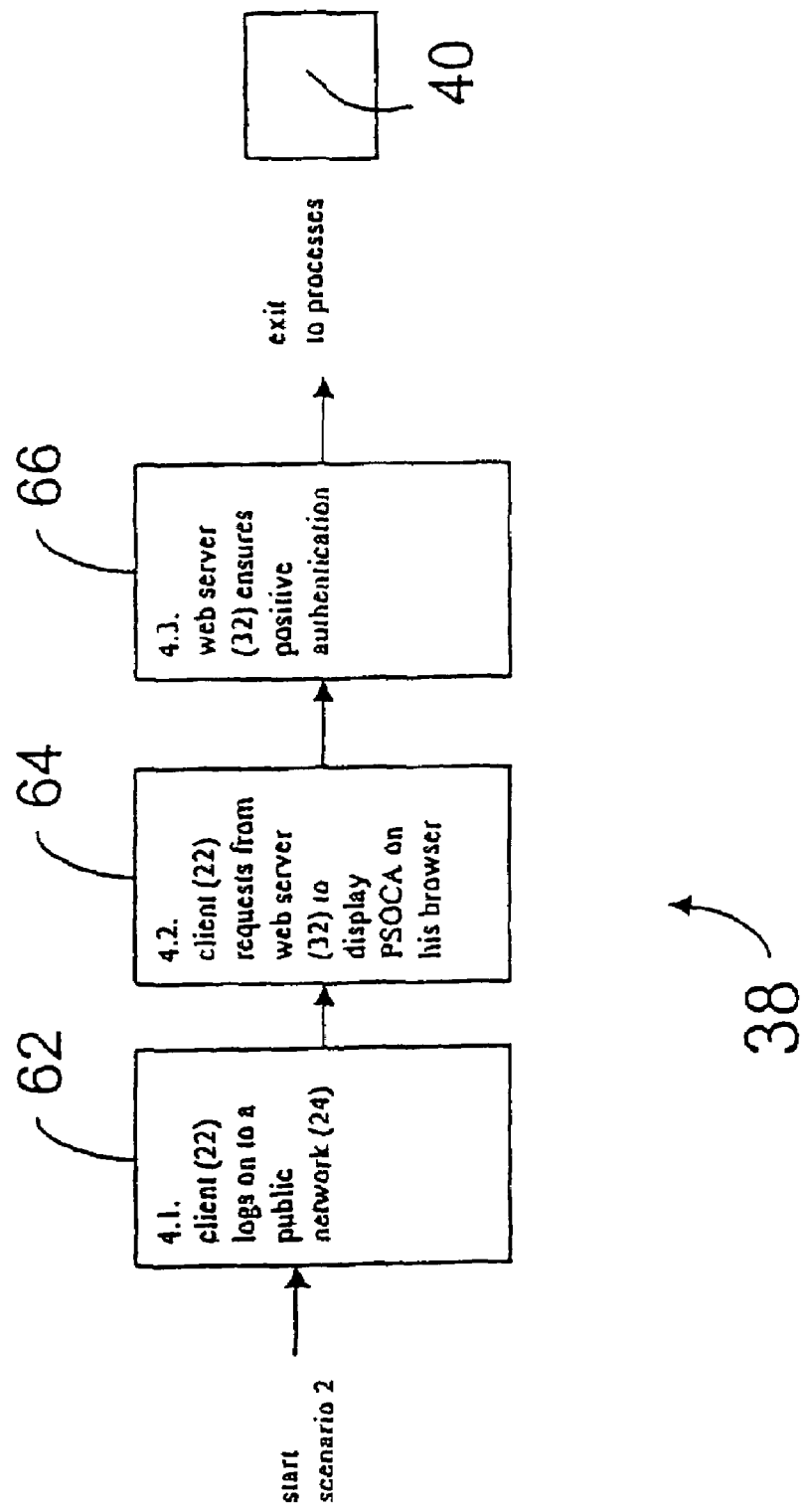

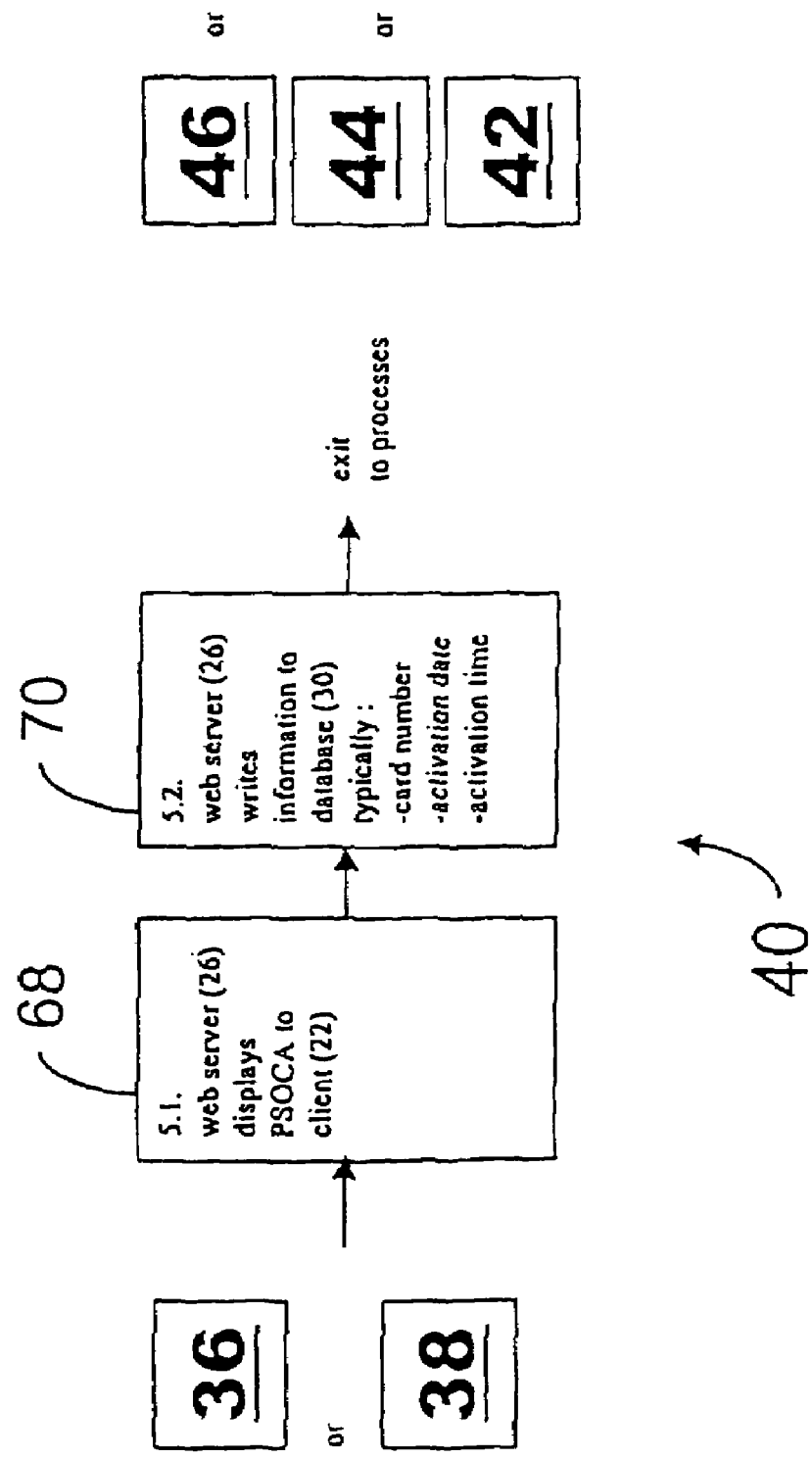
Figure 5: PSOCA activation and display

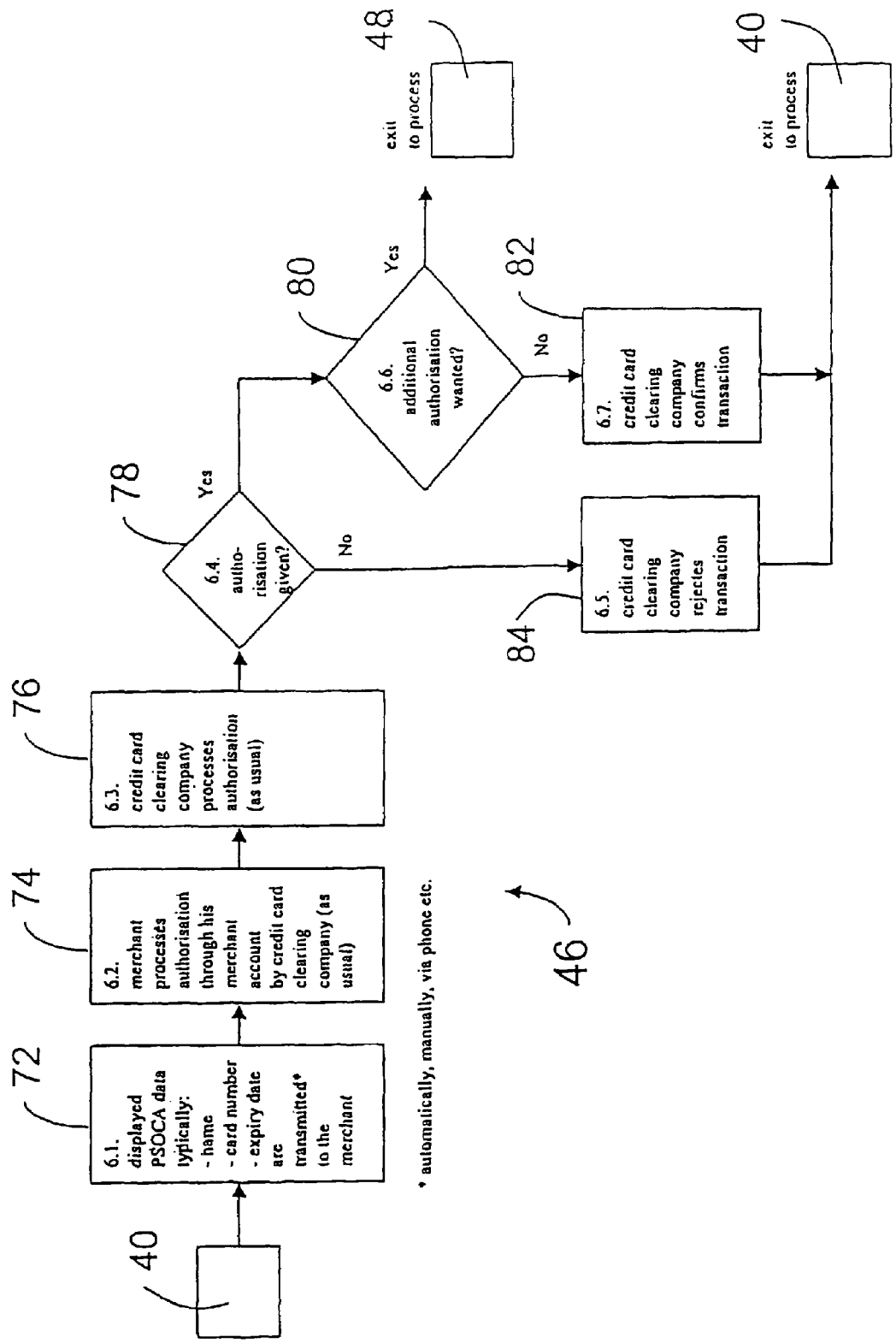
Figure 6: user processes transaction by using data on PSOCA

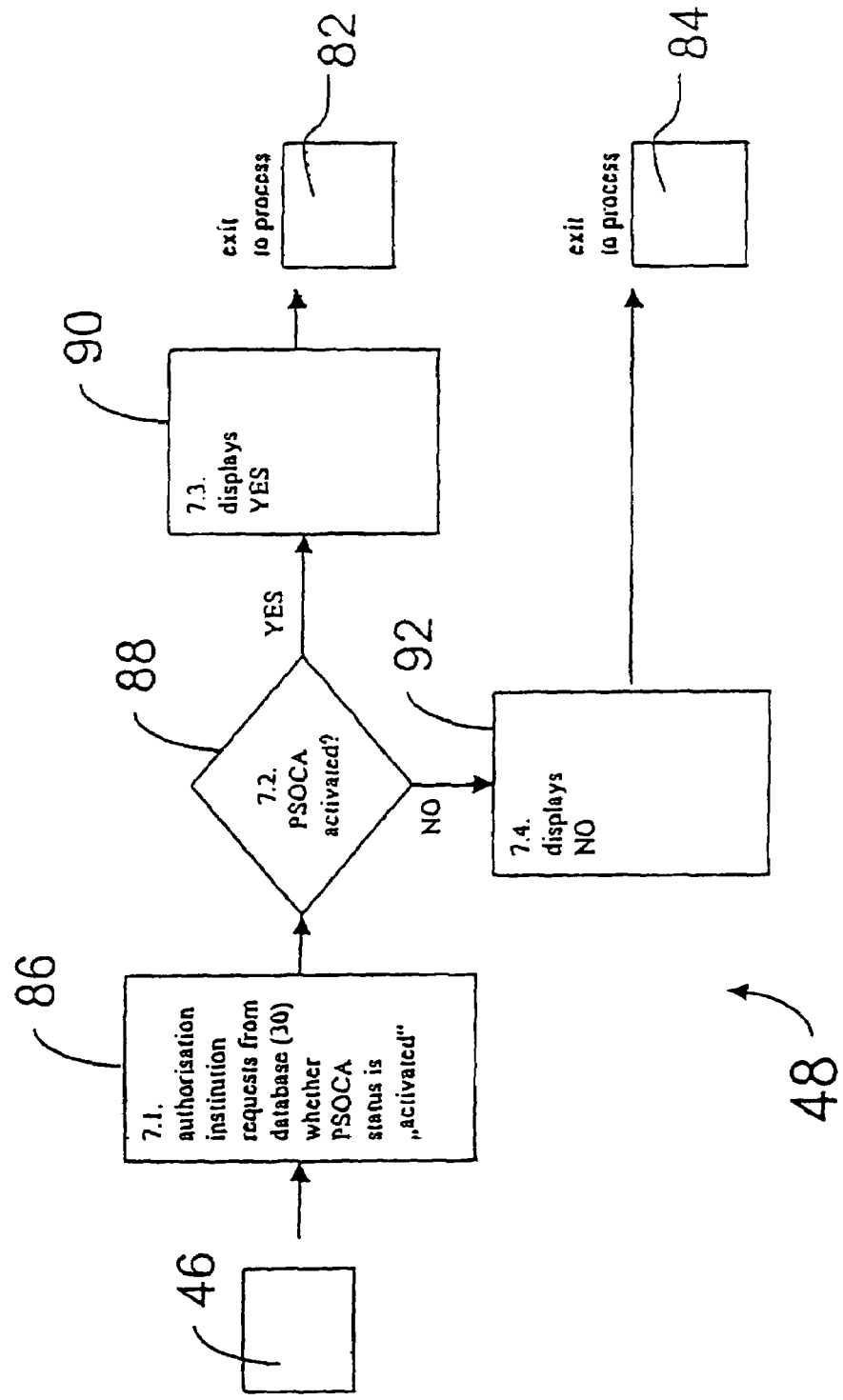
Figure 7: security through additional authorisation (in real time)

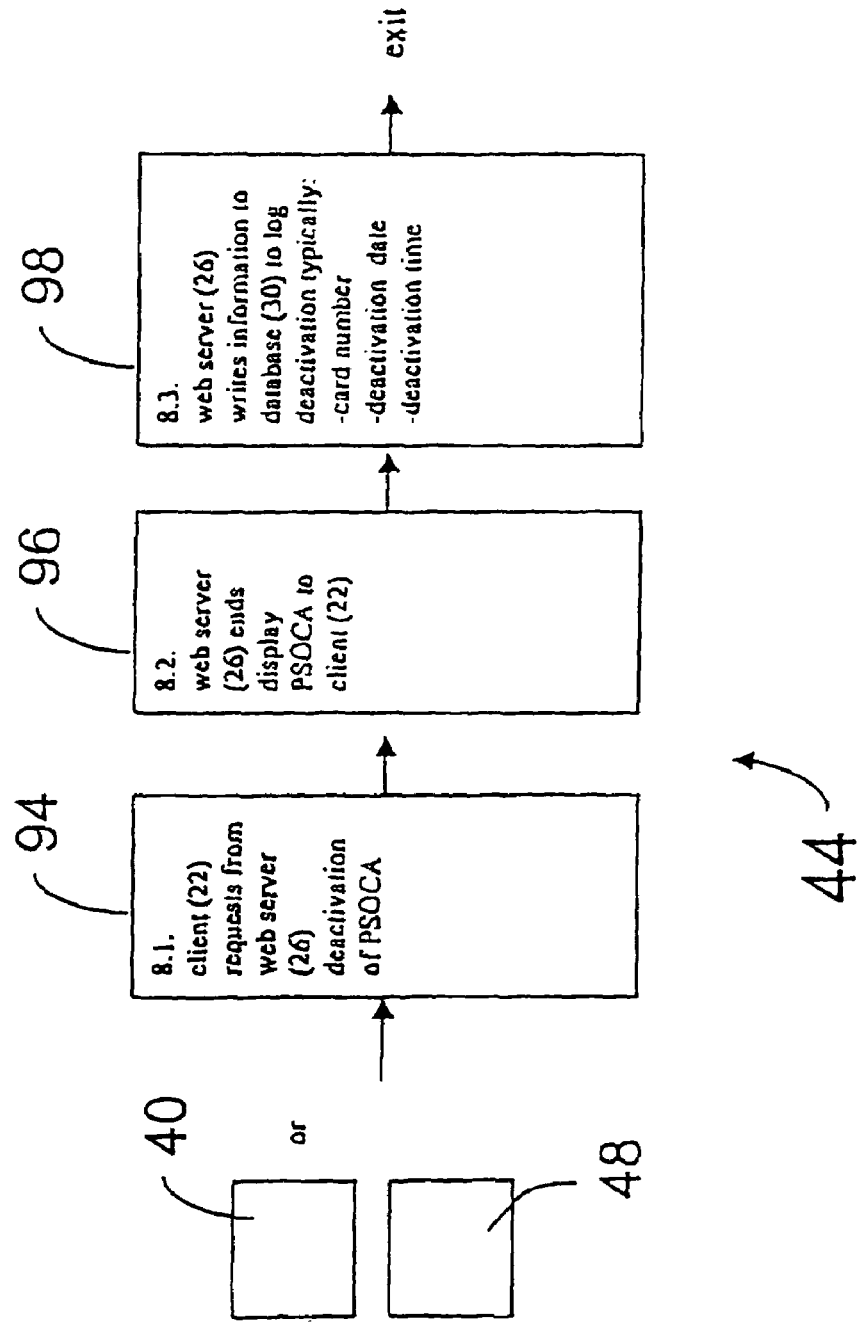
Figure 8: PSOCA deactivation

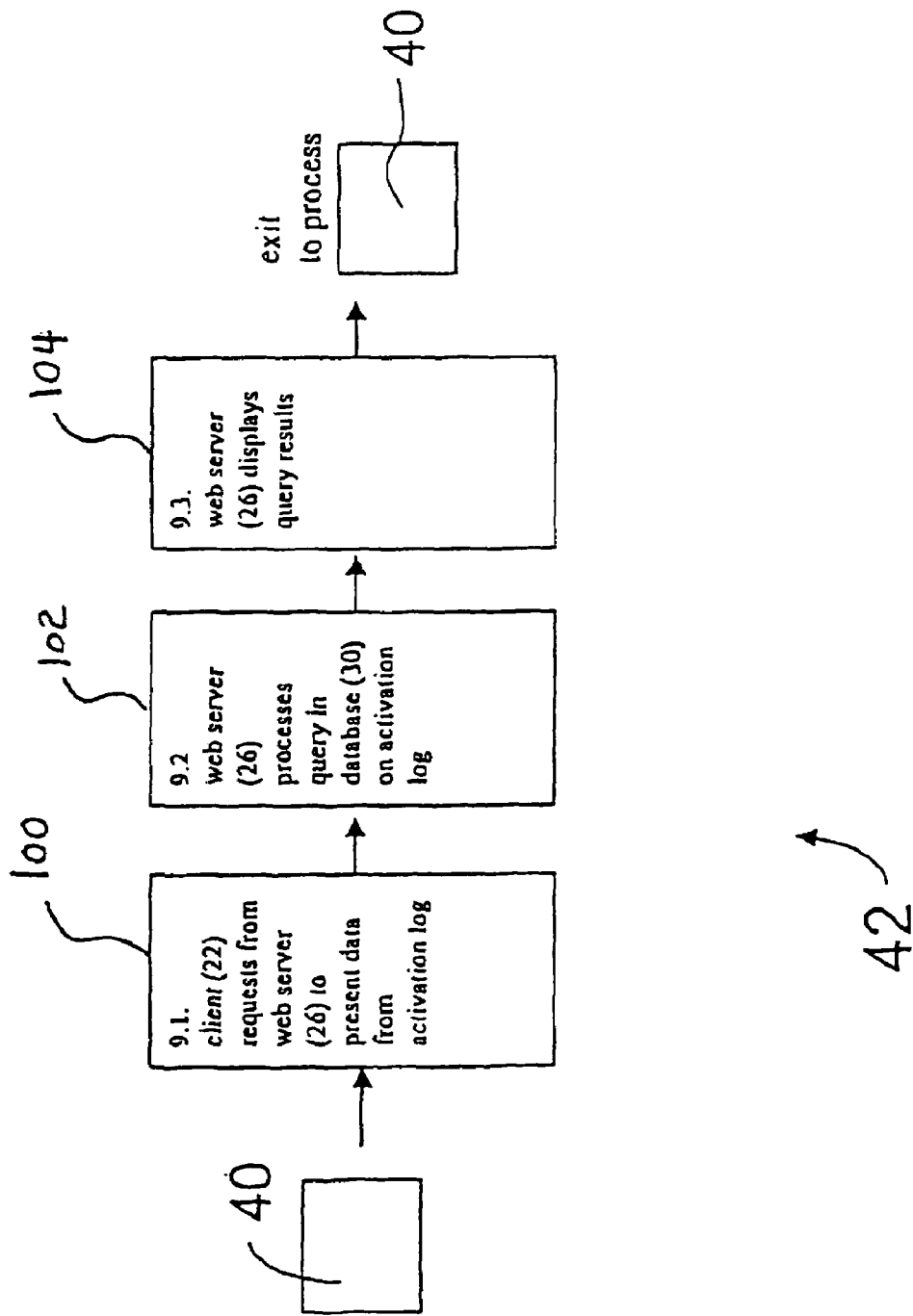
Figure 9: queries on log file to resolve disputes (historic)

Figure 10: Example - the user wants to process a payment transaction with his/her PSOCA
For instance, the user is on a merchant's payment web page or is asked by a call centre operator to provide his/her credit card details.
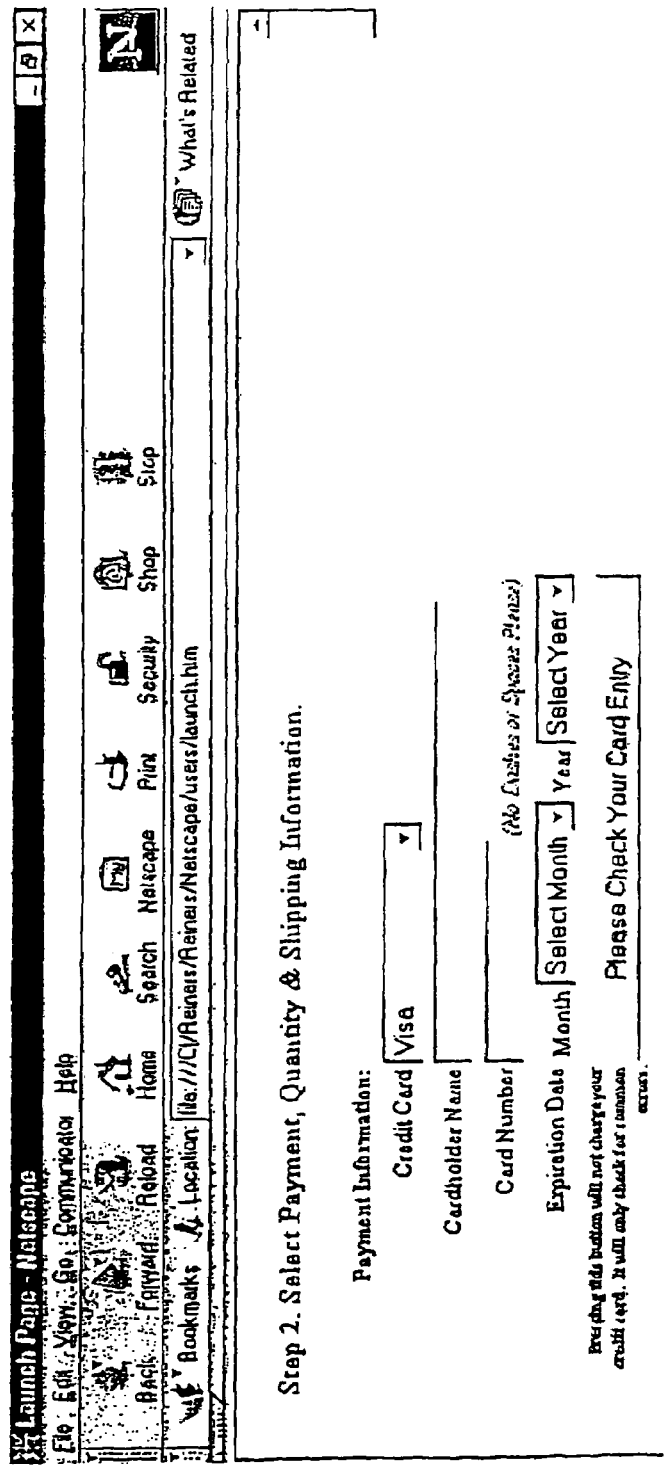

Figure 11: Example – the user accesses the PSOCA web site and provides his/her authentication details
The user opens for instance another browser window to access his/her PSOCA. In another instance, the user would get authentication and access to the PSOCA e.g. via WAP, an interactive voice interface, dialling a telephone number from a mobile telephone, etc.
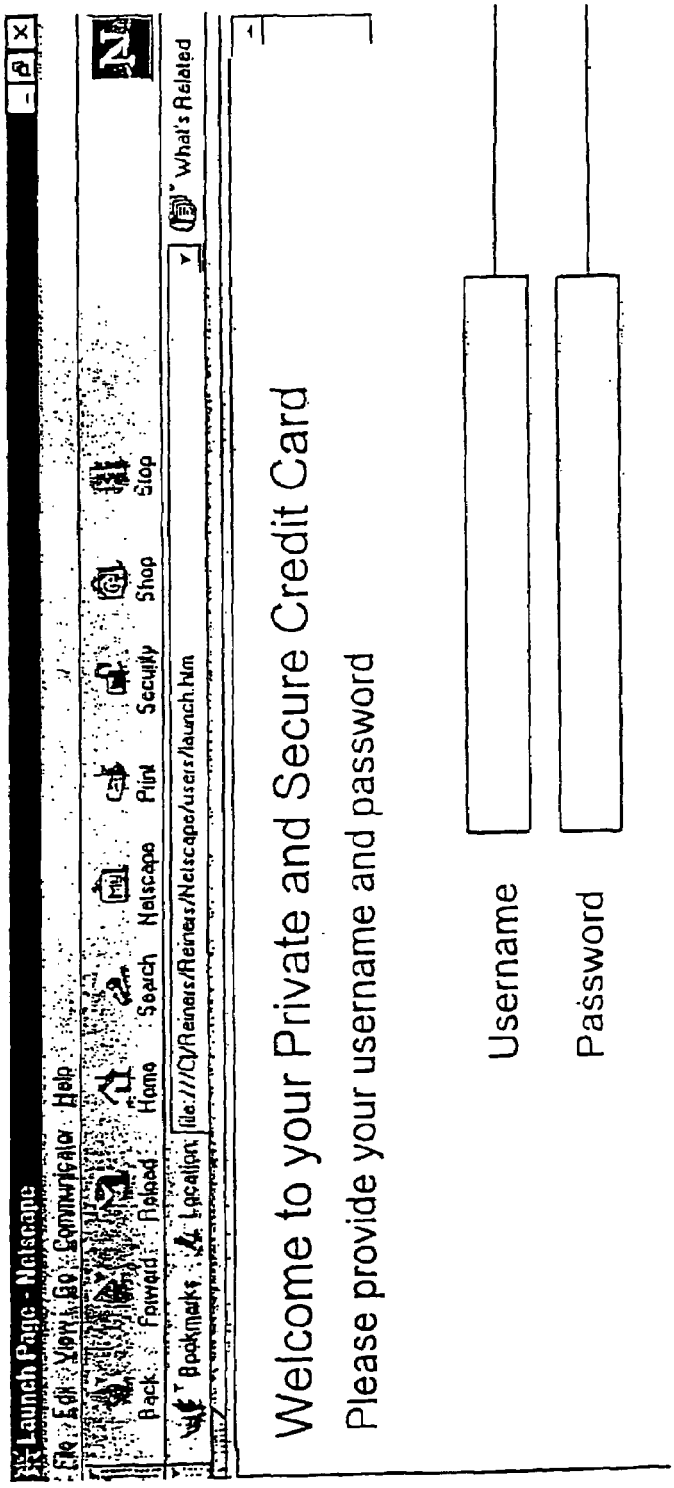

Figure 12: Example of the PSOCA display (the "PSOCA user interface")

The PSOCA details are displayed in a different browser window and the PSOCA is activated. The user provides the PSOCA details to the merchant, e.g. by punching the details in the merchant's payment page.

Depending on the chosen preferences (124), the PSOCA will be automatically deactivated after the transaction has been authorised by database 30, or manually by clicking the deactivation button, or after a time-out.

The user also has the opportunity to make transaction notes (118), to view the historic activation log and the transaction notes (119), to view all authorisation requests from database 30 (120), to view the PSOCA statement (122) and to change preferences (124, e.g. automatic deactivation after a transaction has been authorised by database 30)

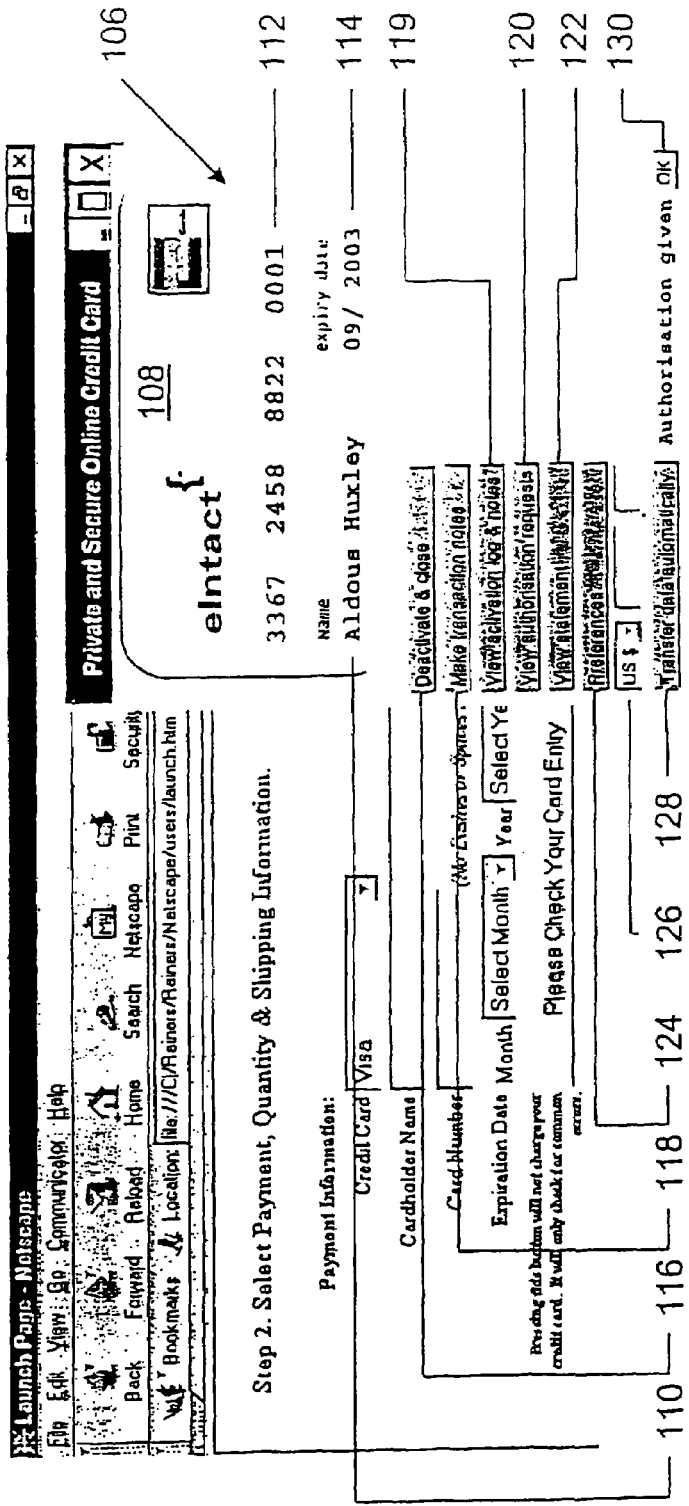

Figure 13: Example of the PSOCA display

The PSOCA details are displayed in a different browser window and the PSOCA is activated. The user provides the PSOCA details to the merchants, e.g. by punching the details in the merchant's payment site.

The PSOCA becomes e.g. deactivated after the transaction has been confirmed.

The user also has the opportunity to view his/ her historic activation log.

Figure 14: Example of the additional functionality of the PSOCA - transaction notes During completion of *process 46* (Figure 6) the PSOCA owner may have the opportunity to write transaction notes into his activation log file via the transaction notes interface. The principle is displayed in 134.

The PSOCA owner can fill these data fields at any point in time when the PSOCA is active and displayed to him/her, by pressing button 118. The notes data fields are written into the activation log on database 30. They can be retrieved together with the other activation log data, as described in *process 42* (Figure 9), by clicking button 119 (Figure 12).

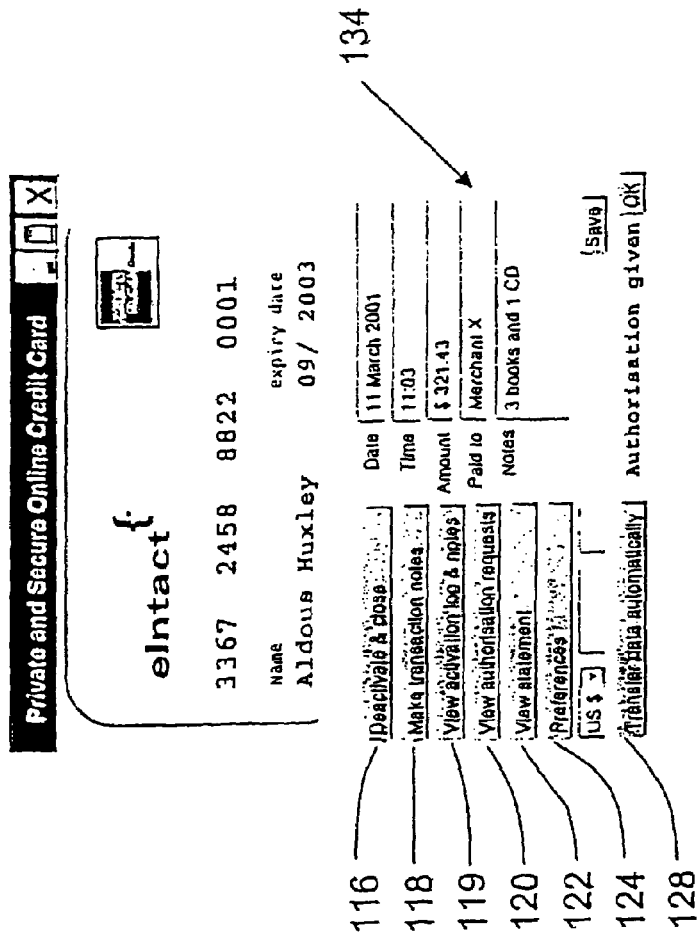

Figure 15: Example of the additional functionality of the PSOCA
- automated comparison of the PSOCA statement with the activation log Typically, the PSOCA statements will be available online to the PSOCA owner, to be viewed in his web-browser, e.g. by clicking button 122. To add additional convenience and security, the statement will automatically be compared with the activation log in database 30.

In case the PSOCA and payment data were transmitted automatically to the merchant via the mechanism 128, or in case the PSOCA owner has filled in transaction notes (134), extended comparison of the statement becomes possible. The Figure gives an example of the statement with its plausibility comparisons.

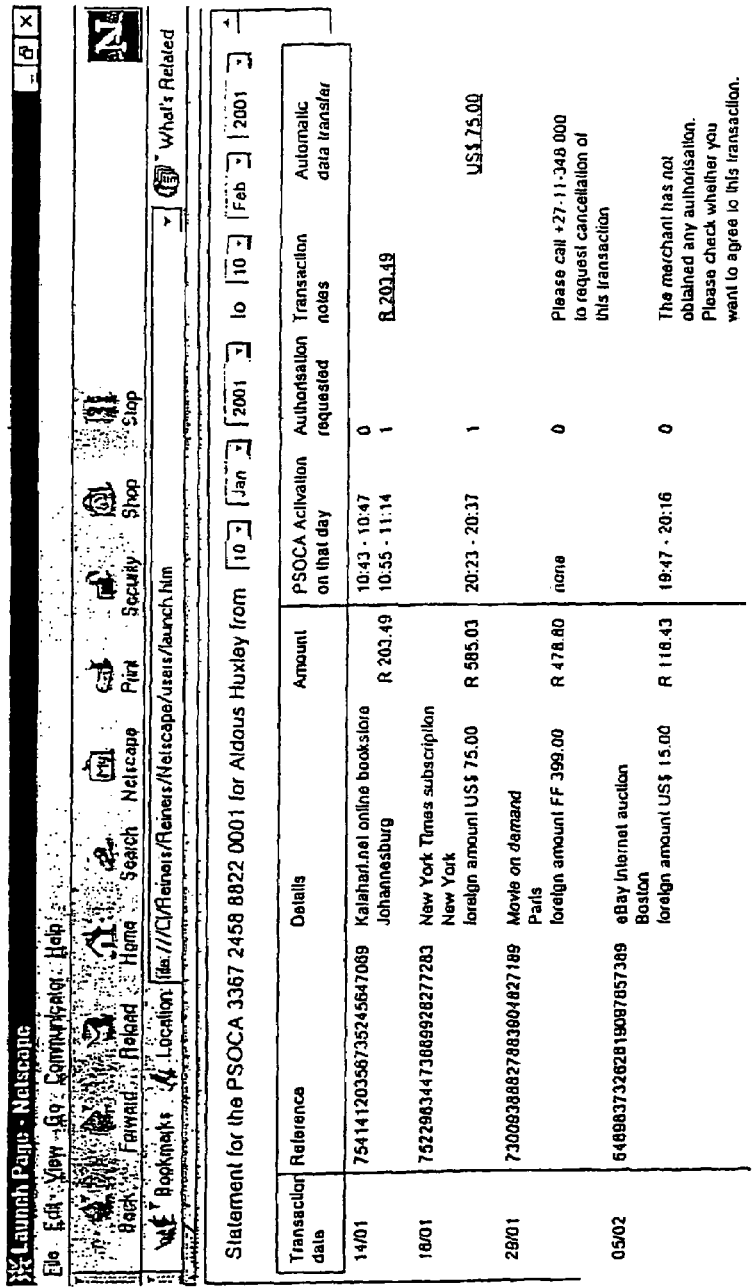

Figure 16: Example of the additional functionality of the PSOCA
— authorisation request feedback The display field 130 on the activated PSOCA feeds back to the PSOCA owner that an authorisation request has reached database 30. This may e.g. be done by visual feedback (changing the colour of "Authorisation given" to green) and/ or auditory feedback (a "beep").

Additional information 132 may be given, depending on the exact procedures that authorisation on database 30 require (e.g. authentication of the requesting party, and/ or name of the merchant and amount to be transacted).

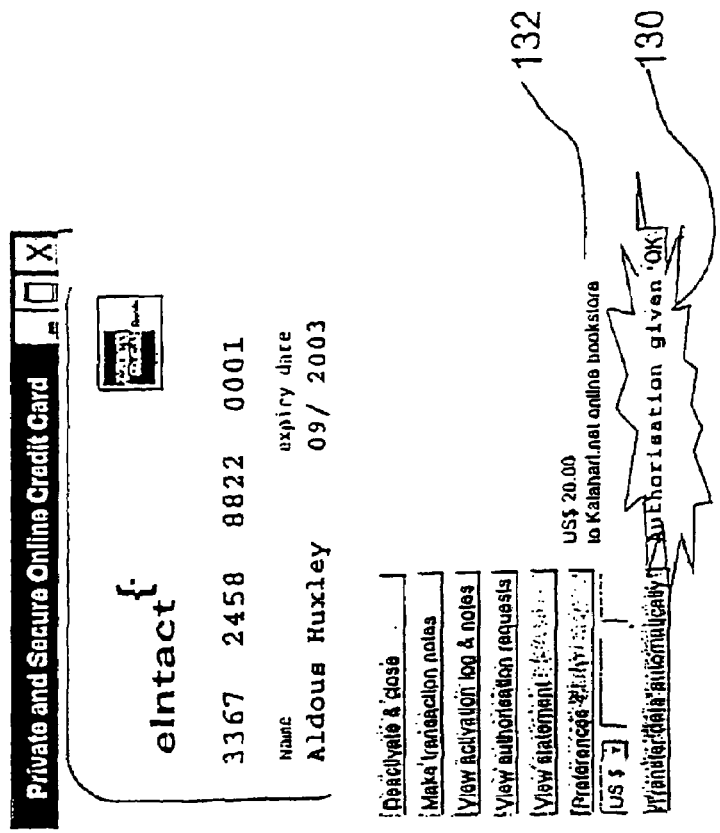

Figure 17: Example of the additional functionality of the PSOCA
— authorisation request log All authorisation requests to database 30 can be logged, and viewed by the PSOCA owner by clicking on button 120, while the PSOCA is active.

This gives the PSOCA owner an additional sense of security.

Authorisation requests for PSOCA 3367 2458 8822 0001 (A Huxley) from 10 Jan 2001 to 10 Feb 2001

| Request date | Request time | Requesting entity | Requested amount | PSOCA activated? | Authorisation given? | Transaction in statement? |
|---|---|---|---|---|---|---|
| 14/01 | 11:10 | Kalahari.net bookstore | R 202.49 | yes | yes | yes |
| 18/01 | 20:35 | New York Times | US$ 75.00 | yes | yes | yes |
| 18/01 | 22:34 | Adultcheck | US$ 77.00 | no | no | no |
| 24/01 | 17:30 | Motorstation Atlanta | US$ 110.00 | no | no | no |
| 24/01 | 17:32 | Motorstation Atlanta | US$ 110.00 | no | no | no |
| 24/01 | 17:35 | Motorstation Atlanta | US$ 110.00 | no | no | no |
| 24/01 | 17:37 | Motorstation Atlanta | US$ 110.00 | no | no | no |
| 24/01 | 17:39 | Motorstation Atlanta | US$ 110.00 | no | no | no |

Figure 18: Example of the "Preferences interface"

The PSOCA owner can change personal preferences around the PSOCA. The figure below gives examples of the preferences interface. Clicking on the "specify" links, a calendar-type of interfaces comes up that allows the user to specify times during the PSOCA is activated or in enforced de-activation status.

Private and Secure Online Credit Card  ⬚ ▢ ✕

My preferences
De-activation of my PSOCA
- manually (click button) or on closing of window
- ○ time out after [ 10 ▼ ] minutes
- ○ after authorisation request has been received Yes ●    I would like to be notified in case of
No ○    unsuccessful authorisation attempts
     Notification method:
     ● email address: [ maxe@eintact.com ]
     ○ SMS number: [      ]

Yes ●    I would like to activate my PSOCA as default
No ○    during pre-specified times
     ○ on certain days of the month: specify
     ○ on certain week days: specify
     ○ during certain times during a day: specify Yes ●    I would like to enforce de-activation for my
No ○    sub-accounts during pre-specified times
     sub account [ 3367 2458 8822 0002 ▼ ]
     ○ on certain days of the month: specify
     ○ on certain week days: specify
     ○ during certain times during a day: specify

[ Save & back ]

Figure 19 : PSOCA State Diagram

The PSOCA can assume several states. It can be "state 1: unissued" 211. After a card issuer approves a customer application, the PSOCA becomes "state 2: issued/ logged off" 212. After the card holder authenticates him/herself at the PSOCA Administration Server 26, the state becomes "state 3: logged in" 213. There are two sub-states: "state 3.1: deactivated" 216 and "state 3.2: activated" 217. The bank account or card account may also be "state 4: suspended" 215 or "state 5: account closed" 214.

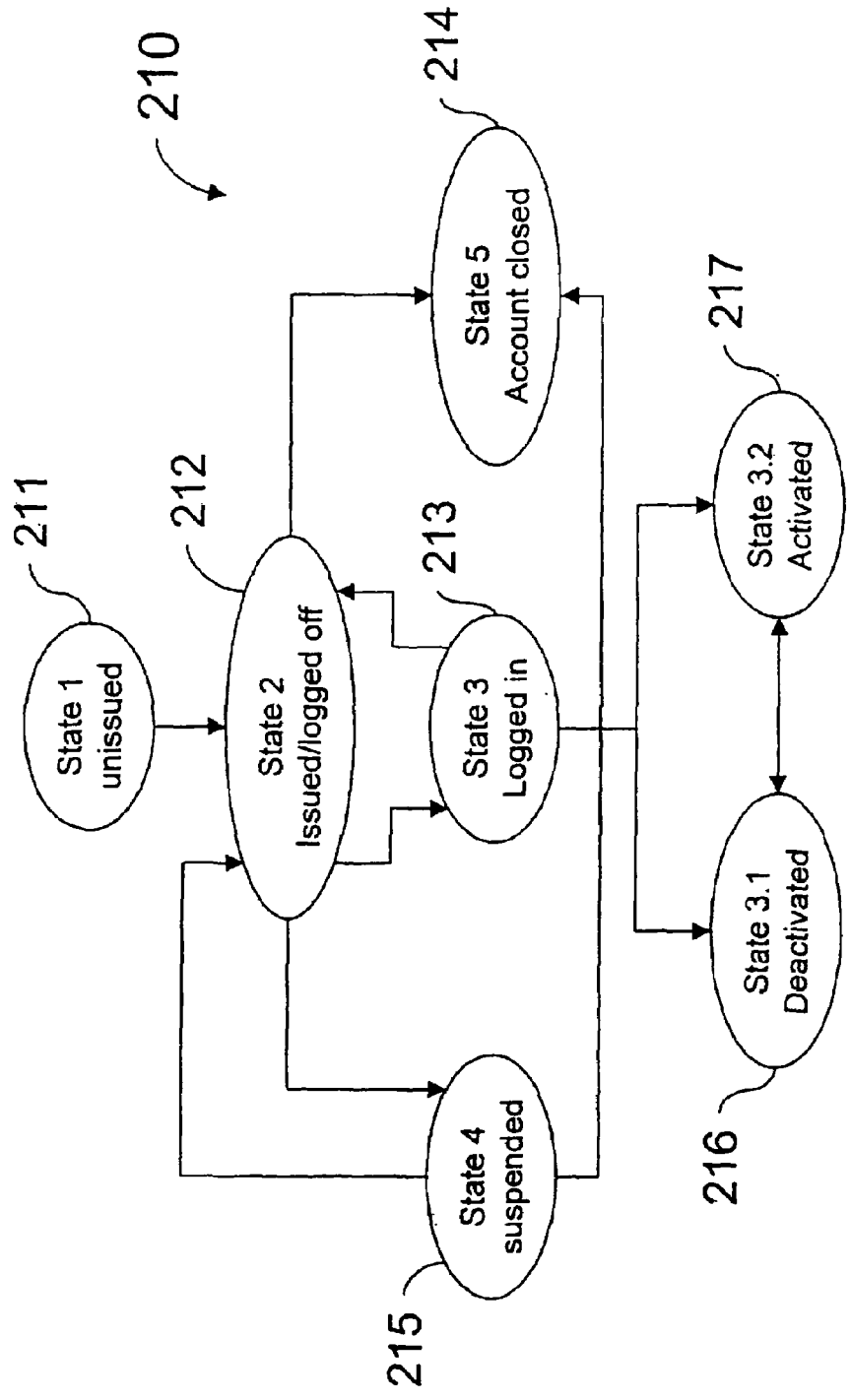

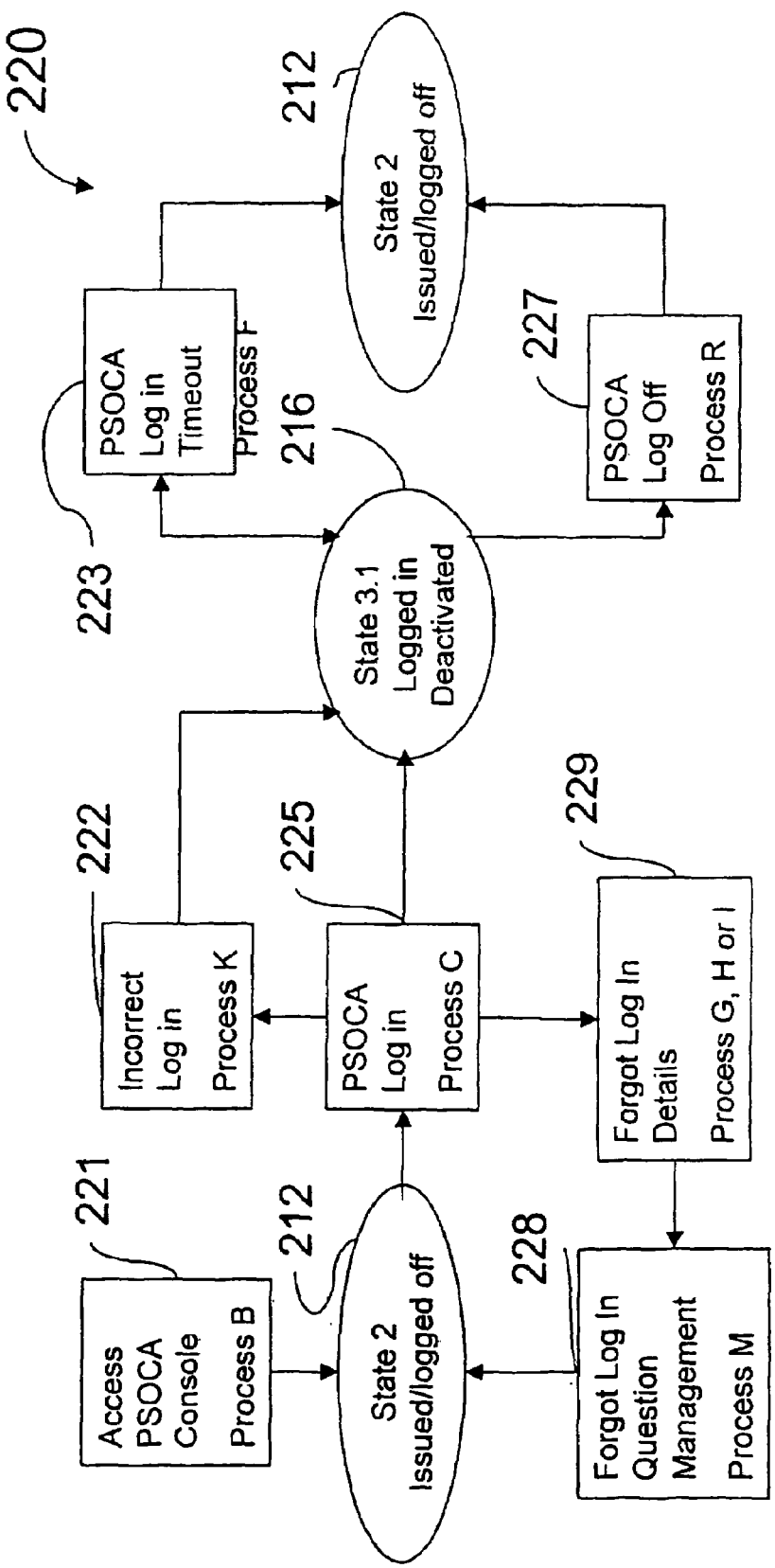

Figure 20 ; Overview - PSOCA Log-In and Log-Off Process

Once a PSOCA has the state 2 "issued/ logged off" (212), the card holder has various means of accessing his PSOCA console (221), and there is a process to deal with forgotten logon details 228. During the login process 225 there may occur incorrect login 222 or a remedy for forgotten login details 229.

Once the PSOCA enters the state 3.1 "logged in/ deactivated" (216), a timeout process 223 or a logoff process 227 may lead the PSOCA back to state 2 "issued/ logged off" 212.

Figure 21 : User Interface - PSOCA Login

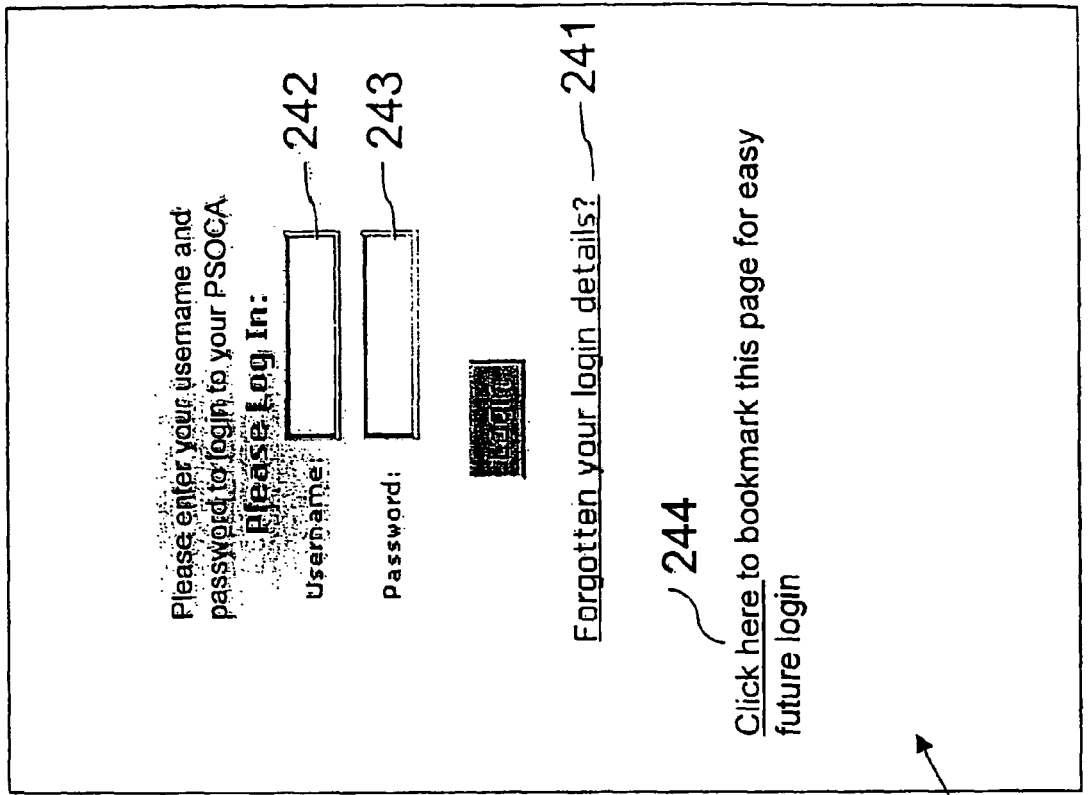

This figure shows how the account holder login user interface 240. This interface is presented to the account holder during the login process.

The login interface may be presented in various ways, for instance it may be presented via a http or https protocol in an Internet browser, or it may be a WAP interface, a GPRS interface, a UMTS interface or a voice controlled interface.

The account holder authenticates him/herself for instance by means of a username 242 and password 243. Both username and password has been issued to the account holder for this purpose.

There is provision for the case that the account holder has forgotten his/her logon details (241).

Also, the account holder can automatically bookmark the login user interface by means of pressing button 244.

Figure 22: K - Login Error Management
Login error management 222 in more detail. In case the correct login details are not given before a counter reaches a critical value, a time delay prevents further immediate attempts. During this time period intrusion detection processes and other security mechanisms may apply.
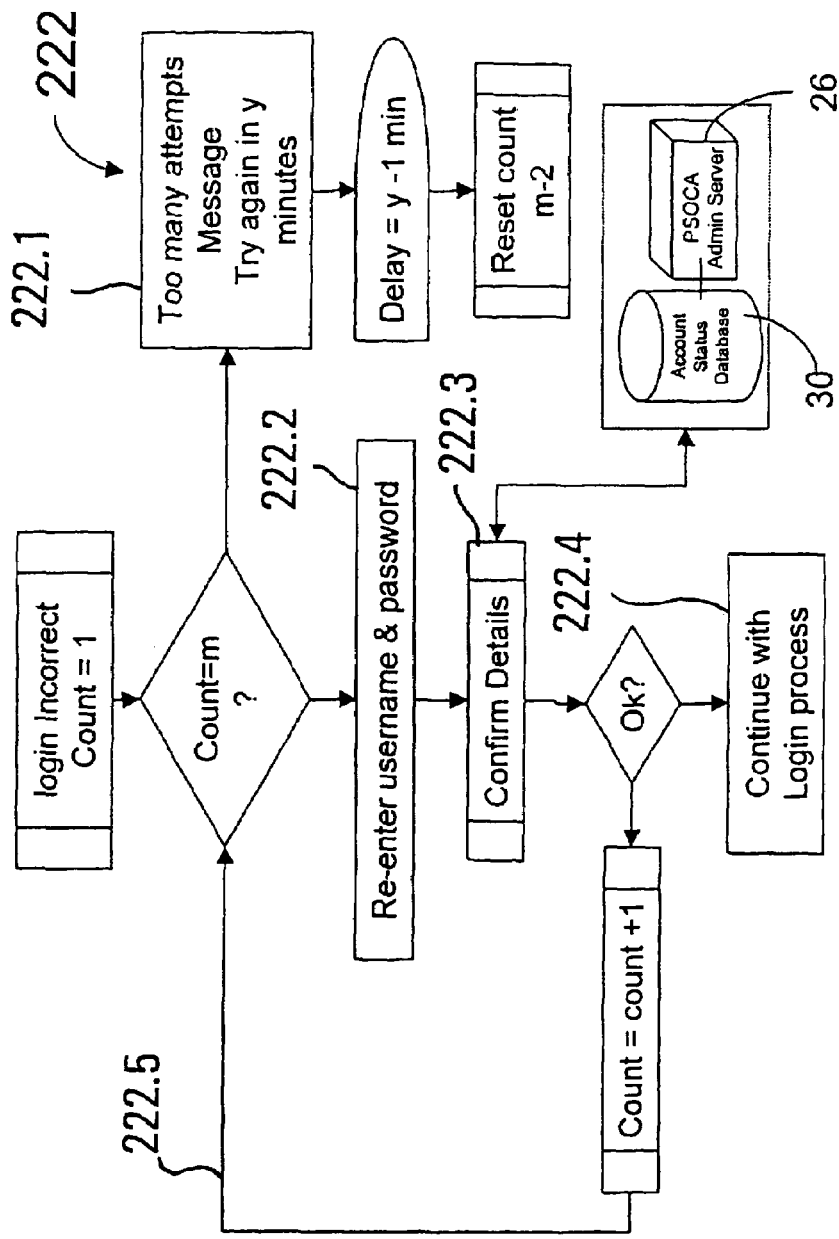
Applicable State: 2

Figure 23 : C - PSOCA Login Authentication

The login process C (box 225) in more detail. There is provisioning for error management 222 during the login process. After successful completion of the login process, the PSOCA is in deactivated state (3.1/ 216). From here, the PSOCA can be activated (state 3.2/ 217) through process 262, it can time out (223), or other PSOCA features can be accessed (290, 300).

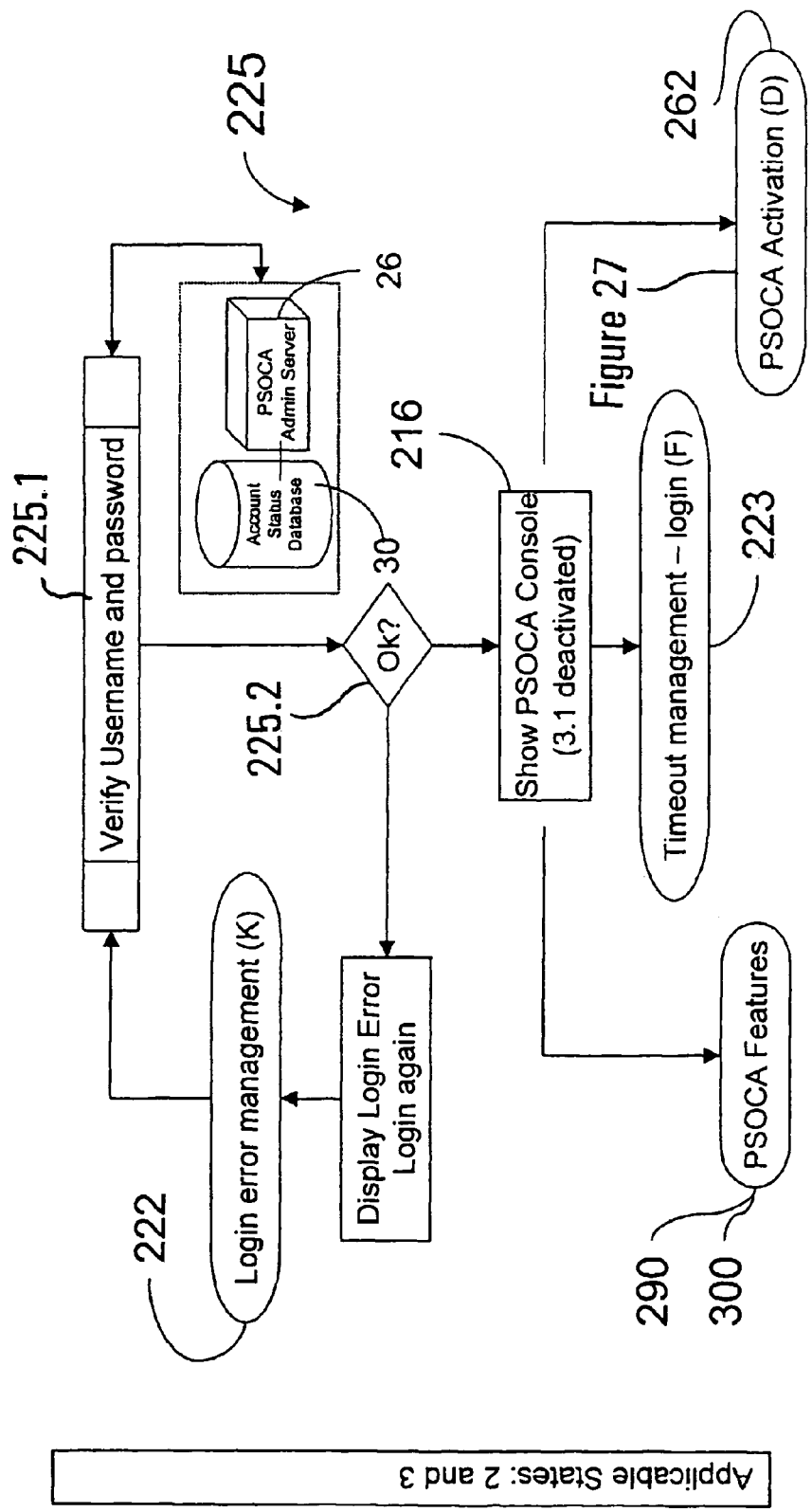

Applicable States: 2 and 3

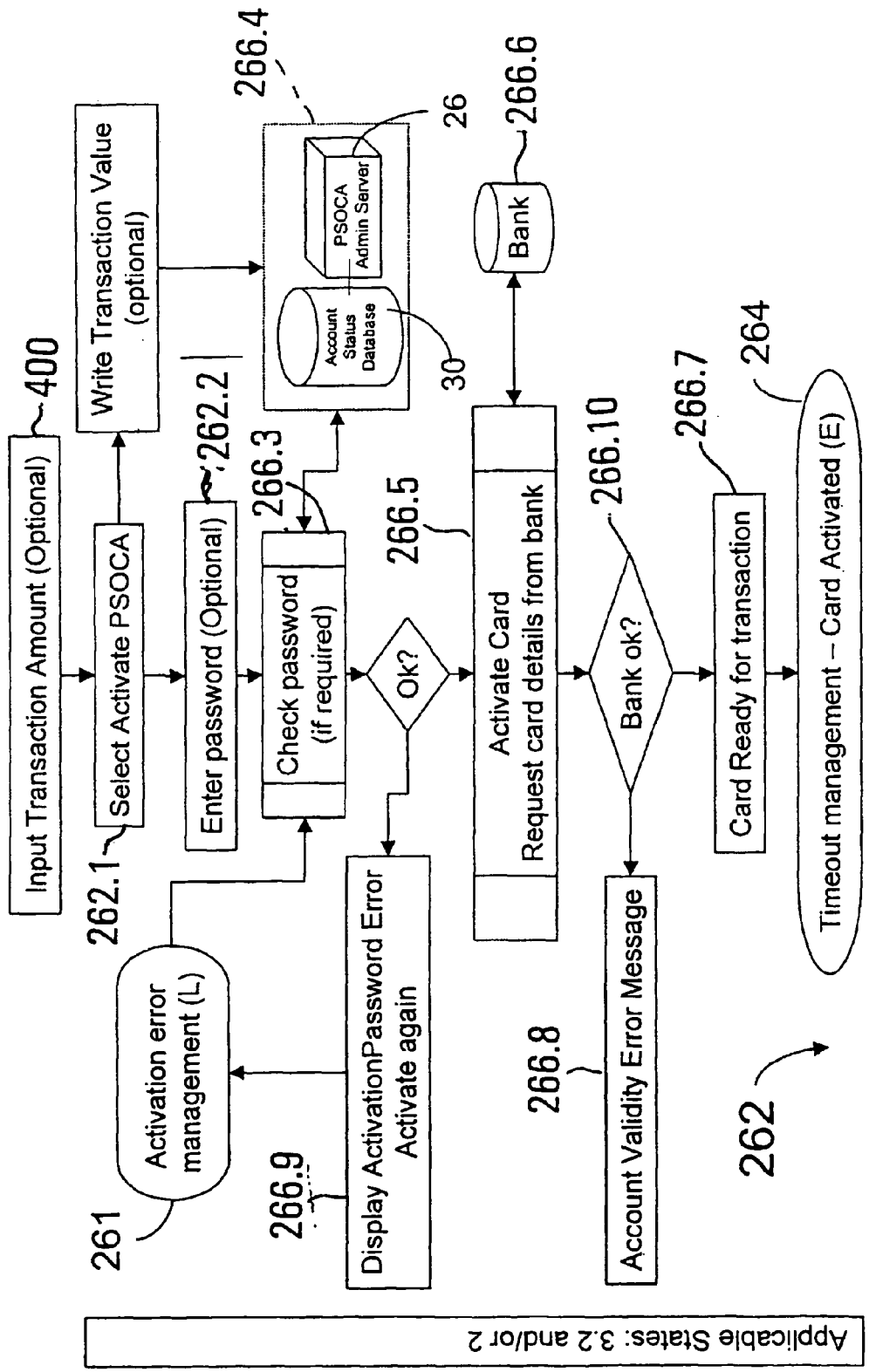
Figure 24 : D - PSOCA Activation
The activation process D (box 262) in more detail. There is provisioning for activation error management 261 during the activation process. After successful completion of the activation process, the PSOCA is in activated state (3.2/ 217).

Figure 25: L - Activation Error Management
The activation error management process L (box 261) in more detail. The activation error management process regulates changing the PSOCA state from deactivated state (3.1/ 216) to activated state (3.2/ 217) in case wrong account holder authentication details are entered.
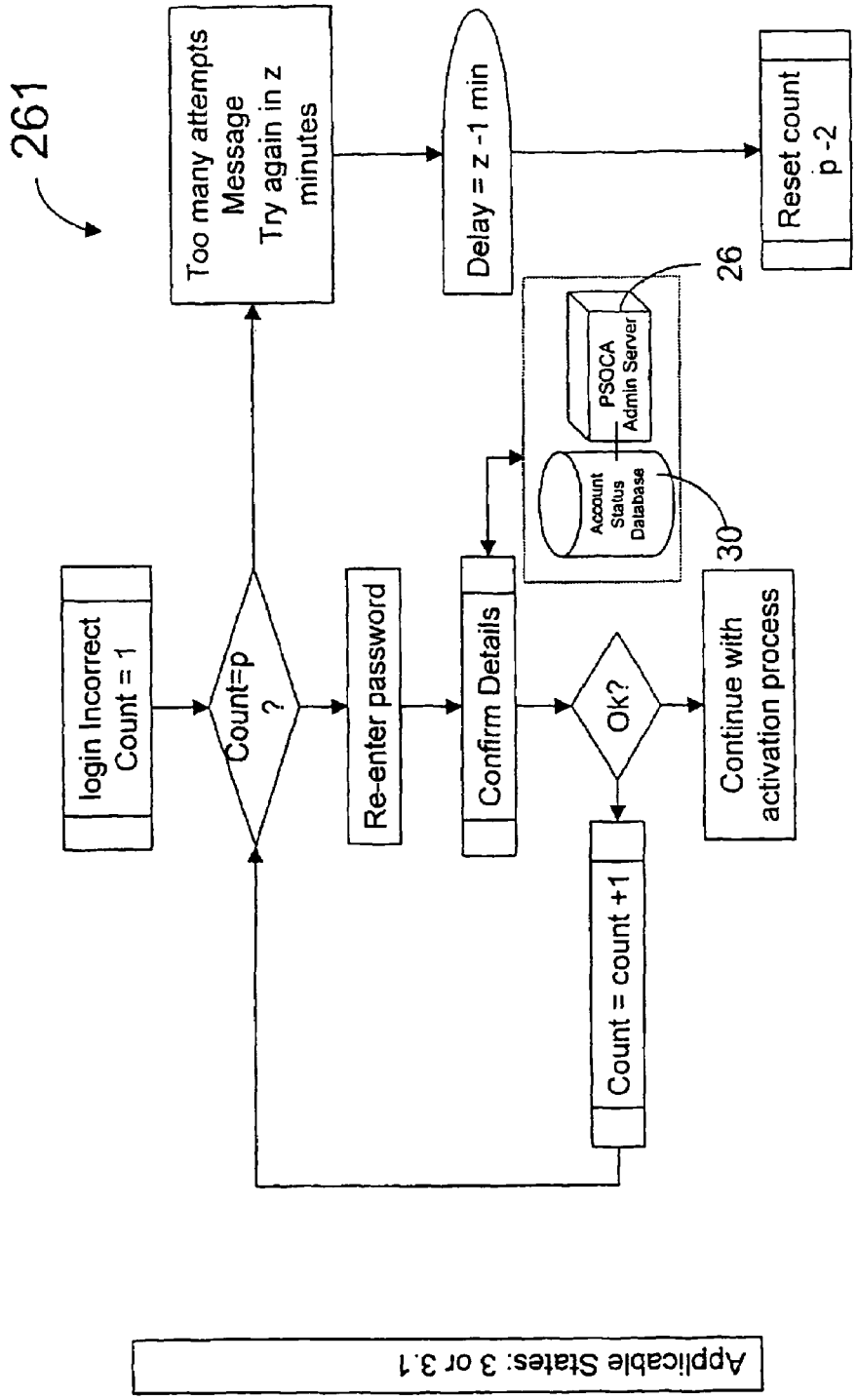

Figure 26 : E - Timeout Management – Card Activated
The activation timeout management process E (box 264) in more detail. After successful completion of the activation timeout process process, the PSOCA is in deactivated state (3.1/ 216).
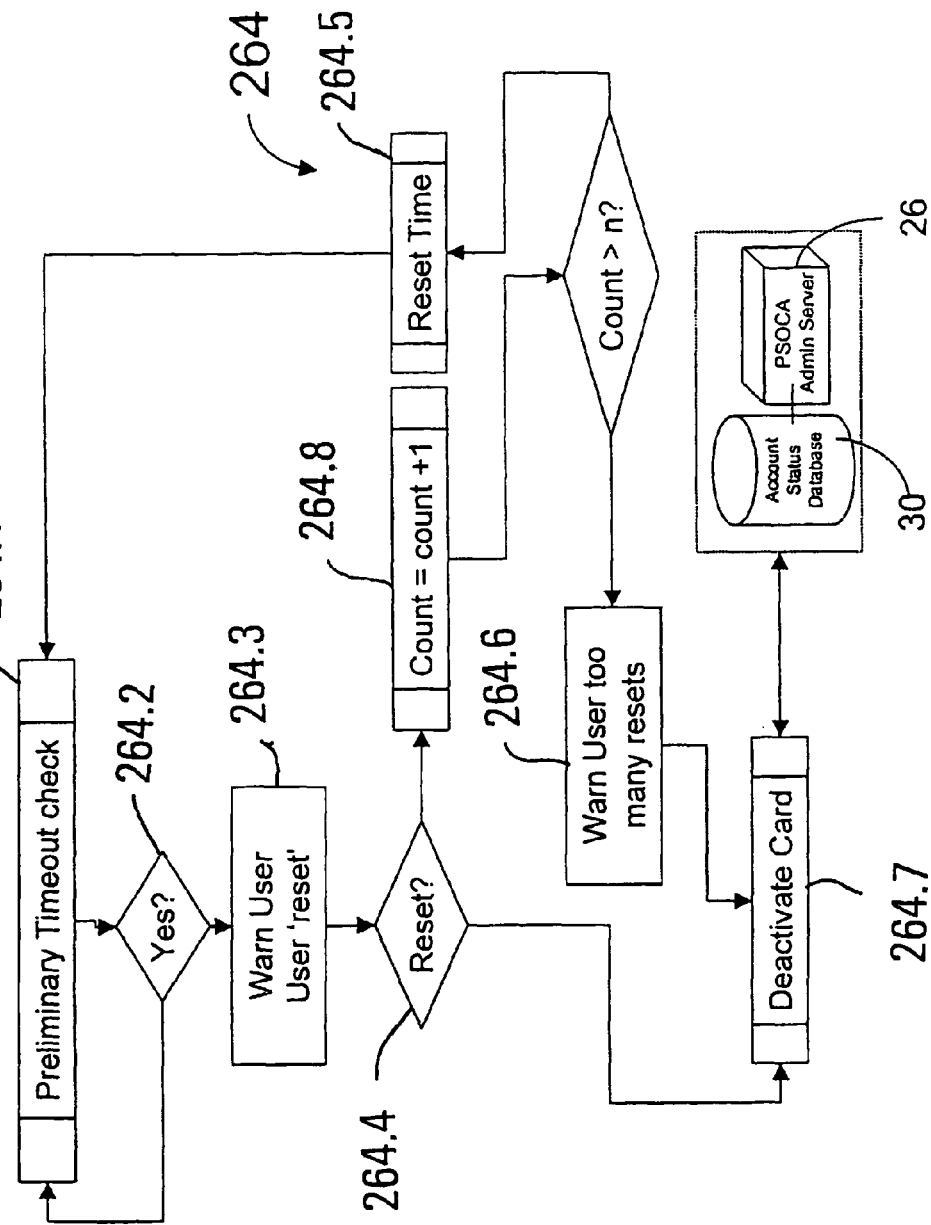

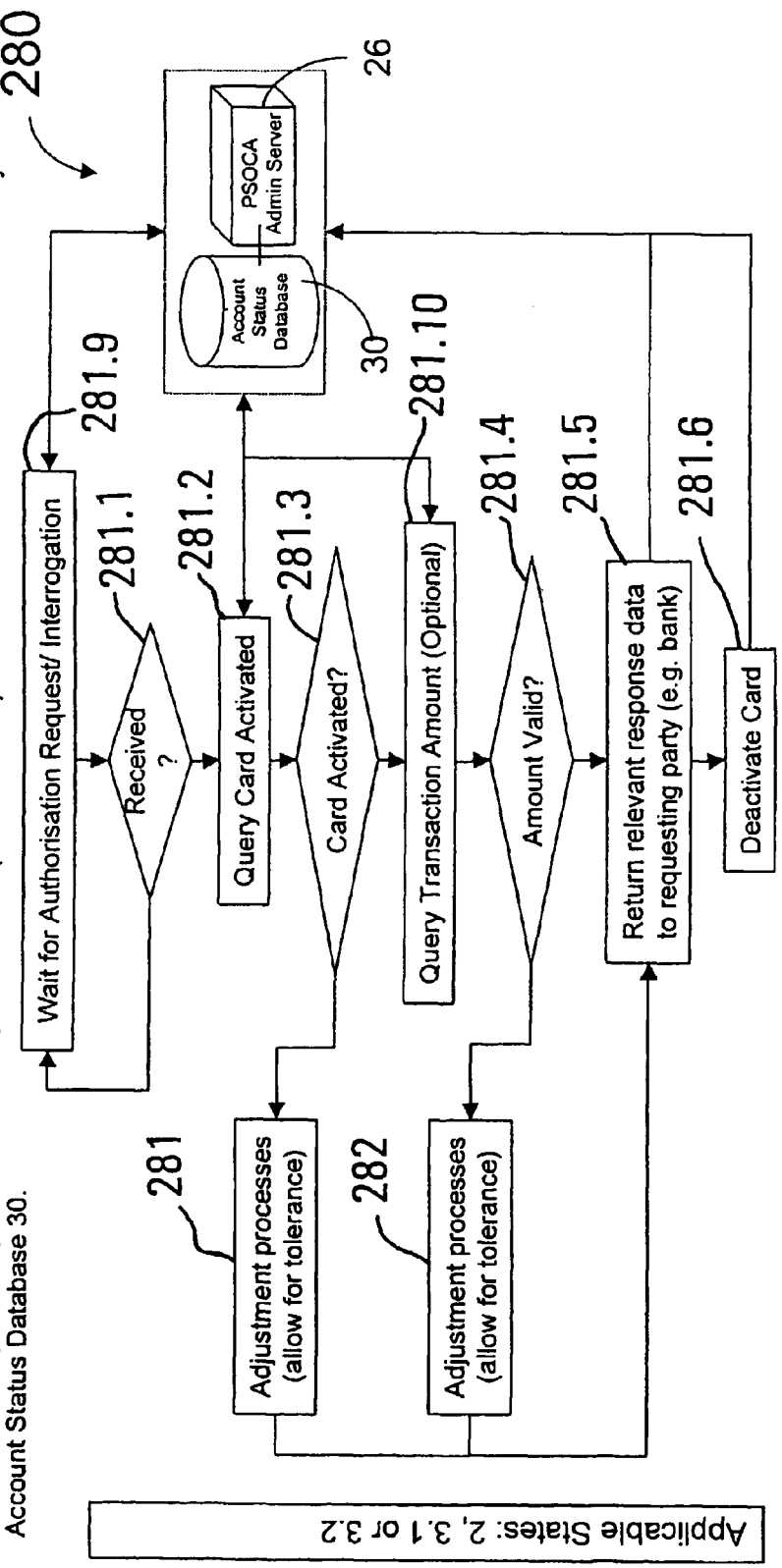

Figure 27: D1 - Automatic deactivation after additional authorisation interrogation

The process 280 "automatic deactivation after additional authorisation interrogation" in more detail. The PSOCA mechanism waits for additional authorisation request reaching its Account Status Database, typically received from an authorising institution, such as a bank, or by others (for instance by a merchant).

The process may answer the query with the state of the PSOCA (deactivated 3.1 / 216 or activated 3.2 / 217), and potentially with the pre-specified amount 236. Other data may be given to the authorising institution like time and duration of the last PSOCA activation, or the like. This data may serve to adjust the response data in order to allow for tolerance.

The PSOCA is preferably and automatically deactivated (state: 3.1 / 216) after the transaction has been authorised by the Account Status Database 30.

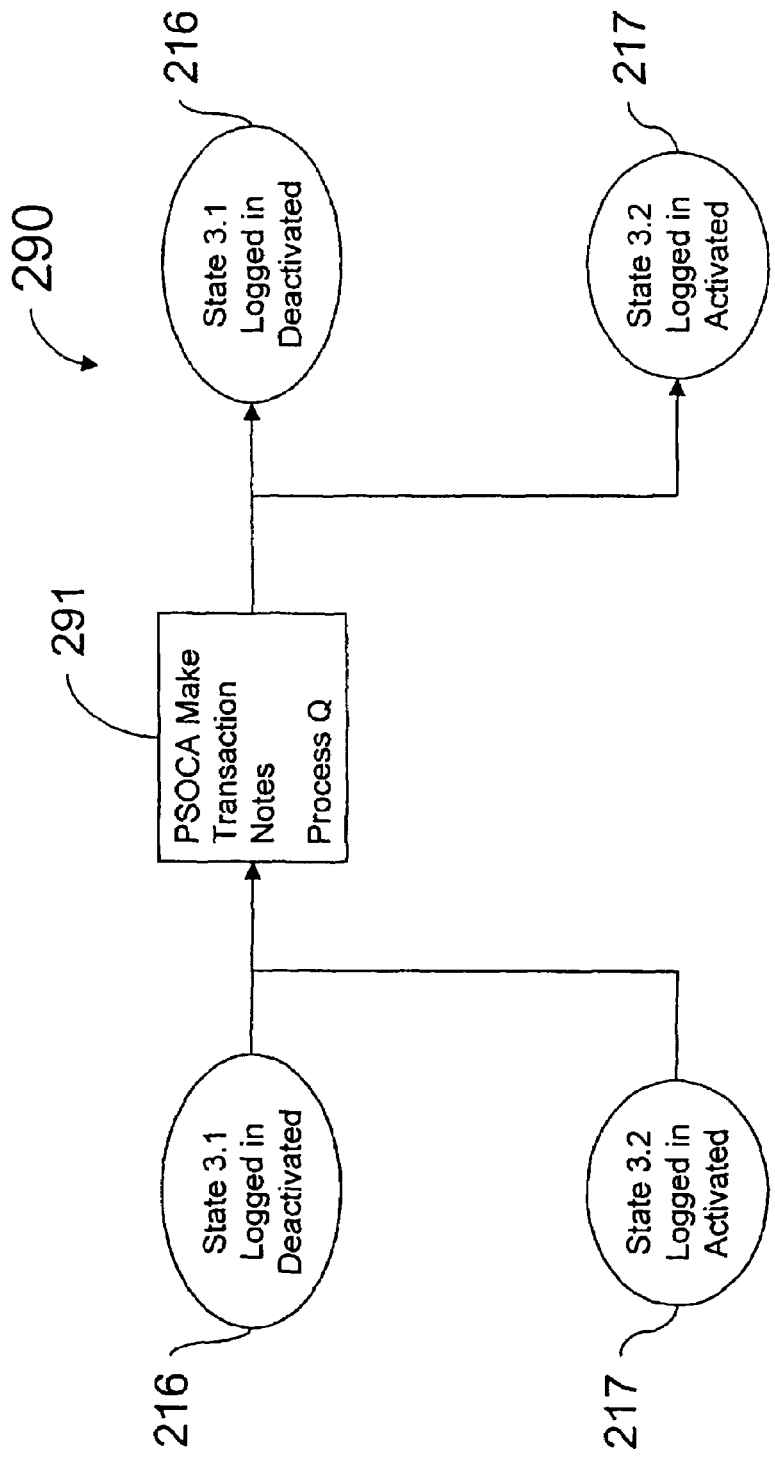
Figure 28: Overview - PSOCA Make Transaction Notes Process
Once a PSOCA has the state 3 "issued/ logged on" (213), the card holder can make transaction notes 291. The status of the PSOCA is not altered by this.

Figure 29: Q – Make Transaction Notes
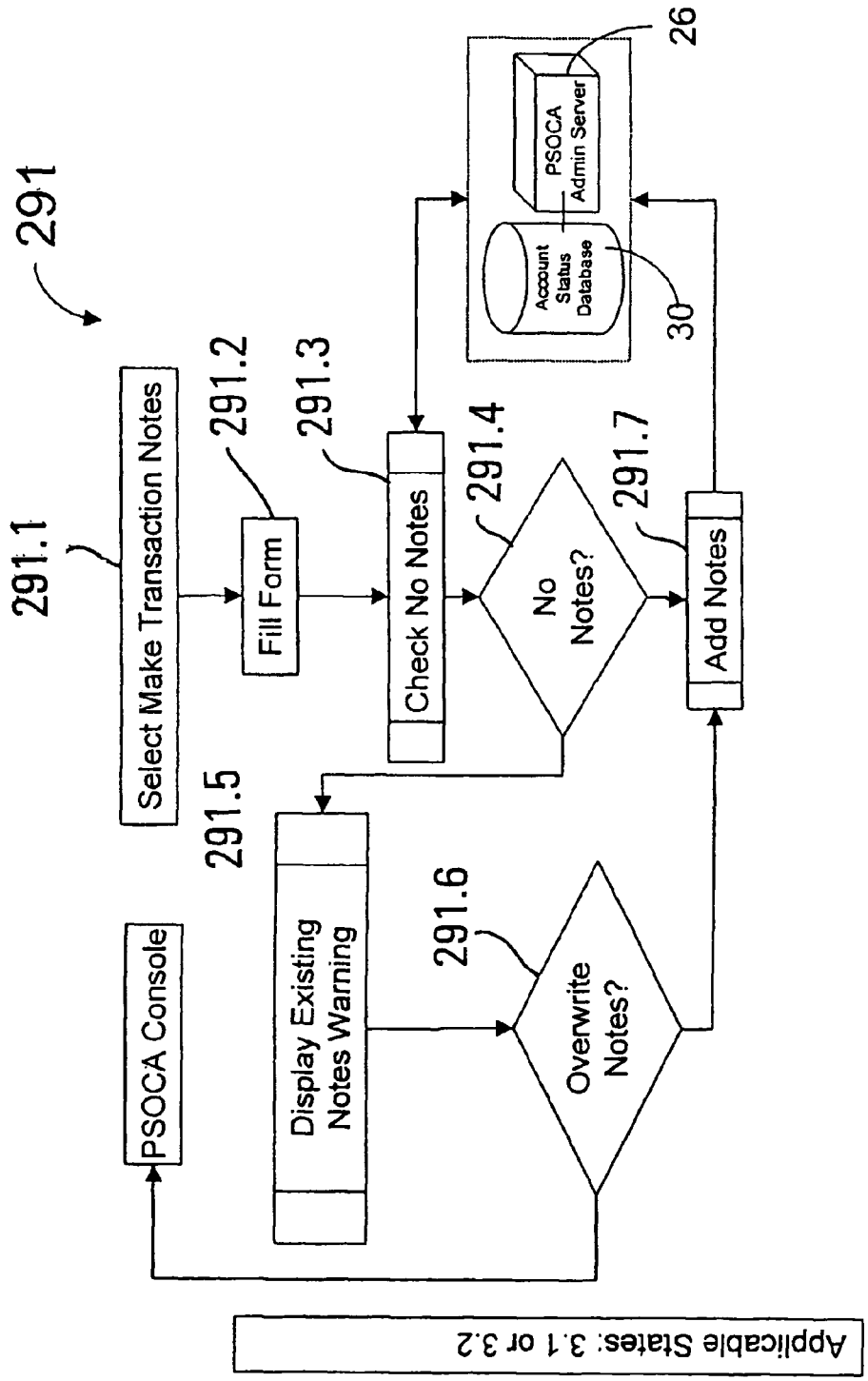
The process "Make Transaction Notes" 291 in more detail. The transaction notes may be stored in the Account Status Database 30.

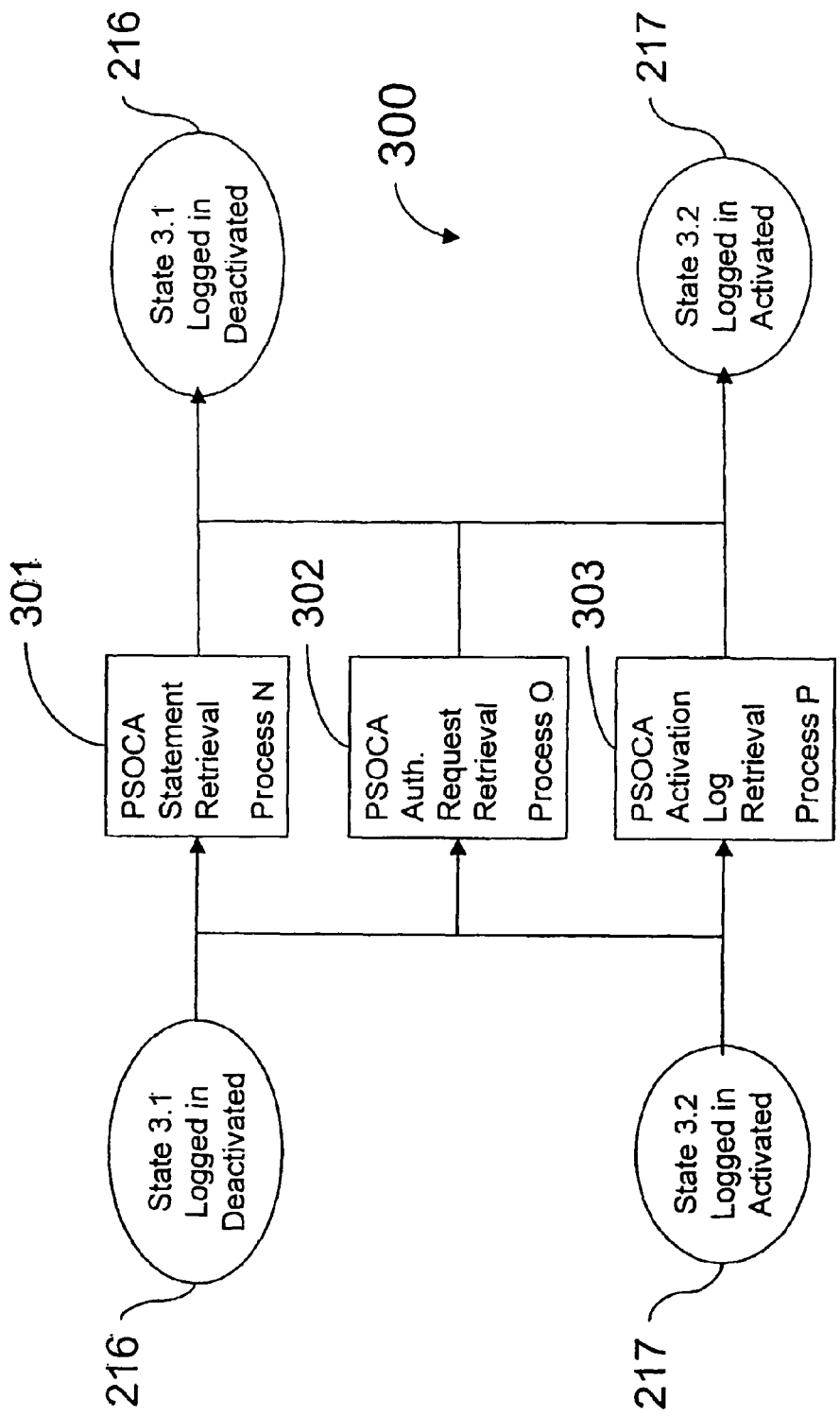
Figure 30: Overview - PSOCA Information Retrieval Process

Figure 31: N – Statement Retrieval
The process "Statement Retrieval" 301 in more detail. The statement data may be may be stored in the Account Status Database 30 or retrieved from the bank and deleted thereafter.
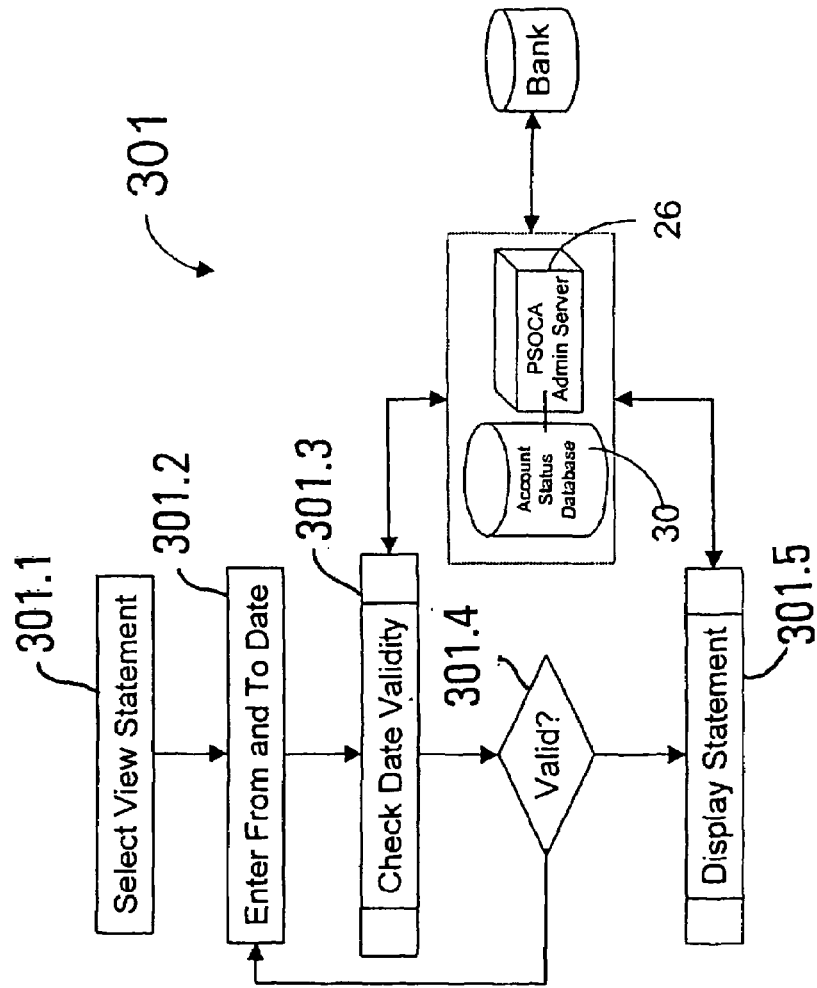

Figure 32: User Interface - PSOCA - Select statement period
This figure shows how the statements may be presented in a separate user interface to the account holder. The account holder may select the period of a statement via a device similar to 304.
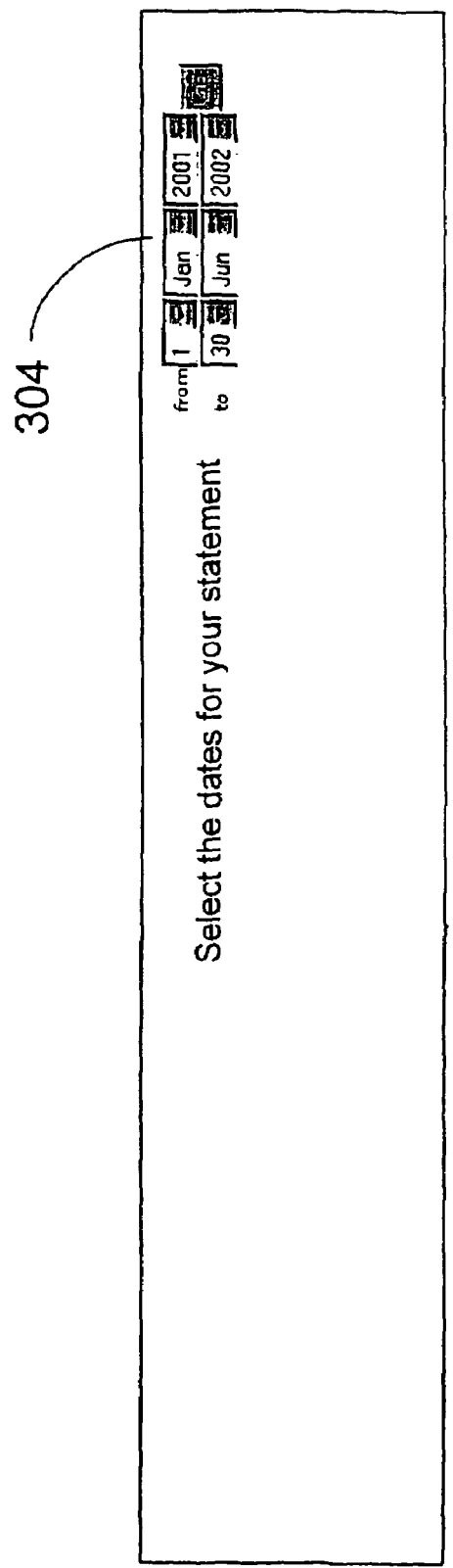

Figure 33: User Interface - PSOCA - Statement

This figure shows how the statements may be presented in a separate user interface to the account holder. An example of a statement after successful completion of process 301 is depicted.

Traditional transaction data (left side, 305) may be complemented in an intelligent manner with data from the Account Status Database and PSOCA Administration Database (right side, 306). This allows for convenient plausibility and consistency checks for the account holder.

PSOCA Statement for Aldous Huxley -    From: 1 Jan 2001
                                       To:   30 Jun 2002

| Date | Transaction ID | Description | Amount | Time | | | | |
|---|---|---|---|---|---|---|---|---|
| 06-01 | 75414120356735245647069 | kalahari.net Johannesburg | R 203.49 | 10:43-10:47 | 0 | | R 203.49 | |
| 06-10 | 75229834473889928277283 | New York Times New York foreign amount US$ 75.00 | R 585.03 | 10:55-11:14 | 1 | | | US$ 75.00 |
| | | eBay internet auction | | 20:23-20:37 | 1 | | | The merchant has not obtained any authorisation. Please check whether you want to agree to this transaction. |
| 06-11 | 54898373262819097857389 | Boston foreign amount US$ 15.00 | R 116.43 | 19:47-20:16 | 0 | | | |
| 06-13 | 73000938882788390482711B9 | Movie on demand Paris foreign amount FF 399.00 | R 478.80 | None | | | Please call +27-11-348 000 to request cancellation of this transaction | |
| | | Ashford.com online | | | 0 | | | |
| 02-13 | 54598745985753645366354 | Jewellers New York foreign amount US$ 1,369.00 | R 10,952.47 | 13:47-13:47 | 1 | | | US$ 1,369 |

305 (left portion) — 306 (right portion)

Figure 34 : O – Authorisation Requests Retrieval
The process "Authorisation Requests Retrieval" 302 in more detail The authorisation request data may be stored in the Account Status Database 30.
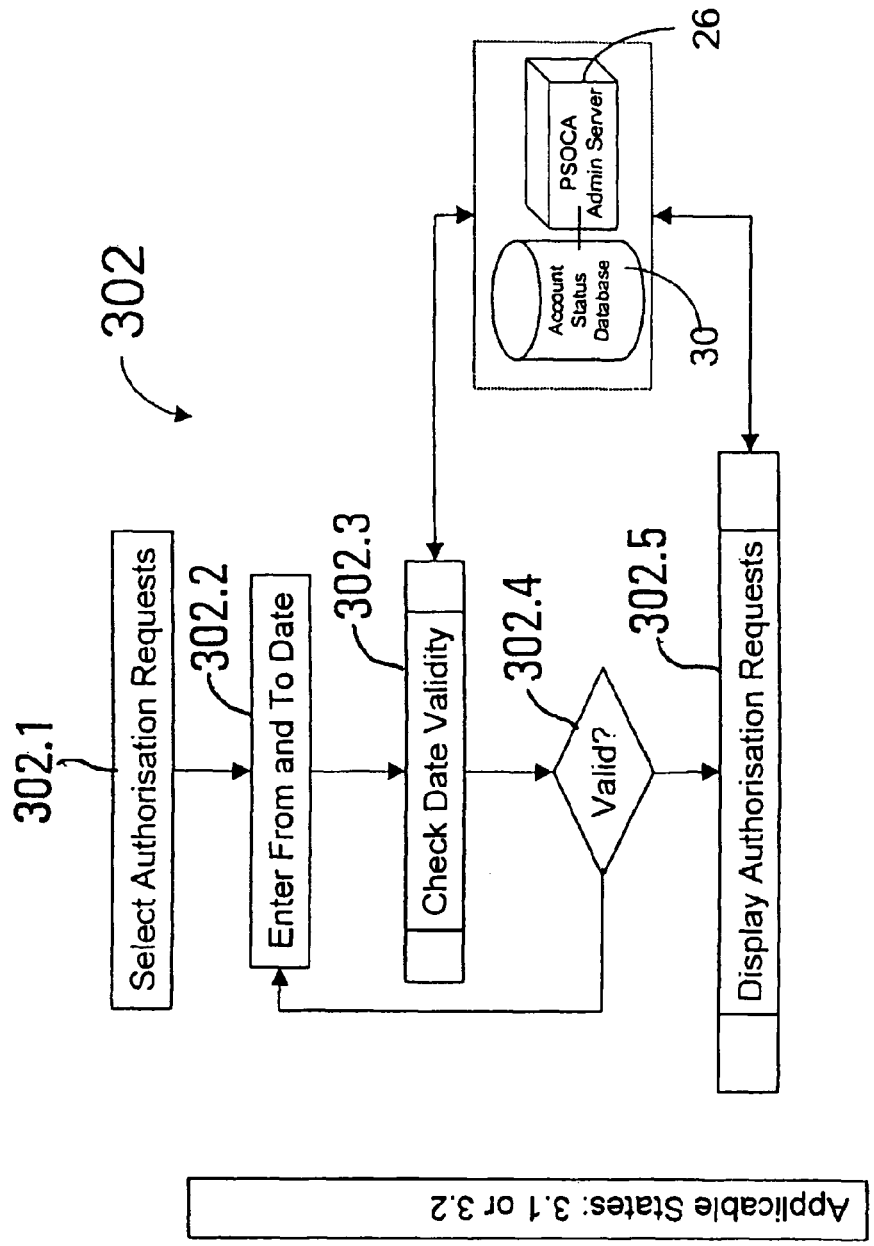

Figure 35 : User Interface - PSOCA - Select authorisation requests period
This figure shows how the statements may be presented in a separate user interface to the account holder. The account holder may select the period of a statement via a device similar to 304.
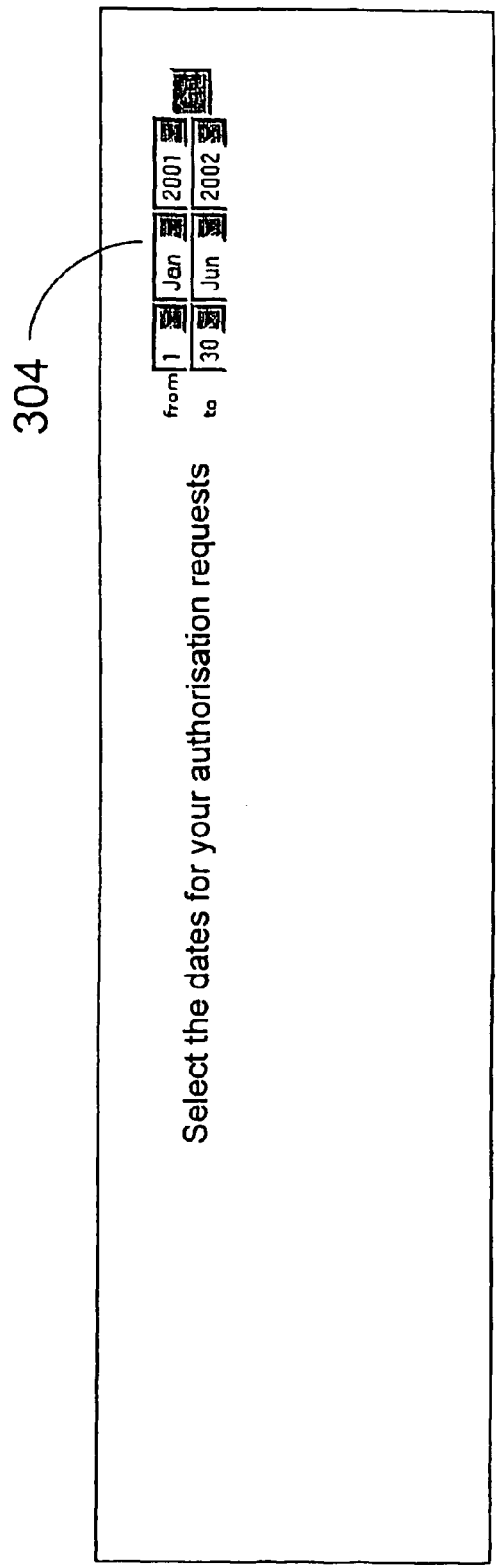
Select the dates for your authorisation requests

Figure 36 : User Interface - PSOCA - Authorisation requests

This figure shows how the statements may be presented in a separate user interface to the account holder. An example of a statement after successful completion of process 302 is depicted.

304.1

PSOCA Authorisation Requests for Aldous Huxley -  From: 1 Jan 2001
 To: 30 Jun 2002

| Request Date | Request Time | Merchant | Amount | | | | |
|---|---|---|---|---|---|---|---|
| 2001-06-01 | 11:10 | kalahari.net | R 203.49 | Yes | Yes | Yes | Yes |
| 2001-06-10 | 20:35 | New York Times | US$ 75.00 | Yes | Yes | Yes | Yes |
| 2001-06-12 | 22:34 | Adultcheck | US$ 77.00 | No | No | No | No |
| 2001-06-13 | 17:30 | Motorstation Atlanta | US$ 110.00 | No | No | No | No |
| 2001-06-13 | 17:31 | Motorstation Atlanta | US$ 110.00 | No | No | No | No |
| 2001-06-13 | 17:33 | Motorstation Atlanta | US$ 110.00 | No | No | No | No |
| 2001-06-13 | 17:37 | Motorstation Atlanta | US$ 110.00 | No | No | No | No |
| 2001-06-13 | 17:50 | Motorstation Atlanta | US$ 110.00 | No | No | No | No |
| 2001-06-13 | 19:44 | Ashford.com | US$ 1369.00 | Yes | Yes | Yes | Yes |
| 2002-01-30 | 17:36 | | | | | | |

Figure 37.: P – Activation Log Retrieval
The process "Activation Log Retrieval" 303 in more detail. The transaction notes may be stored in the Account Status Database 30.
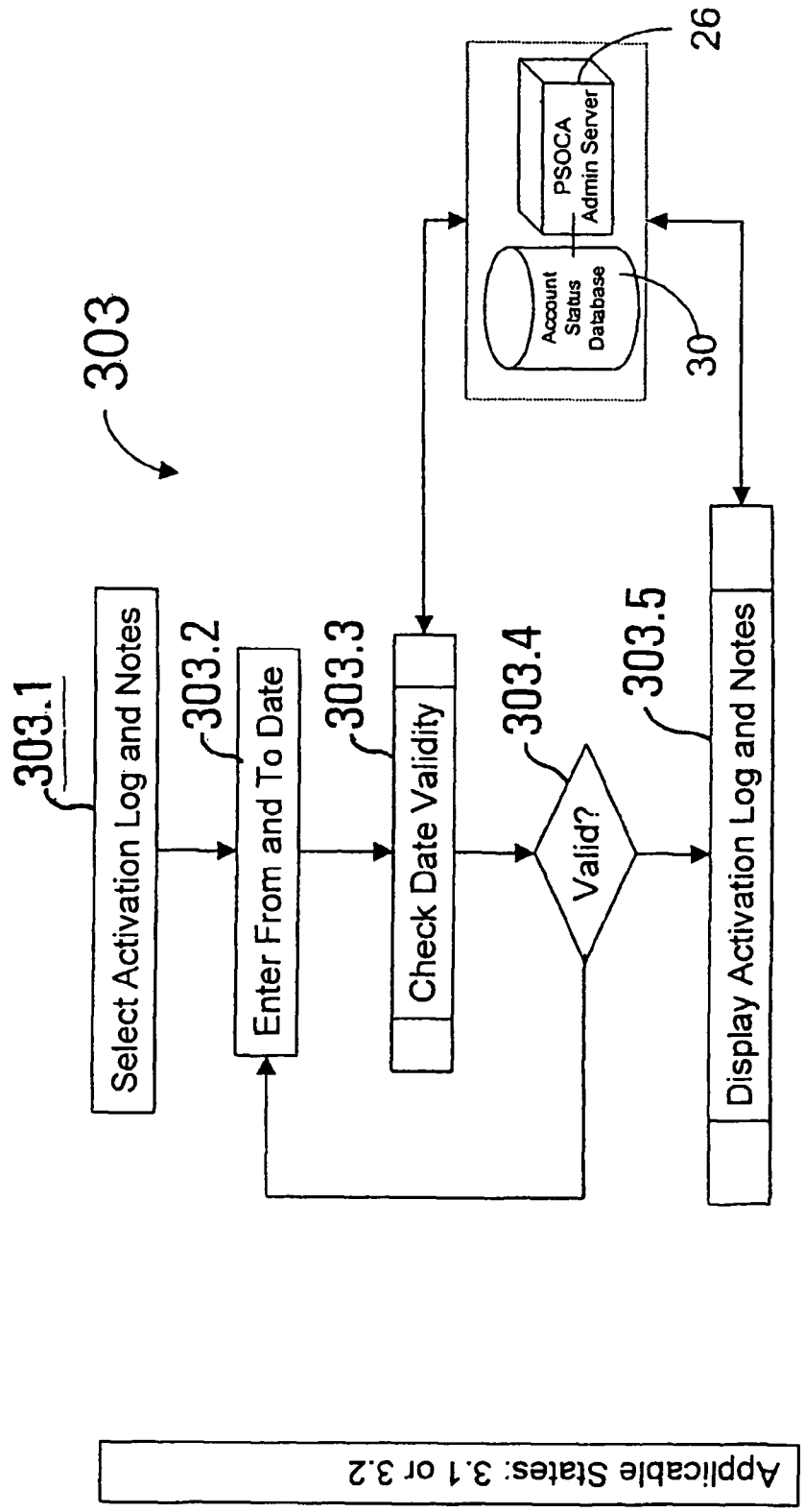

Figure 38 : User Interface - PSOCA - Select activation log period
This figure shows how the statements may be presented in a separate user interface to the account holder. The account holder may select the period of a statement via a device similar to 304.
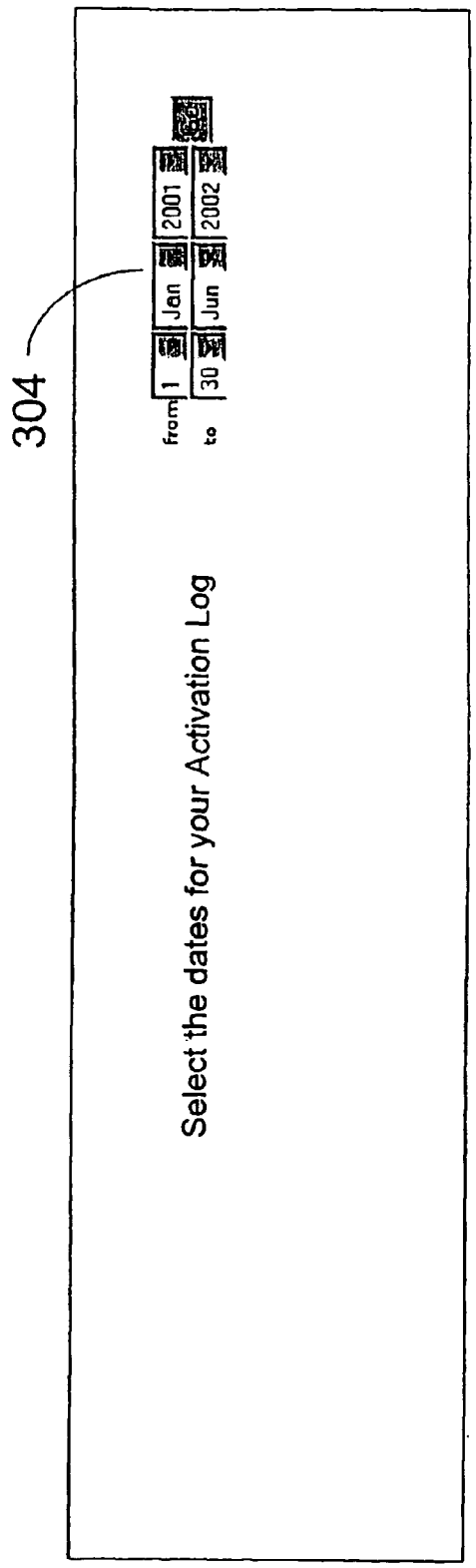

Figure 39 : User Interface - PSOCA - Activation log

This figure shows how the statements may be presented in a separate user interface to the account holder. An example of a statement after successful completion of process 303 is depicted.

PSOCA Activation Log for Aldous Huxley -  From: 1 Jan 2001
To: 30 Jun 2002

304.1

| Date | Time Activated | Time De-activated | Duration | Click to View Notes | Notes |
|---|---|---|---|---|---|
| 23-Nov-01 | 11:02 | 11:05 | 3 mins | 🗒 | Yes |
| 1-Dec-01 | 17:25 | 17:26 | 1 min | | No |

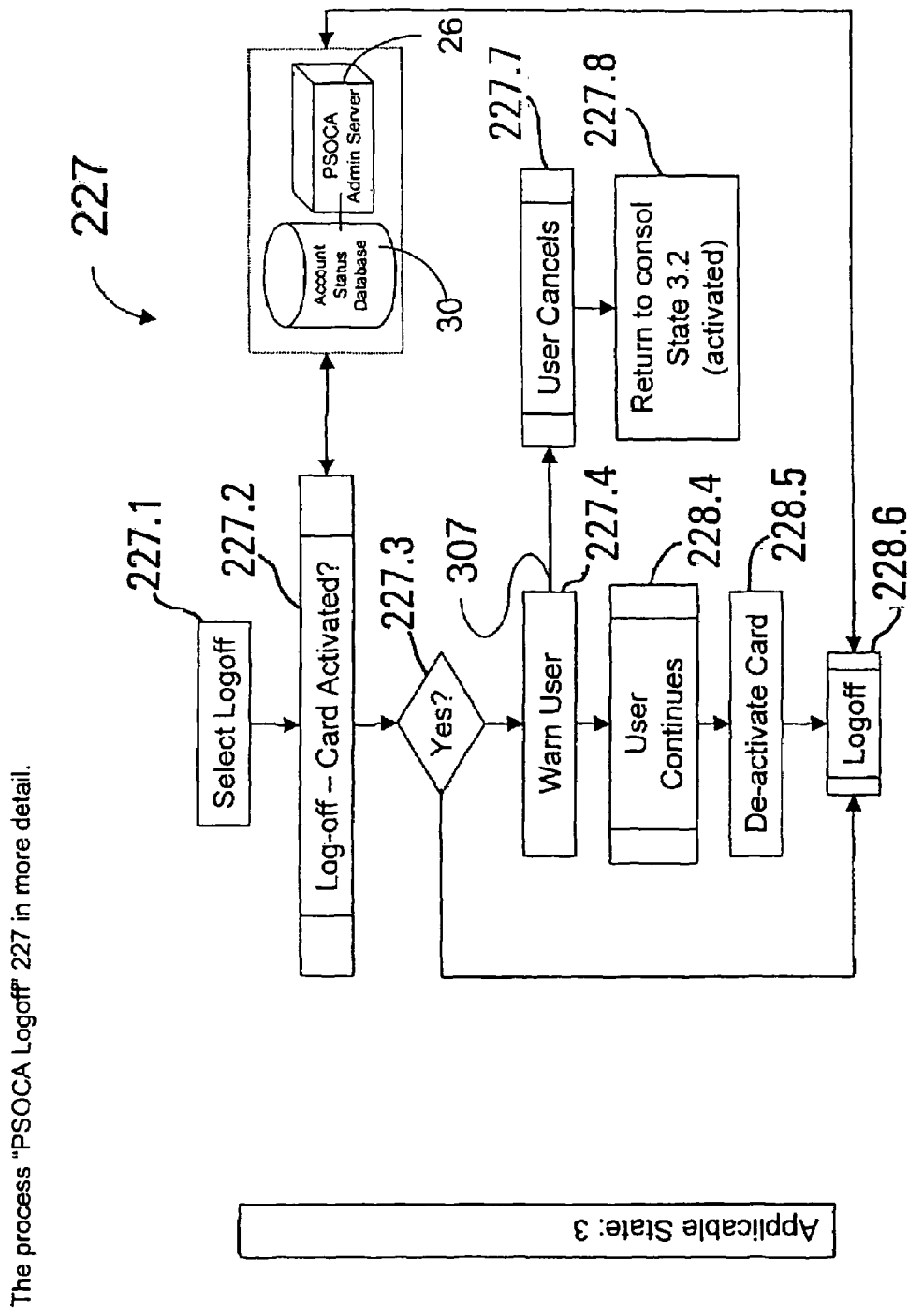
Figure 40 : R - PSOCA Logoff
The process "PSOCA Logoff" 227 in more detail.

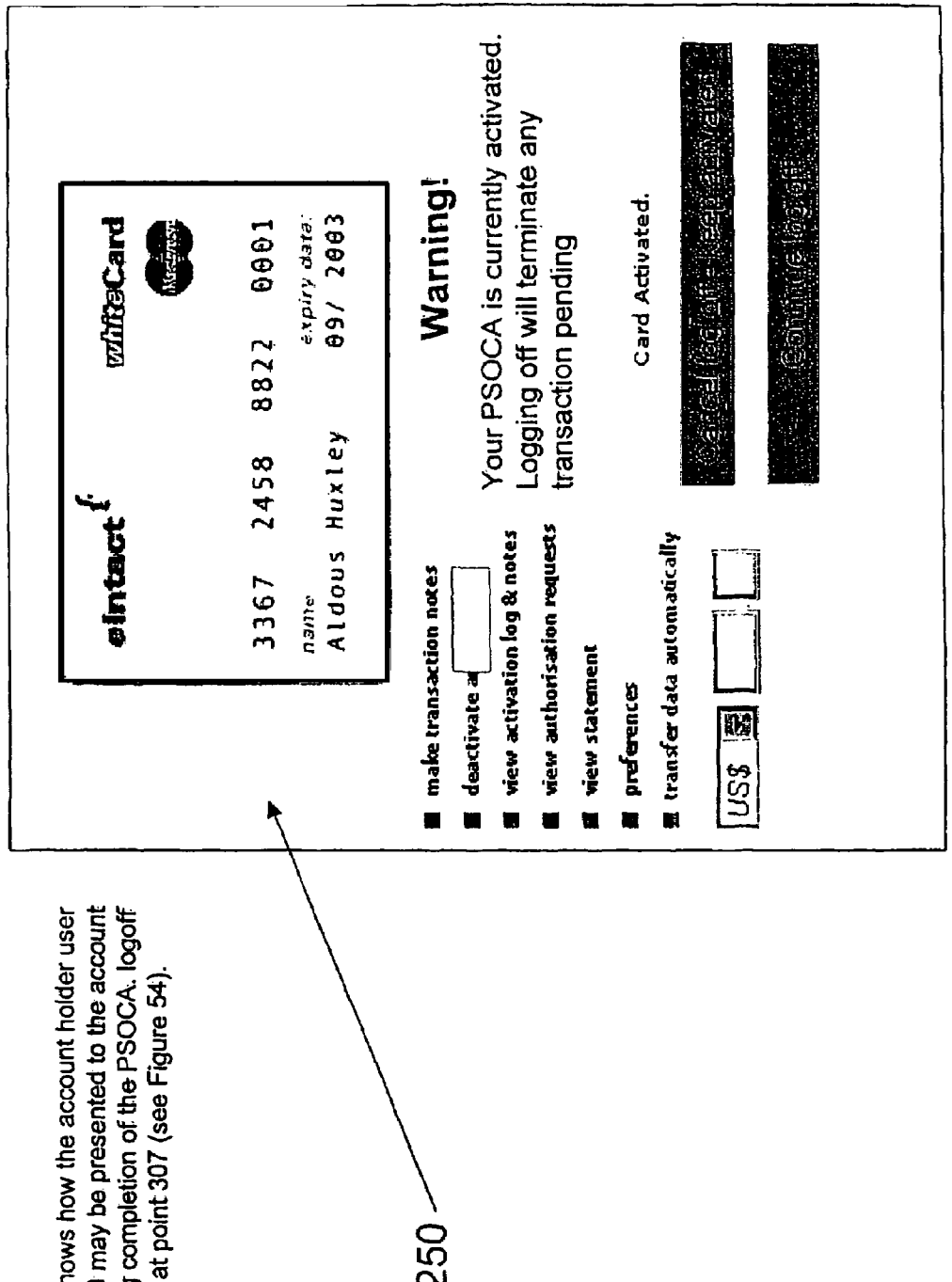
Figure 41: User Interface - PSOCA - Logoff
This figure shows how the account holder user interface 250 may be presented to the account holder during completion of the PSOCA: logoff process 227 at point 307 (see Figure 54).

Figure 42.: F - Timeout Management – Login/Logoff
The process "PSOCA Timeout Management - Logoff" 223 in more detail.
Figure 25 shows how the account holder login interface 240 may be presented to the account holder after completion of the PSOCA logoff process 227.
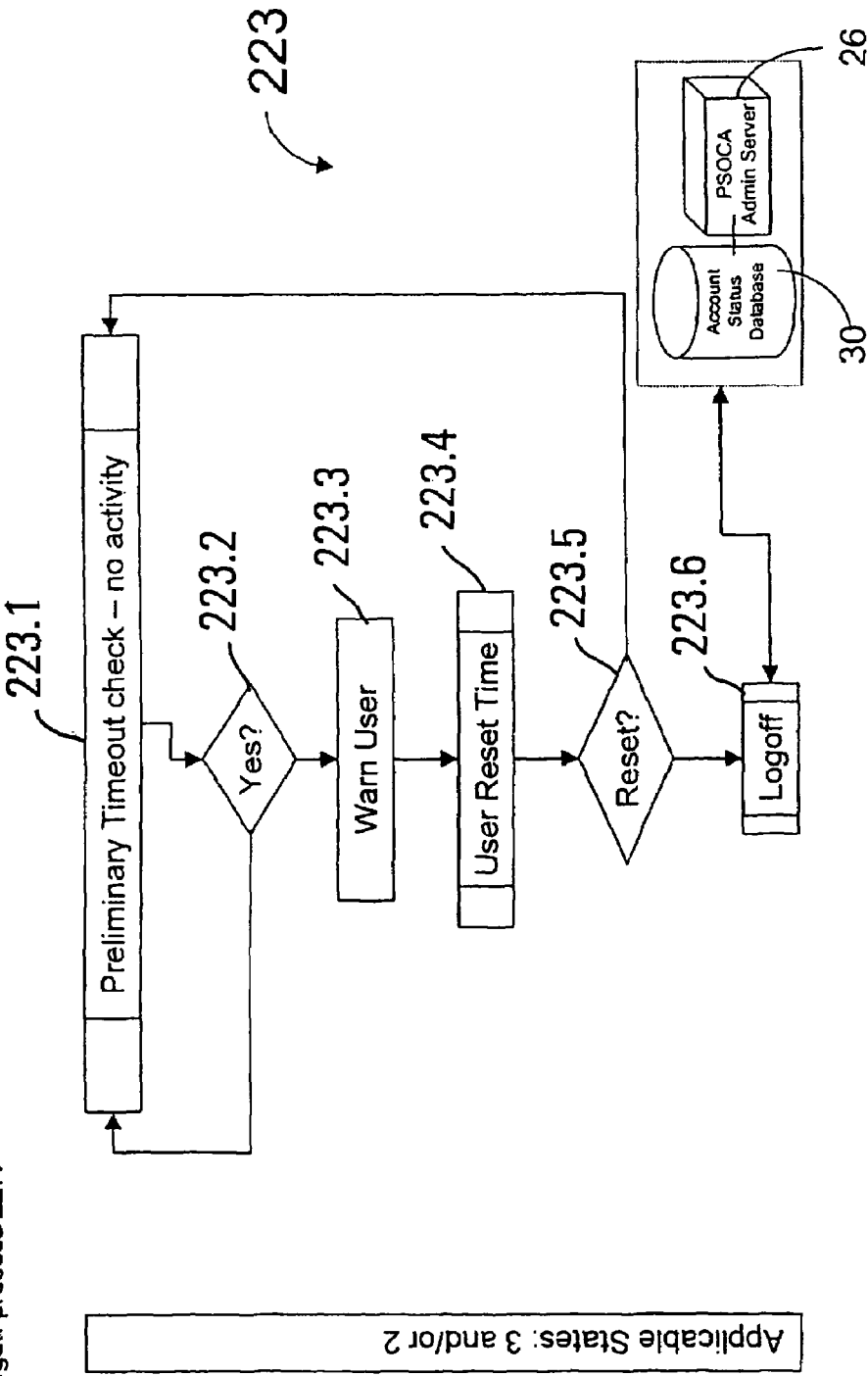

Figure 43: Overview - PSOCA Activation Process

This figure gives an overview over the PSOCA activation process 260. This process describes changing the status of the PSOCA from state 3.1 "logged in and deactivated 216" to state 3.2 "logged in and activated 217", and vice versa. Once the PSOCA is in "state 3.1: deactivated", process 262 may activate the PSOCA with process 261 regulating activation error management.

After the PSOCA has been successfully activated (state 3.2, 217), either an activation timeout process 264 may deactivate the PSOCA again, or the PSOCA may be deactivated automatically after the additional authorisation from the Account Status Database 30 has been obtained (265). There may also be a manual deactivation (not depicted).

Logoff from the activated card (227) results in "state 2: issued/ logged off" (212).

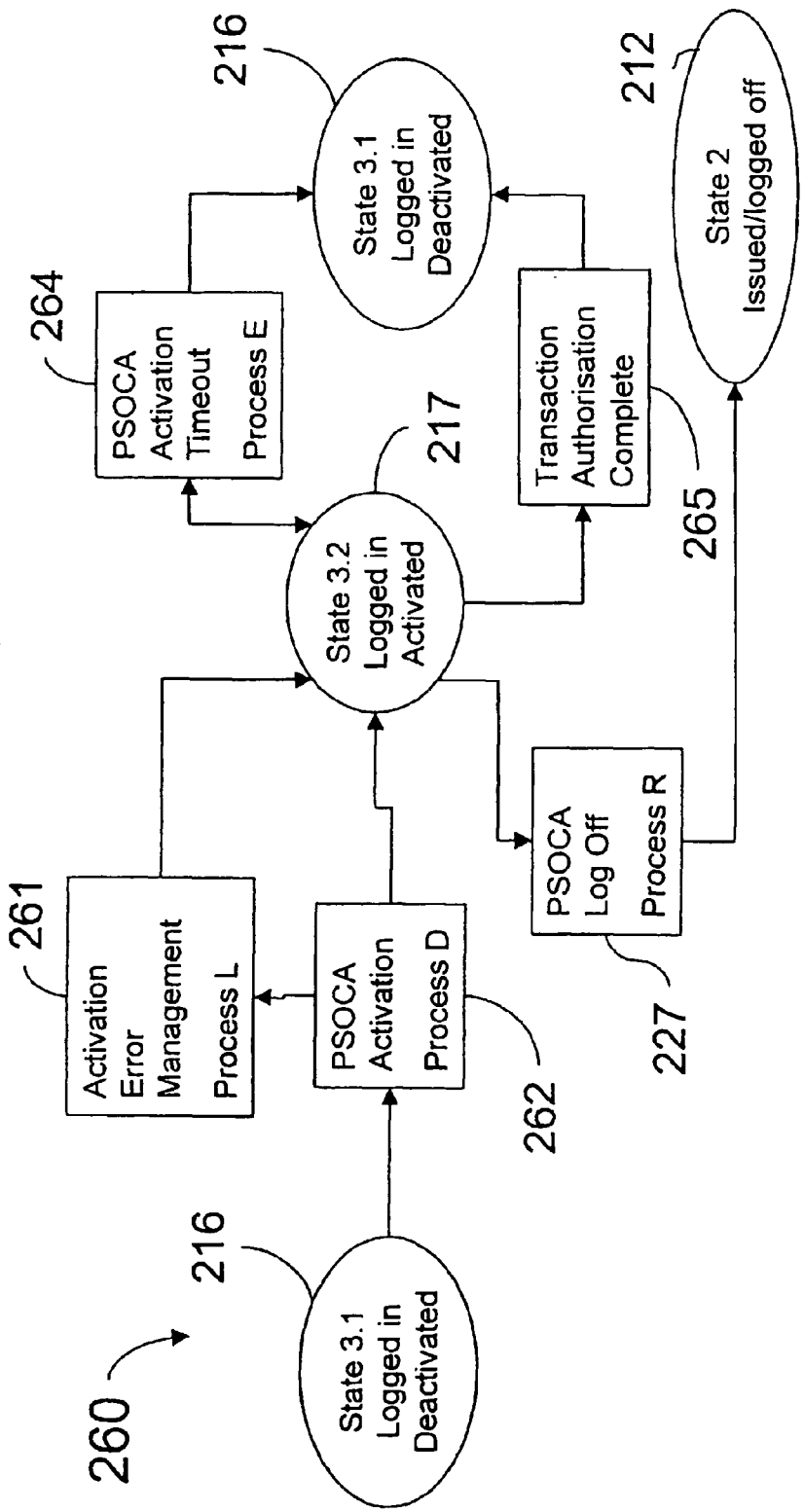

Figure 44 : User Interface - PSOCA - Login
This figure shows another example of an embodiment of the invention. Here the login user interface 240 is displayed in an Internet browser window (e.g. such as Netscape ™ or Microsoft Internet Explorer ™). The login user interface is superimposed over a merchant's payment Internet page, displayed in a separate browser window.
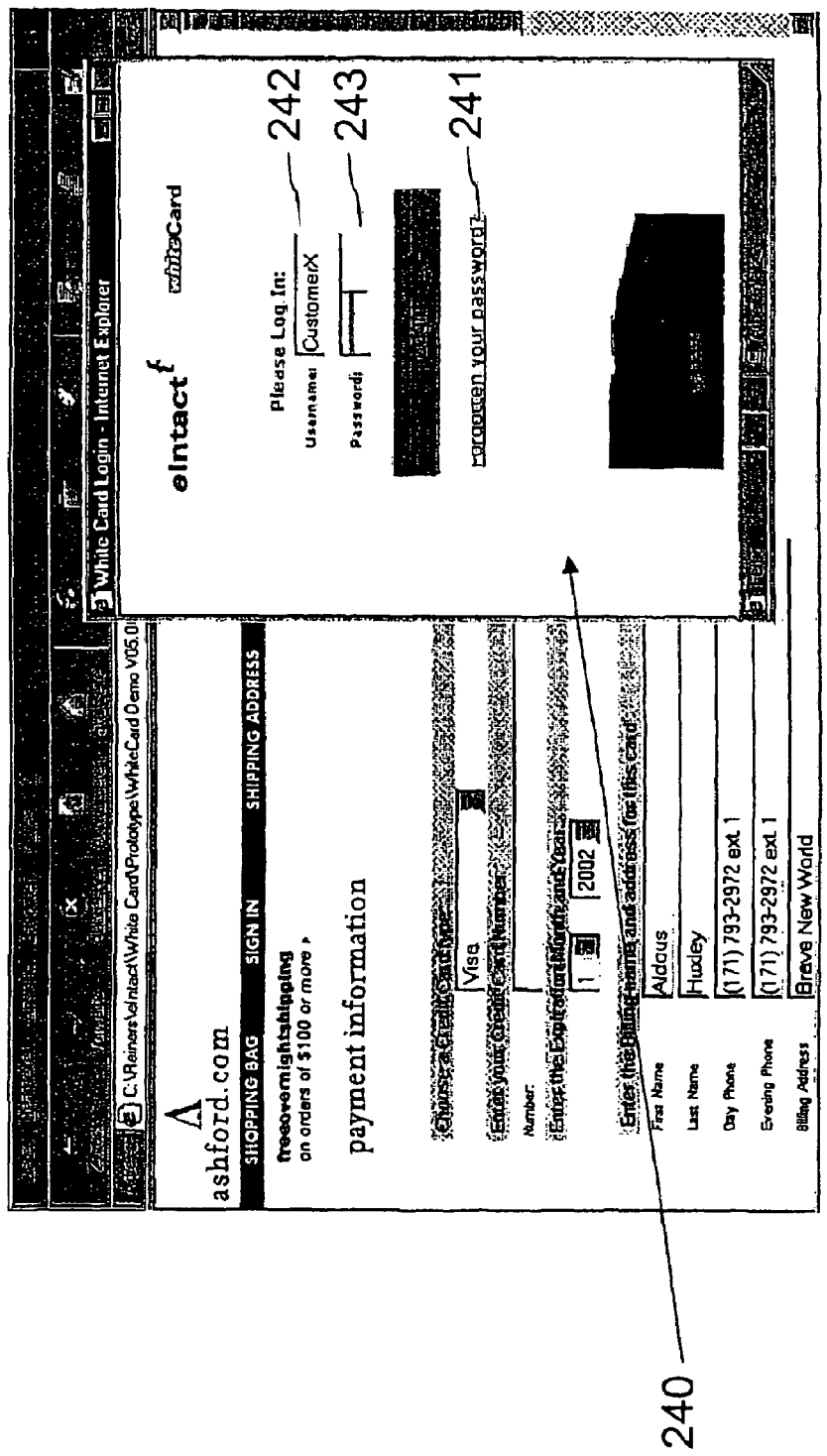

Figure 45 : User Interface - PSOCA Login – Deactivated Card ready to activate

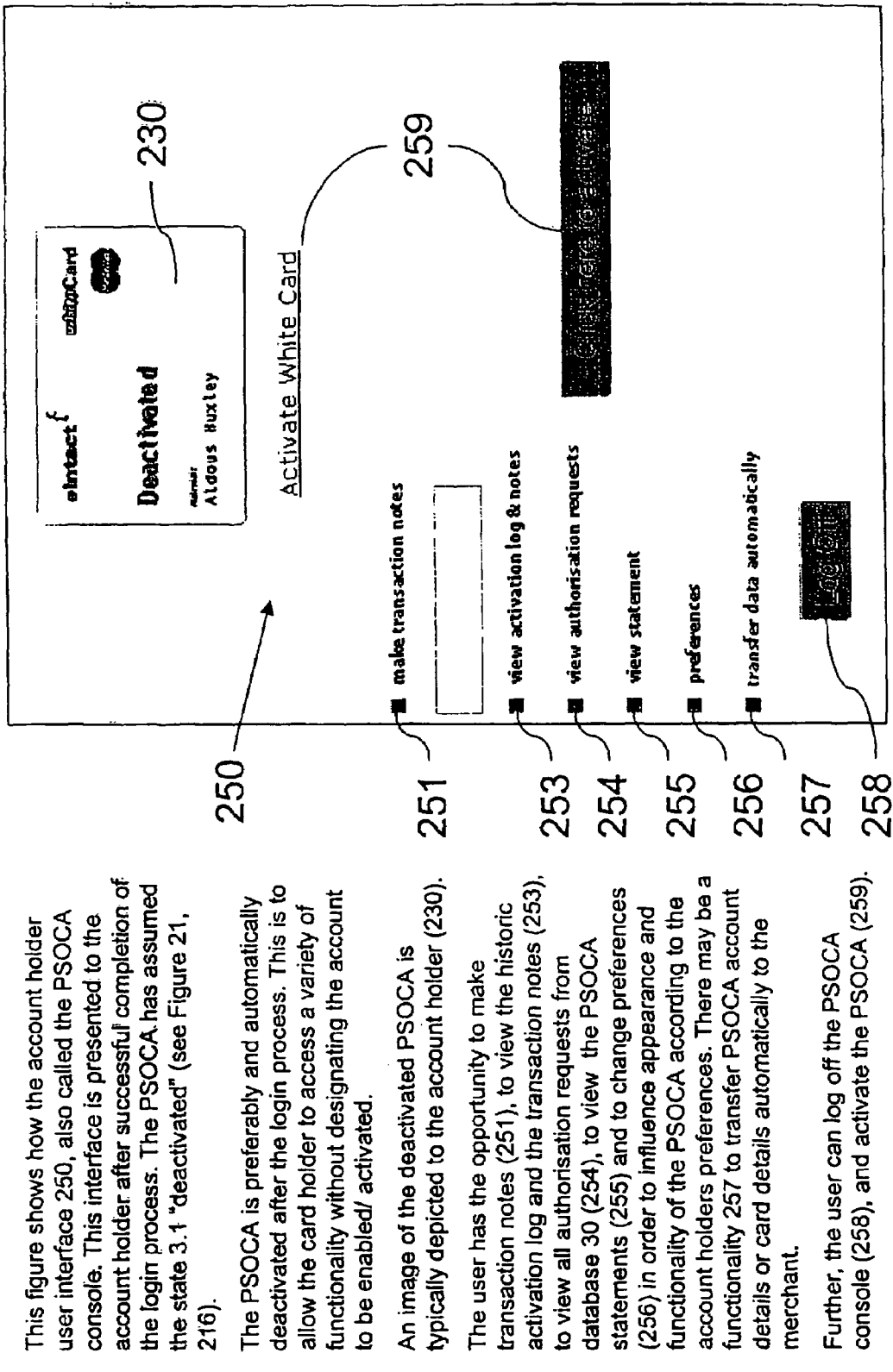

This figure shows how the account holder user interface 250, also called the PSOCA console. This interface is presented to the account holder after successful completion of the login process. The PSOCA has assumed the state 3.1 "deactivated" (see Figure 21, 216).

The PSOCA is preferably and automatically deactivated after the login process. This is to allow the card holder to access a variety of functionality without designating the account to be enabled/ activated.

An image of the deactivated PSOCA is typically depicted to the account holder (230).

The user has the opportunity to make transaction notes (251), to view the historic activation log and the transaction notes (253), to view all authorisation requests from database 30 (254), to view the PSOCA statements (255) and to change preferences (256) in order to influence appearance and functionality of the PSOCA according to the account holders preferences. There may be a functionality 257 to transfer PSOCA account details or card details automatically to the merchant.

Further, the user can log off the PSOCA console (258), and activate the PSOCA (259).

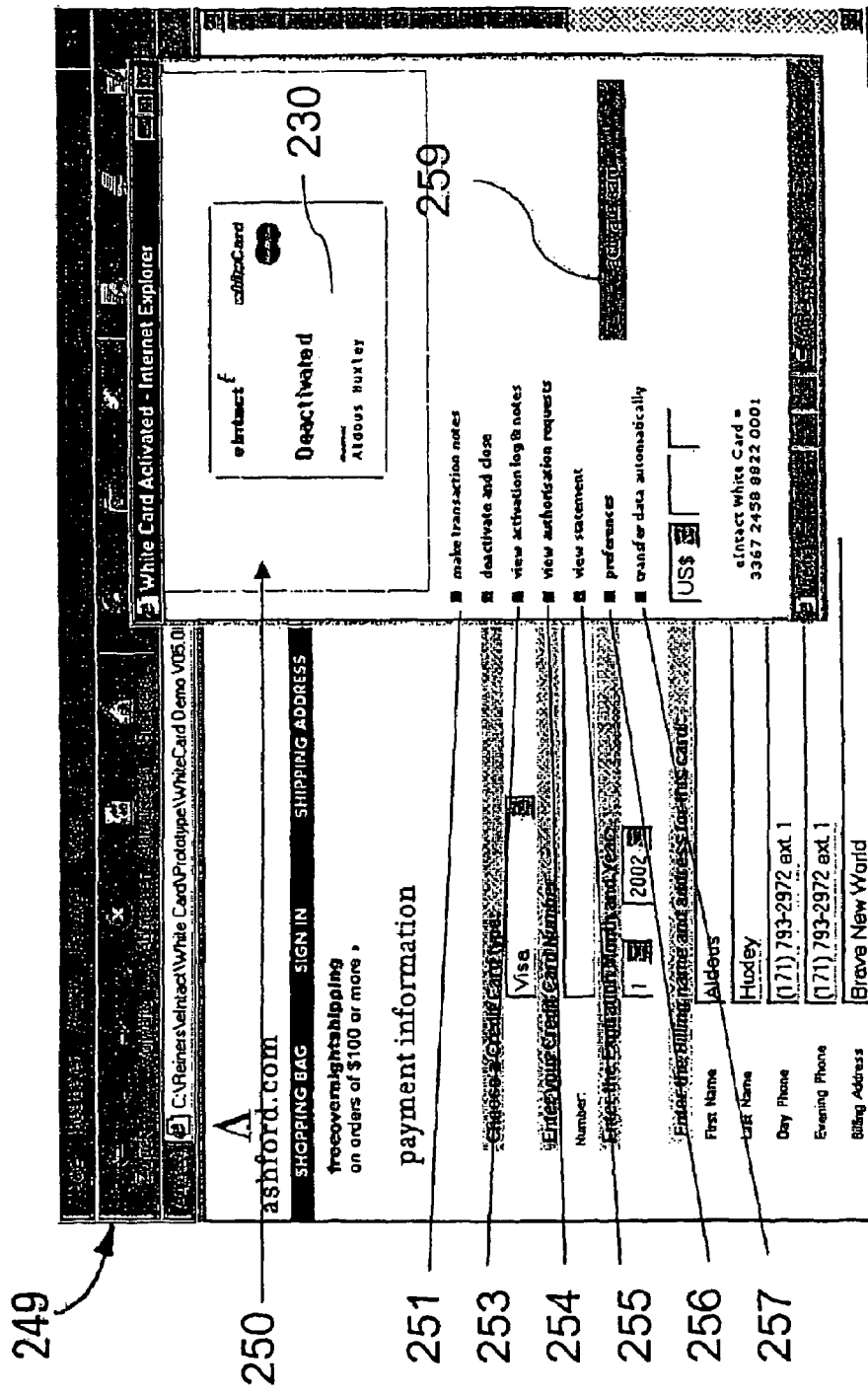
Figure 46: User Interface - PSOCA - Deactivated card
This figure shows another example of an embodiment of the invention. Here the PSOCA user interface 250 is displayed in an Internet browser window (e.g. such as Netscape ™ or Microsoft Internet Explorer ™). The user interface is superimposed over a merchant's payment Internet page, displayed in a separate browser window.

Figure 47 : User Interface - PSOCA - Activated card

This figure shows how the account holder user interface 250 (or PSOCA console) may be presented to the account holder after successful completion of the activation process 262. The PSOCA has assumed the state 3.2 "activated" (see Figure 21, 217).

An image of the activated PSOCA is typically depicted to the account holder (231). It contains all account details necessary for a transaction, such as e.g. account number, debit card number or credit card number 232, name of the account holder 233 and expiry date of the card 234. A variety of other information may be depicted on the card.

By means of pictures 230 and 231 the account holder can clearly and visually distinguish between the PSOCA in deactivated state 3.1 and activated state 3.2.

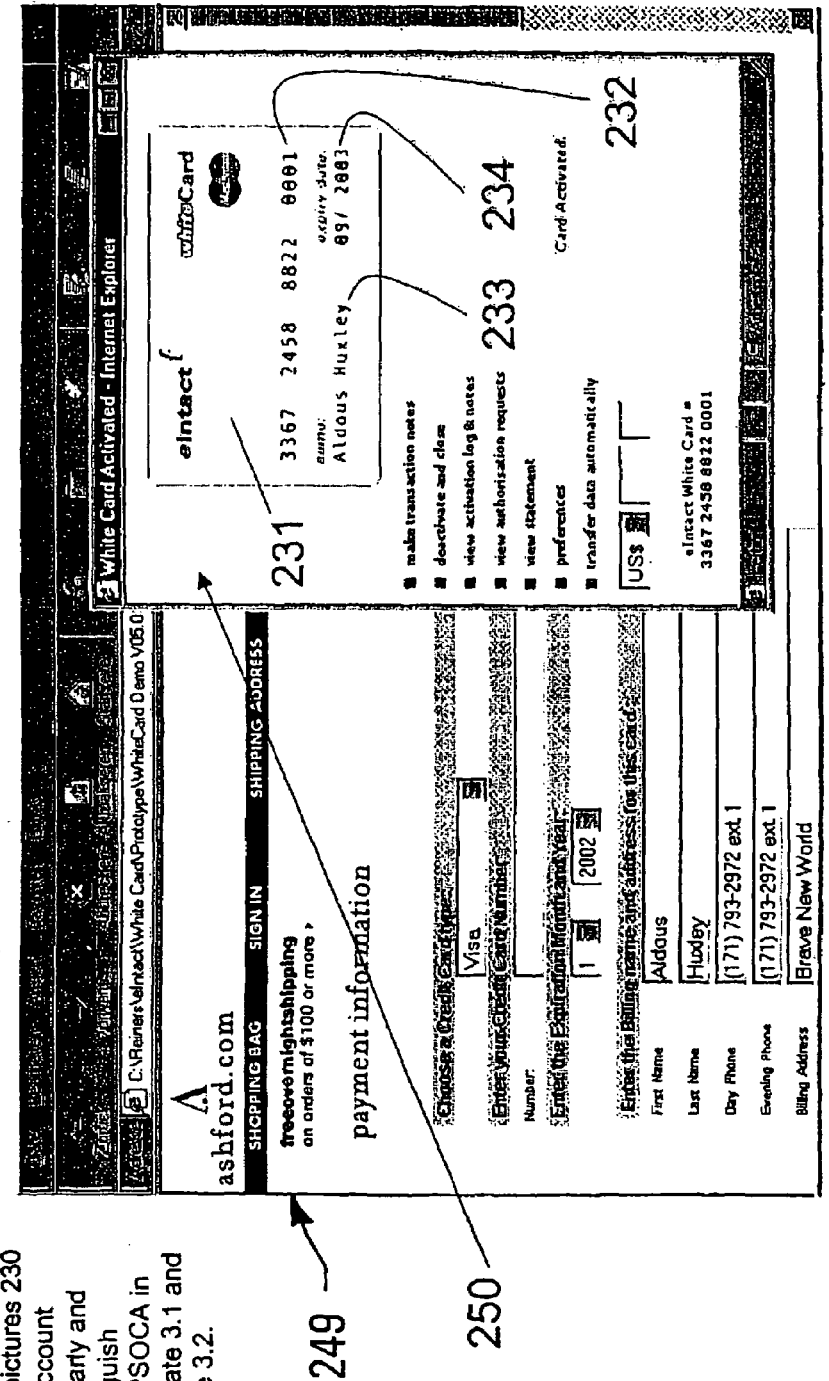

Figure 48: User Interface - PSOCA - Pre-specified amount to be authorised

Instead or in addition, the PSOCA may be activated by the account holder for a pre-specified amount. The account holder may specify this amount via a device 235 before activating the PSOCA via the device 259. The pre-specified amount 236 may be stored in the Account Status Database 30.

When the bank is interrogating the Account Status Database for additional authorisation (i.e. whether the PSOCA is in activated state or in deactivated state), the pre-specified amount 236 may in addition be transmitted to the bank. The bank may base its decision, whether to finally authorise a transaction to a merchant or not, in addition to the activated-deactivated information, also on the difference between the pre-specified amount 236 and the amount, which the merchant is seeking authorisation for.

Typically the bank would allow a window of tolerance, to account for minor deviation, as this may occur for instance due to exchange rates, or the like.

Figure 49 : User Interface - PSOCA - Activated card timeout warning
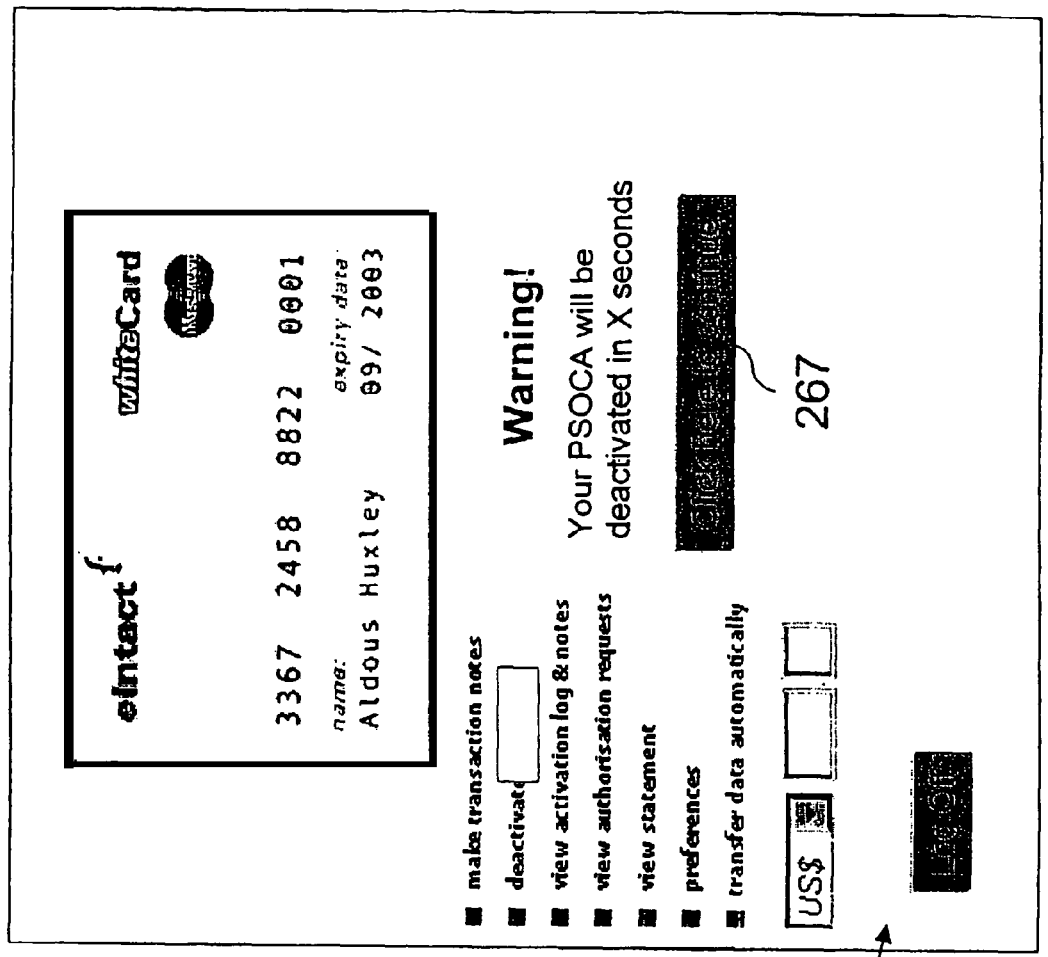
This figure shows the account holder user interface 250 while performing the activation timeout process 264.
The user for instance may be prompted to press button 267 to avoid timeout continue the session with the PSOCA activated.

Figure 50: User Interface - PSOCA - Activated card timeout - reset limit exceeded
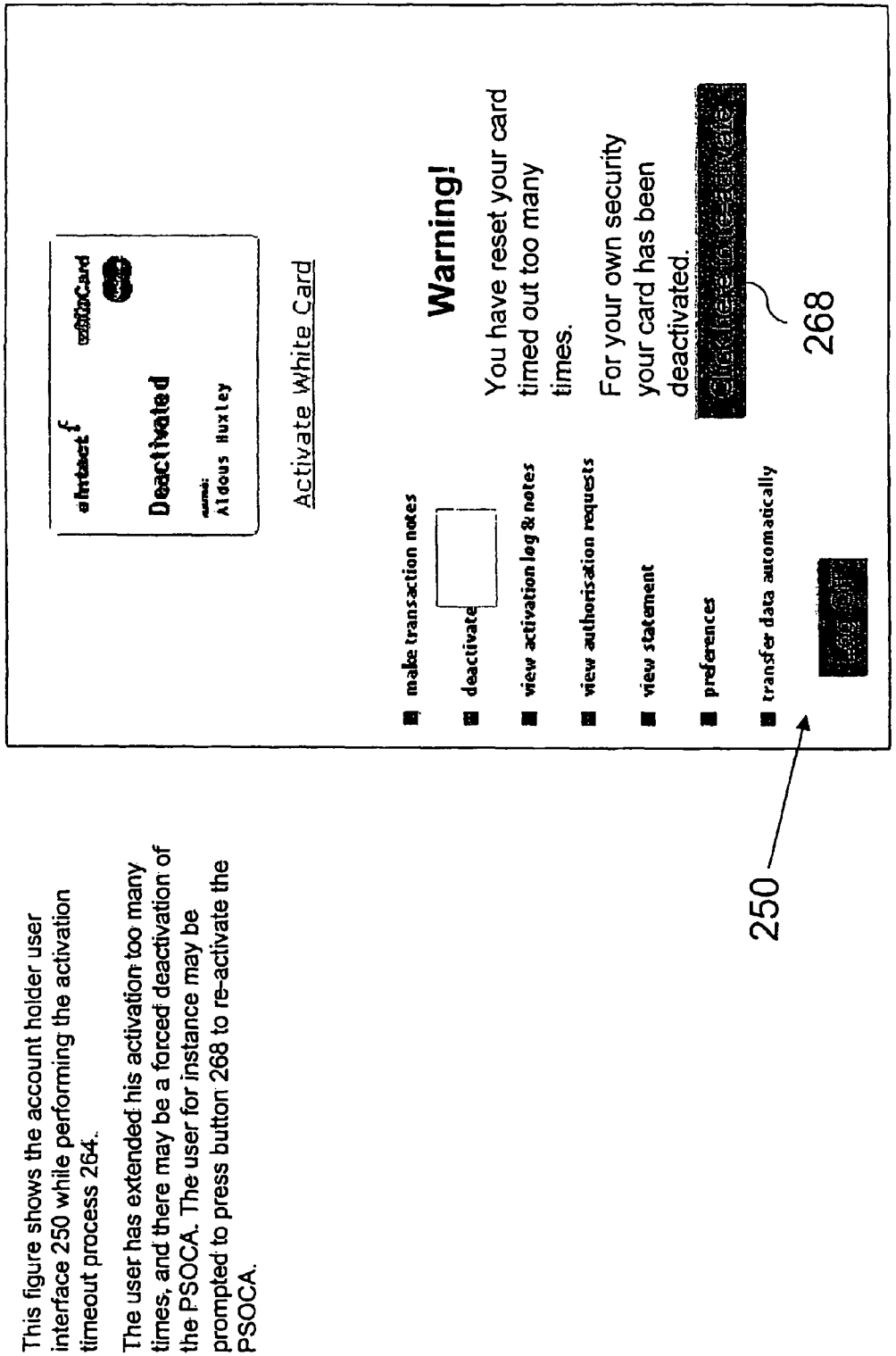
This figure shows the account holder user interface 250 while performing the activation timeout process 264.
The user has extended his activation too many times, and there may be a forced deactivation of the PSOCA. The user for instance may be prompted to press button 268 to re-activate the PSOCA.

Figure 51: User Interface - PSOCA - Deactivated card after time out deactivation
This figure shows the account holder user interface 250 while performing the activation timeout process 264.
The PSOCA has timed out, and a forced deactivation of the PSOCA has occurred. The user for instance may be prompted to press button 269 to re-activate the PSOCA.
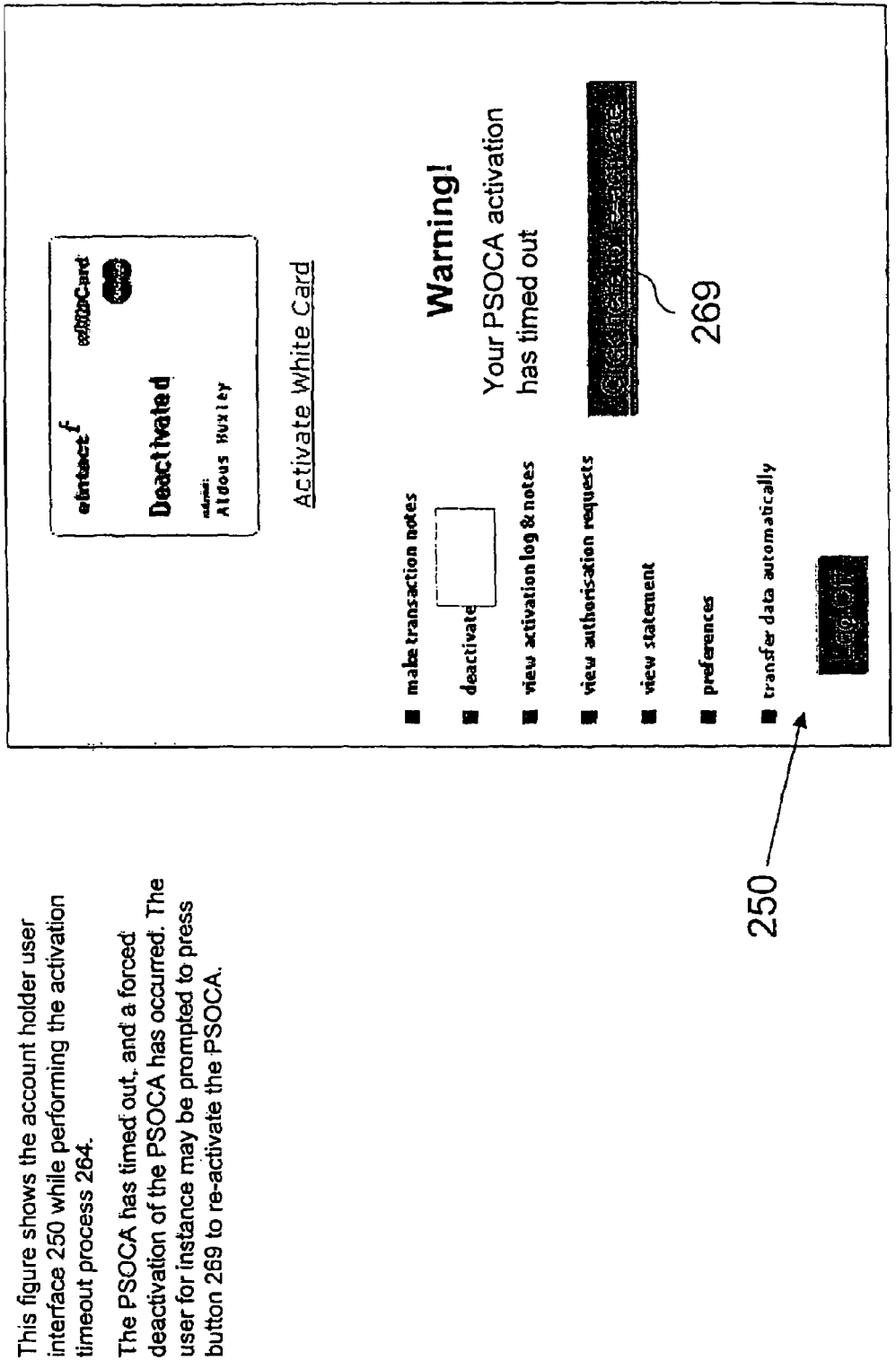

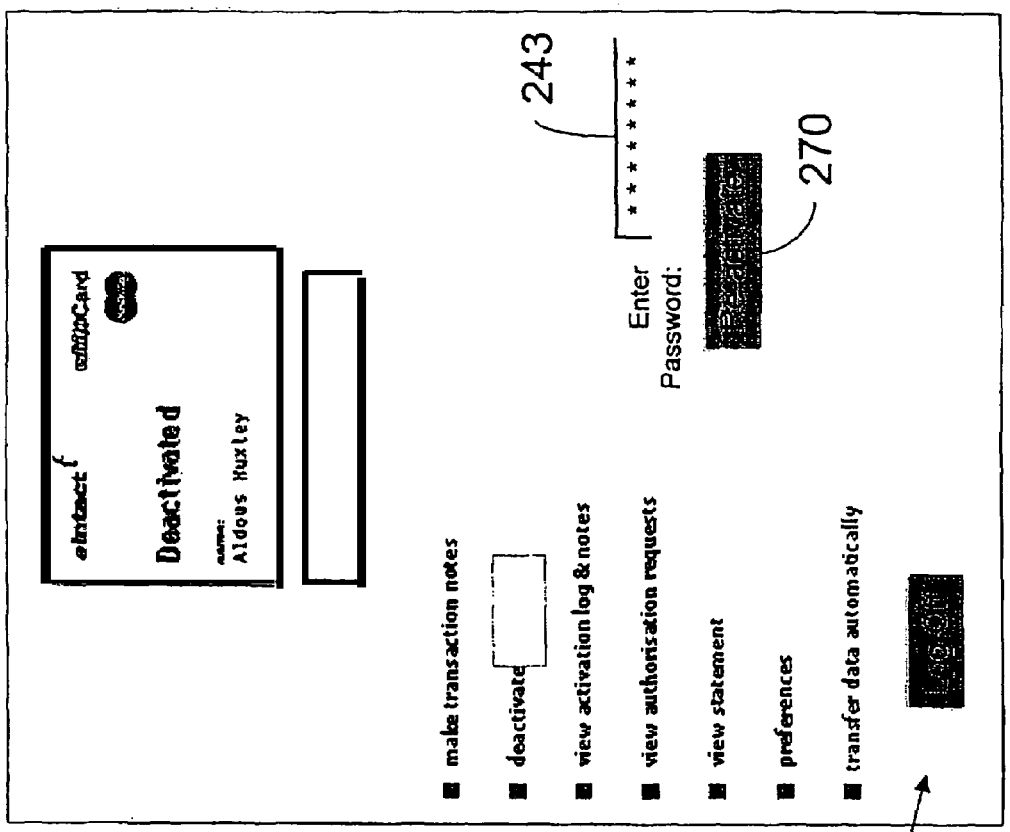

Figure 52: User Interface - PSOCA - Activation process after time out deactivation This figure shows the account holder user interface 250 while performing the activation timeout process 264.

The PSOCA has timed out, or the user has extended his activation too many times, and a forced deactivation of the PSOCA has occurred.

The user for instance may be prompted to press button 270 and enter password 243 to re-activate the PSOCA.

Figure 53: User Interface - PSOCA - Automatic deactivation after additional authorisation interrogation This figure shows how the account holder user interface 250 (or PSOCA console) may be presented to the account holder after successful completion of the additional authorisation interrogation process 280. The PSOCA may automatically assumed the state 3.1 "deactivated" (see Figure 21, 216). A message like for instance message 237 may be given to the card holder.

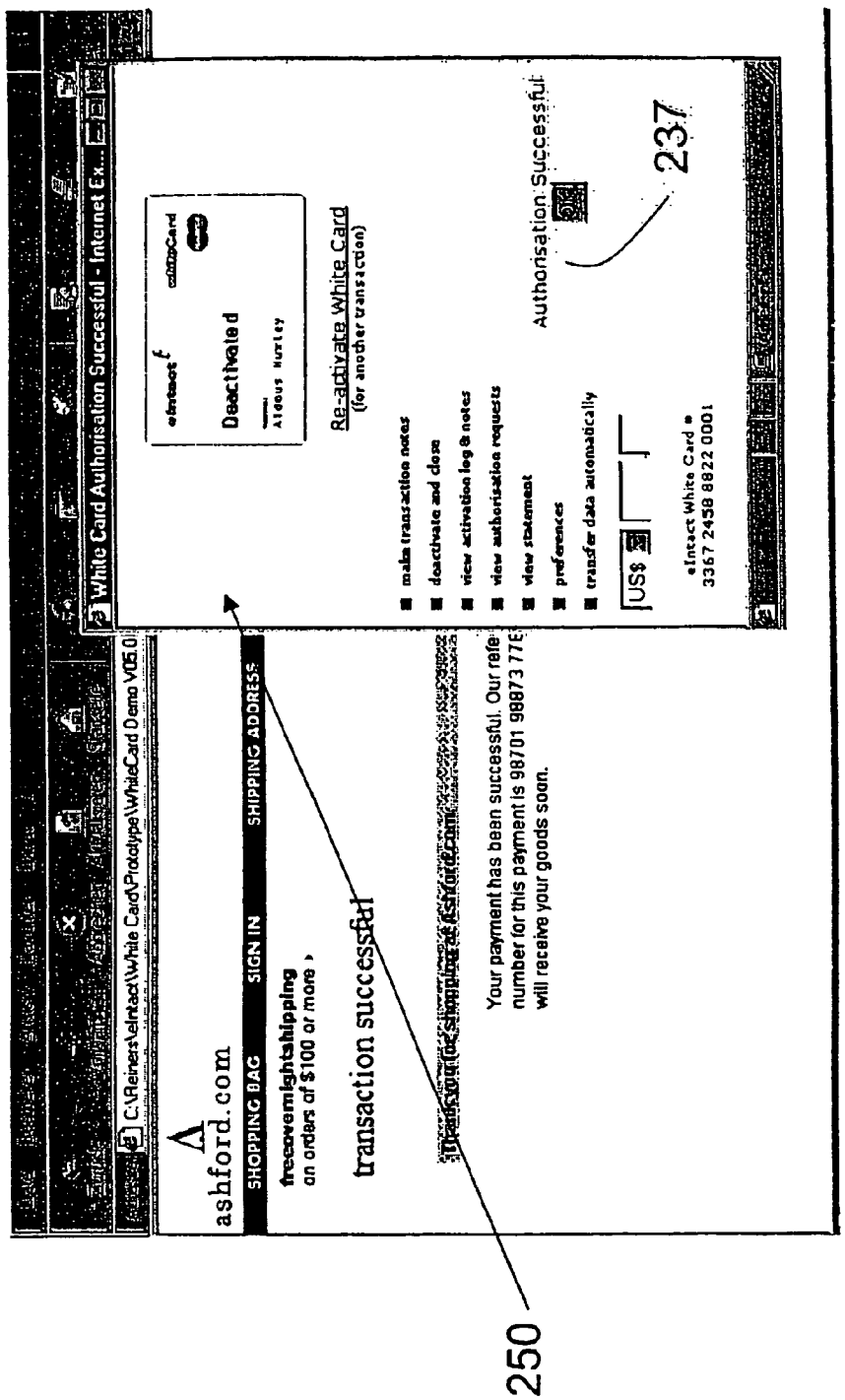

Figure 54 : User Interface - PSOCA - Make transaction notes
This figure shows how the account holder user interface 250 may be presented to the account holder after successful completion of the make transaction notes process 291.
Among others, there may be data entry fields for date 292, time 293, amount and currency 294, merchant 295 and other notes 296.
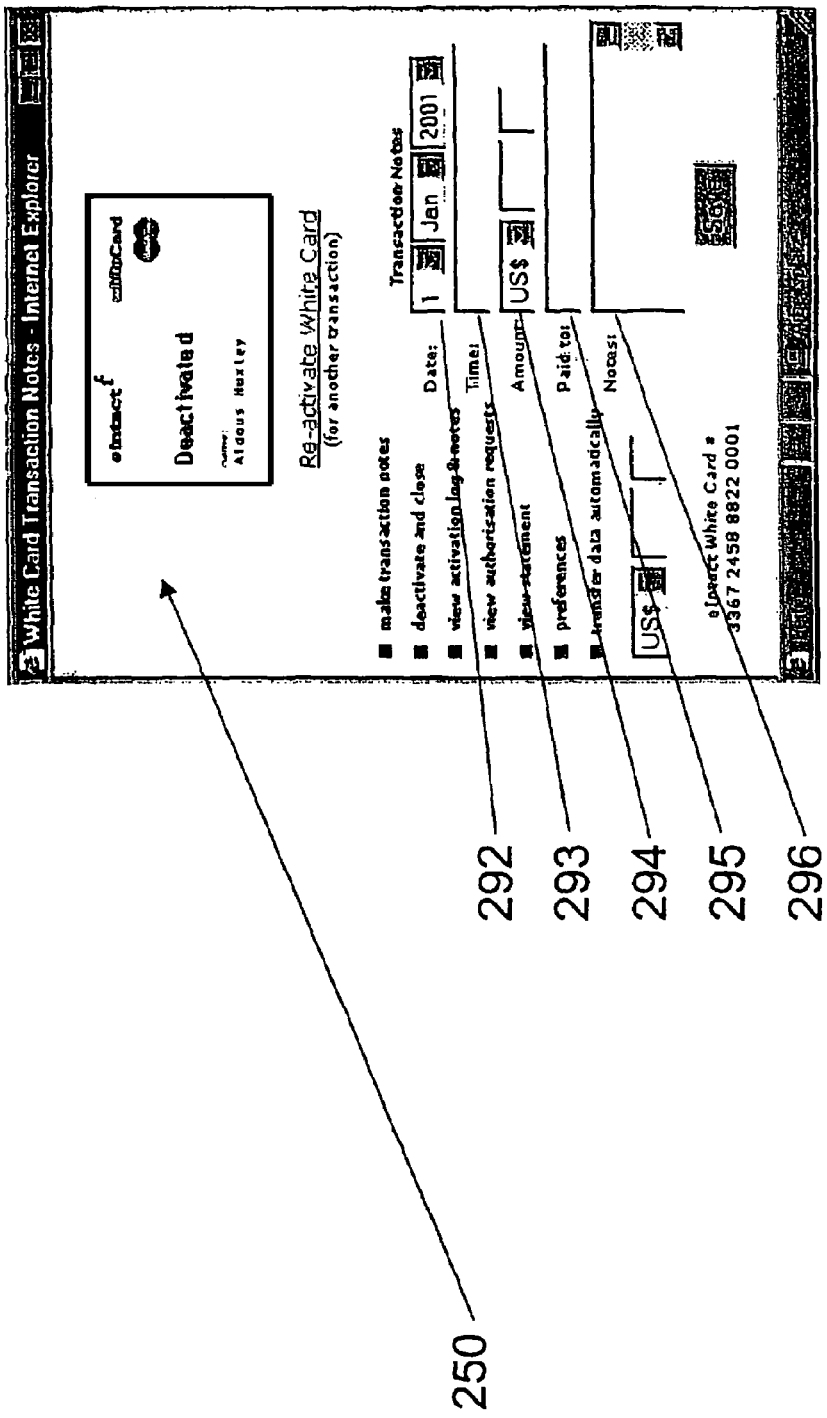

Figure 55: Applying PSOCA in today's credit/debit card environment for customer-not-present transactions The best method of performing the invention may be in the context of existing card associations' infrastructure, business rules and client network, such as MasterCard International or Visa. At the point when a card issuer 204 receives an authorisation request for a customer-not-present transaction from a merchant 201 via the card associations' networks 203, the Account Status Database (ASD) 30 is interrogated, whether the card holder has designated his/her account as "activated" via the network thin-client 22 (e.g. web browser). The PSOCA Administration Server (PAS) 26 displays the Accountholder Interface 205.

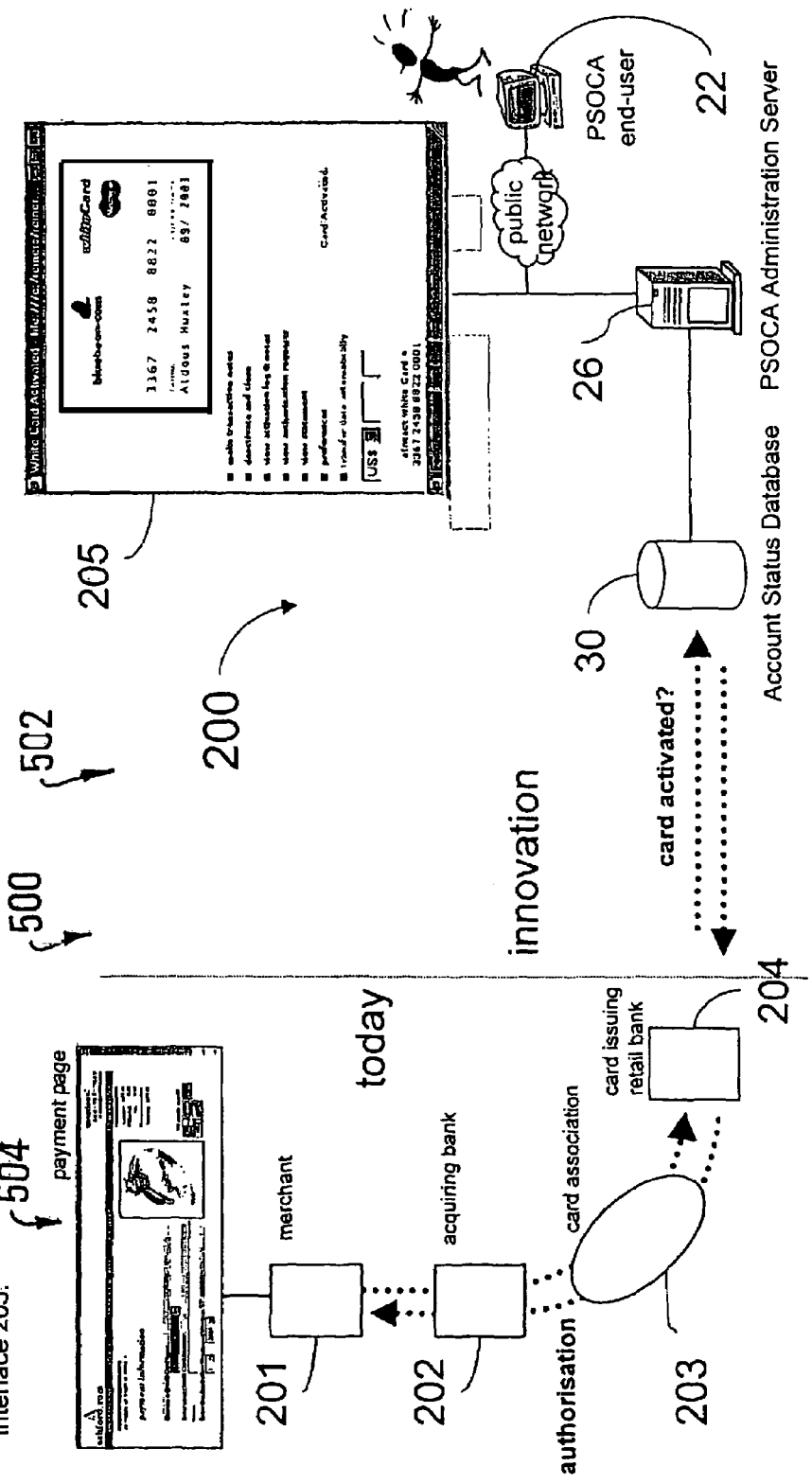

TRANSACTION AUTHORISATION SYSTEM

THIS INVENTION relates to data processing. More particularly, this invention relates to a transaction authorisation system, to a computer program on a carrier for causing a computer to execute transaction authorisations, and to a method of authorising a transaction.

The unauthorised fraudulent use of bank account details is an ever increasing problem. Typically, acquired bank account details are used to conduct illegal transactions without the authorisation of an account holder. This is particularly prevalent in the light of Internet based transactions, or other transactions where a physical signature is not required, or possible, such as those initiated by Internet devices (e.g. personal computers and browser), mobile devices (e.g. mobile telephone, personal digital assistant (PDA), handheld computer devices) interactive television (iTV) or by telephone. In such cases, typically only the bank account details, such as a credit or debit card number, are required to authorise a transaction. Thus, once account details have been acquired, either by copying the details off a physical card, say in a restaurant, or by hacking into a database of an institution, these details can be illegally used, for any transaction not requiring a physical signature.

It is an object of the present invention to provide means and a method which the Inventors believe will alleviate this problem.

The invention finds substantially utility in "customer-not-present" Internet transactions. However, the invention may be used in any transactions in which presenting a physical signature is not required or possible, for example, transactions in which mobile communication devices are used, such as mobile telephones, PDA, handheld computers, or the like.

Broadly, according to the invention, there is provided a data processing system which includes an account status database having a record of a status of at least one bank account, said status designating the bank account as either enabled or disabled;

an account holder interface connectable to the account status database which provides an account holder with an account status altering facility, for allowing the account holder to change the designated status of the bank account.

By "enabled" is meant, that transactions performed using the bank account are authorised, and by "disabled" is meant, that transactions performed using the bank account are unauthorised.

More particularly, according to the invention, there is provided a system which includes an account status database having a record of a status of at least one bank account, said status designating the bank account as either enabled or disabled;

an account holder interface connectable to the account status database which provides an account holder with an account status altering facility for allowing the account holder to change the designated status of the bank account.

Thus, the account status altering facility may be configured to allow the account holder selectively to enable or disable the bank account.

The system may include an authorisation interface connectable to the account status database for allowing an authorisation institution or facility to interrogate the account status database thereby to check said status of the bank account. Thus, the authorisation institution or facility may access and interrogate the account status database, via the authorisation interface, to check the status of the bank account and authorise a transaction performed using the bank account only if the account status database returns an "enabled" status for the particular bank account.

Conventionally, when a transaction is performed using a bank account in which the account holder purchases goods or services from a merchant, the merchant checks for authorisation from an authorisation institution or facility responsible for the account, before completing the transaction. The authorisation institution is typically in the form of a bank (e.g. the acquiring bank, the bank that manages the merchant's bank account, the card issuing bank that manages the account holder's bank account or credit card account), credit card associations and clearing houses (such as Visa™, Master Card International™ or American Express™), or in addition, the merchant itself, or any other authorised institution or facility that is authorising transactions. The authorisation institution or facility then authorises the transaction based on the credit limit or available funds or other data or rules associated with the bank account. However, in addition or instead in accordance with the invention, the authorisation institution or facility may access and/or interrogate the account status database to determine the status of the bank account, and only authorise the transaction if the account is designated as enabled. Thus, even if there are sufficient funds in the account, the transaction or request from the merchant is only allowed or authorised if the account has been enabled.

The account status altering facility may be configured to allow an account holder to specify that the account is to change status once a pre-selected condition has been met.

The pre-selected condition may be a specified time period. Thus, in one embodiment of the invention, the account status altering facility may be configured to allow an account holder to specify a specific time interval during which the bank account will be designated as enabled or disabled. Thus, for example, a client may enable his or her account for a preselected time interval e.g. 10 minutes, ½ hour, or the like, effect a transaction (e.g. via the Internet) to purchase goods, whereafter, the account may automatically revert to its disabled status.

Instead of, or in addition to a specified time, the pre-selected condition may be a predetermined event, for example, the interrogation of the account status database by an authorisation institution or facility. Thus, the account may be configured to allow an account holder to designate that the account is enabled for one transaction only, whereafter, the account will revert to its disabled status i.e. once the authorisation facility has interrogated the account status database.

Instead of, or in addition to, the account holder may pre-specify an amount for which the account holder intends to designate the account as enabled. Thus, the account status altering facility may be configured to pre-specify an amount. In this embodiment, when the authorising institution interrogates the account status database for additional authorisation (i.e. enabled or disabled) the pre-specified amount may in addition be transmitted to the authorising institution. Thus, the institution may base its final decision, whether or not to authorise a transaction, also on the amount in respect of which authorisation is requested. Typically, a window of tolerance would be allowed to cater for fluctuations due to exchange rates, shipping costs, or the like.

It is to be appreciated that the transaction authorisation system allows an account holder to designate a bank account as enabled or disabled, i.e. to provide authorisation for any transactions performed using the account. Thus, the transaction authorisation system need only manage the account holder interface, the authorisation interface and the account status database, without handling the actual account. However, it is also possible that the account is not merely designated as "enabled" or "disabled" but rather that the account is actually physically rendered "enabled" or "disabled".

The system may include an authentication facility for authenticating the identity or capacity of the bank account holder before permitting the account holder access to the account holder interface. The security authentication facility may be provided by the account holder interface. Instead, the security authentication facility may be provided via a third party authorisation facility.

The account holder interface may be configured to access and interrogate the account status database to obtain a transaction record or statement as well as a status log file of the bank account. The account holder interface may also be configured to allow the account holder to compare the transaction record or statement with the status log file, thereby to facilitate dispute resolution.

The account holder interface may also include a transaction notes input facility, for allowing an account holder to input notes. The notes may be in relation to a transaction or transactions or attempted, failed or cancelled transactions, or the like. Thus, the transactions may be documented. These transaction notes may be recorded as part of the transaction record or statement.

In a preferred embodiment of the invention, the transaction authorisation system includes an account administration server connectable to a communication network and to an account administration database on which details of the bank account are stored. The account holder interface may include a client terminal connectable to the account administration server via the communication network enabling the account holder to access and login to the account administration server to access the bank account details and to enable or disable the bank account or credit card.

The bank account may include an electronic online bank account, such as, for example, an electronic or virtual credit card account, an electronic or virtual debit card account, or the like. The electronic online bank account may be a digital representation of a physical credit card, however, typically, the electronic online bank account or credit card has no physical embodiment, and the details of the bank account are stored on the account administration database and accessible to the account holder via the account administration server. Thus, the invention enables transactions to be carried out using credit card accounts (such as Mastercard™ and Visa™ credit cards) and/or debit accounts (such as Maestro™ and Visa™ electronic debit cards).

The client terminal may be capable of executing a network browser program to access the account administration server.

In one embodiment of the invention, the communication network may be in the form of the Internet. In this embodiment, the account holder interface and, optionally, the authentication facility, are provided on a webpage hosted by the account administration server. In this case, the network browser may be in the form of an Internet Web Browser, enabling the account holder to access and login to the account administration server via the webpage, to access and change the status of the bank account or credit card online.

Typically, the webpage is accessed via a HTTP server with HTTPS enabled supporting JAVA, XML, and may additionally support WAP, GPRS, UMTS or other communications protocols.

The bank account details or credit/debit card details may be presented to the account holder after the bank account has been enabled. For example, a browser window may display the account details, which in the case of a credit card may be a graphical representation of the credit card.

The browser window may include a user interface which enables the account holder to enable and disable the electronic bank account or credit card. Furthermore, the user interface may include other account holder controls.

The webpage or the user interface may provide a link to the account status database, thereby to allow the account holder to access the account status database online, thereby to retrieve, for example, the transaction record or statement and status log file. Typically, the transaction record or statement and status log file are presented to the account holder in the form of an HTML webpage.

In one embodiment of the invention, the bank account may be enabled automatically when the account holder logs into the account administration server and accesses the bank account. Instead, the webpage may provide a separate facility which provides the enabling and disabling of the bank account, at the option of the user.

The account holder interface may allow an account holder to initiate the transmission of the bank account or credit card details to the merchant. The account holder interface may allow an account holder to access and create transaction notes.

Instead or in addition, the client terminal may be in the form of a mobile communication device, such as a mobile telephone, PDA, or the like. Thus, the account holder may access the account administration server and change the status of the electronic bank account or credit card using a voice activated interface, or via, for example, an SMS message. The client terminal may be in the form of a device to communicate via interactive television (iTV).

Typically, the authentication facility requires the account holder to enter a username and password, thereby to login to the account administration server. Alternatively, the authentication facility may require identification via a smart card, digital certificate or via biometric data, for example a fingerprint.

The system may be configured for notifying the account holder of attempted unauthorized transactions initiated while the bank account is designated disabled.

According to another aspect of the invention, there is provided a computer program on a carrier for executing transaction authorisation, the program including a client-server module, executable on a first server and providing an account holder interface having an account status altering facility, for allowing an account holder, operating a client terminal, to submit instructions to the first server to alter a status of a bank account, the bank account having a selectively enabled or disabled status;

an account status altering module for altering the bank account status on the basis of instructions received from the account client-server module; and a first database interface for logging the status of the bank account, on an account status database.

The computer program may include a remote module capable of being executed on a remote server, the remote module providing a second database interface to the account status database, thereby to allow third parties to interrogate the account status database.

According to yet another aspect of the invention, there is provided, broadly, a method of authorising a transaction, the method including selectively designating a bank account status as enabled, on the instruction of an account holder, thereby to authorise transactions performed using the bank account; and recording the enabled status of the bank account in an account status database.

The method may include designating the bank account as disabled, on the instruction of the account holder, thereby to change the enabled status of the bank account to a disabled status; and recording the disabled status of the bank account in the account status database.

More particularly, there is provided a method of authorising a transaction, the method including selectively designating a bank account status as enabled or disabled, on the instruction of an account holder issued from a remote device, thereby to selectively authorise transactions performed using the bank account; and recording the status of the bank account in an account status database.

The method may further include interrogating the account status database during a transaction involving the bank account to determine the status of the bank account and authorising the transaction if the account is designated as enabled.

The method may include authenticating the identity of the bank account holder before permitting the status of the bank account to be changed.

The method may include logging a transaction record or statement of the bank account, the transaction record containing a log of all transactions performed using the bank account. The method may further include logging the status of the bank account in relation to said transactions within a status log file.

The method may include transmitting the bank account details to a merchant during a transaction with the merchant on the instruction of the account holder via the account holder interface.

The transaction record or statement and status log file may be stored in the account status database.

The method may include notifying an account holder of attempted unauthorised transactions initiated while the bank account is disabled.

The invention is now described, by way of example, and with reference to the accompanying diagrammatic drawings.

In the drawings,

FIG. 1 shows a schematic block diagram of a transaction authorisation system, in accordance with the invention;

FIG. 2 shows a flow chart depicting the operation of the transaction authorisation system or method of FIG. 1, also in accordance with the invention;

FIG. 3 shows a detailed flow chart of one embodiment of a security authentication process;

FIG. 4 shows a detailed flow chart of another embodiment of a security authentication process;

FIG. 5 shows a more detailed flow chart of an activation and display process;

FIG. 6 shows a more detailed flow chart of a transaction process;

FIG. 7 shows a more detailed flow chart of an additional authorisation process;

FIG. 8 shows a detailed flow chart of a deactivation/disabling process;

FIG. 9 shows a detailed flow chart of a database query process;

FIG. 10 shows a screen layout of an online merchant transaction interface;

FIG. 11 shows a screen layout of an authorisation interface of the transaction system of FIG. 1;

FIG. 12 shows a screen layout of an online bank account user interface, superimposed over the online merchant transaction interface of FIG. 10;

FIG. 13 shows a screen layout of an alternative embodiment of the interface of FIG. 12;

FIG. 14 shows another view of the online bank/credit card/debit card account user interface of FIG. 12;

FIG. 15 shows a screen layout of an online transaction record or statement;

FIG. 16 shows a further view of the screen layout of FIG. 14;

FIG. 17 shows a screen layout of an authorisation request log file;

FIG. 18 shows a screen layout of a preferences interface;

FIG. 19 shows a layout indicating the various states that an online bank account is able to assume;

FIG. 20 shows a schematic overview of a part of the method in accordance with the invention showing a log-in and log-off procedure;

FIG. 21 shows a screen layout of another authorisation interface of the transaction system;

FIG. 22 shows a more detailed layout of a log-in error management process referred to in FIG. 20 of the drawings;

FIG. 23 shows a more detailed layout of the log-in process shown in FIG. 20 of the drawings;

FIG. 24 shows a more detailed layout of the activation/enabling process;

FIG. 25 shows a more detailed layout of an activation error management process shown in FIG. 24 of the drawings;

FIG. 26 shows a more detailed layout of an activation/enabling time-out management process shown in FIG. 24 of the drawings;

FIG. 27 shows in more detail an automatic deactivation process;

FIG. 28 shows a schematic overview of a "make transaction notes" process in relation the various states of the online account;

FIG. 29 shows the "make transaction notes" process of FIG. 28 in more detail;

FIG. 30 shows a statement retrieval process in relation to the various states of the online account;

FIG. 31 shows the statement retrieval process shown in FIG. 30 in more detail;

FIG. 32 shows a screen layout of a statement retrieval interface;

FIG. 33 shows another screen layout of a statement retrieval interface;

FIG. 34 shows a layout of an authorisation requests retrieval process;

FIG. 35 shows a screen layout of an authorisation requests retrieval interface;

FIG. 36 shows another screen layout of an authorisation requests retrieval interface;

FIG. 37 shows a layout of an activation log retrieval process;

FIG. 38 shows an activation log retrieval interface;

FIG. 39 shows another screen layout of an activation log retrieval interface;

FIG. 40 shows a more detailed layout of the log-off procedure;

FIG. 41 shows another user interface during the log-off procedure;

FIG. 42 shows a layout of a time-out management log-off process;

FIG. 43 shows another layout of the online account activation method;

FIGS. 44 to 54 show various screen layouts of a user interface at various stages of the method; and FIG. 55 shows a schematic layout of the system in accordance with the invention and the manner in which it is linked to conventional card authorisation systems.

Referring to the drawings, reference numeral 20 generally indicates a transaction authorisation system, in accordance with the invention. The transaction authorisation system 20, includes a client terminal, which in this embodiment of the invention, is in the form of a computer 22, running a network browser. The computer 22 is connected to a public network which, in this embodiment of the invention, is in the form of the Internet 24. The transaction system 20, further includes an account administration server 26 which is connected to the Internet 24, and which hosts a web server, which may be accessed by the network browser running on the computer 22. The browser may be in the form of a Web Browser, such as Netscape™ or Microsoft Internet Explorer™. The account administration server 26, is also connected to an account administration database 28, which stores details of electronic online bank accounts, for example, a credit/debit card account, referred to as a private and secure online credit account (PSOCA) in the drawings. It is important to note that the transaction authorisation system 20 may provide an interface to an existing bank account, in which case the account administration server 26 merely provides an interface to an existing bank account managed by a separate institution.

The transaction authorisation system 20 further includes an account status database 30, which stores a record of the status of the electronic online bank account or credit/debit card. The account status database 30, is also connected to the Internet 24, and may be accessed by the account administration server 26 and the computer 22, or other authorised third parties connected to the Internet 24.

The transaction authorisation system 20 is also connected to a community web server or Internet web portal 32, which is in turn connected to a community database 34.

As will be described in more detail below, the system 20 enables an account holder to designate a selected account as enabled or activated until a pre-selected condition has been met, for example a selected time period or duration, prior to conducting a financial transaction. This provides a window period during which a merchant may obtain authorisation for the particular transaction. Once the time duration or window period has lapsed, the selected account is once again designated as deactivated or disabled, and all transactions performed will not be considered to have been authorised by the account holder. The account holder is thus provided with a facility to temporarily enable or activate the selected account thereby to reduce the risk of fraudulent transactions using funds in the selected account.

The overview of the operation of the transaction authorisation system 20, is depicted by way of the flow chart shown in FIG. 2, where block 36 represents an account holder login and authentication process, performed by the account administration server 26 in conjunction with the account administration database 28, and block 38 represents an account holder login and authentication process performed via the Internet web portal 32. Block 40 represents the process by which the account holder accesses and enables or activates the online bank account or credit/debit card. Typically this will also involve displaying the online bank account details to the account holder. Once the online bank account has been accessed and enabled, the enabled status of the online bank account is recorded on the account status database 30. It is also possible for an account holder to access and query the account status database to facilitate dispute resolution, and this process is represented by block 42.

Once the online bank account has been enabled or activated, it is possible for the account holder to deactivate the online bank account, and this process is represented by block 44.

Block 46, represents the process of transmitting account details to a merchant, performed during the execution of a transaction between the account holder and a merchant, and block 48 represents the additional authorisation process performed by an authorisation institution or merchant, in accordance with the transaction authorisation system 20.

As shown in FIG. 3, the authentication process 36 through the account administration server 26 includes the account holder logging onto the Internet 24, from the computer 22, indicated by block 50. The account holder then accesses a website or webpage hosted by the web server of the account administration server 26, and requests the account details of the online bank account, as indicated by block 52. The account administration server 26 then transmits an authentication webpage to the computer 22 of the account holder, requesting a username 136 and password 138, as indicated by block 54. A screen layout of this webpage is shown in FIG. 11. The account holder then provides these details to the account administration server 26, for verification, as indicated by block 56. The account administration server then interrogates the account administration database 28 as is shown in block 58, and the database either authenticates the account holder, or rejects the account holder, as indicated by block 60. If the account holder is authenticated, the operation of the transaction authorisation system 20, continues to process 40, otherwise, it returns to block 54, and once again requests the account holder for a username and password. After a predesignated number of failed login attempts, the account holder may be ejected from the authorisation process 36.

In an alternative embodiment of the invention, the authentication process may take place via a trusted third party, such an established web community, web portal or web site 32. In this case, as shown in FIG. 4, the process 38 involves the account holder logging onto the Internet 24, as indicated by block 62, and in this case requests the account details of the online bank account or server from the web portal 32, indicated by block 64. The web portal 32 then authenticates the account holder, on its community database 34. In this case, the account holder is also a member of this trusted community, and is authenticated via the web portal 32 to this trusted community. The web portal 32, merely handles the authentication of the account holder, and not the actual online bank account or credit card. Once the account holder has been authenticated, the transaction authorisation process 20, similarly continues with process 40.

Once the account holder has been authenticated, the online bank account details are presented to the account holder, as depicted by block 68 in FIG. 5 of the drawings. In the case where the online bank account is in the form of an electronic credit card, the details are displayed online in the form of a graphical representation of the card, as shown in FIGS. 12, 13, 14 and 16. Typically, the online bank account or credit card is also enabled, upon the presentation of the details, and the enabled status of the account is recorded in an account status log file stored on the account status database 30, as indicated at block 70. Typically, the account status database 30 also records the date, time and account details in the status log file. The transaction authorisation system 20 then continues to either process 46, 44 or 42.

The transaction process 46 is described with reference to FIG. 6 of the drawings, in which at block 72, the online bank account details or credit card details are transmitted to a merchant. In the case of an online transaction, the account holder typically initiates a transaction via an online merchant transaction page, as shown, for example, in FIG. 10, on which page the merchant requests details of the account holder. The account holder then punches the bank account details into the merchant page and the merchant then processes the transaction in the usual fashion, which involves requesting authorisation or clearance for the transaction from an authorisation institution or clearing company responsible for the online bank account, as indicated by block 74.

It is also possible for the account holder to submit the bank account details to the merchant page automatically, or via telephone, both of which processes will be explained in further detail below.

The authorisation institution, or clearing company then processes the transaction, as indicated by block 76, which involves the process indicated by blocks 78 through to 82. As indicated at block 78, the authorisation institution authorises the transaction in the conventional fashion, which may involve checking the available funds in the online bank account or credit/debit card, or checking the credit limit of the online bank account. If the transaction is authorised, the authorisation institution optionally requests additional authorisation, in which case process 48 is executed (see FIG. 7), otherwise, the transaction is confirmed, as indicated by block 82. If however, the transaction is not authorised, then the transaction is rejected, as indicated by block 84, and the account holder returns to process 40.

If the authorisation institution requests additional authorisation, in block 80 of FIG. 6, then, as shown in block 86 in FIG. 7, the authorisation institution interrogates the account status database 30, thereby to determine the status of the online bank account or credit card. Based on the outcome of the interrogation, as indicated by decision block 88, if the bank account is enabled or active, as indicated by block 90, the transaction continues at block 82, shown in FIG. 6, and if the bank account is disabled, as indicated by block 92, the transaction continues at block 84, also shown in FIG. 6. Thus, if additional authorisation is requested, the transaction is only confirmed if the online bank account or credit card has been enabled by the account holder, as described above.

After a transaction has been completed, the deactivation process 44 (see FIG. 8), may be executed. The deactivation process 42, begins with the account holder requesting the account administration server 26 to disable or deactivate the online bank account or credit card, as indicated by block 94. This occurs via the webpage of the account administration server 26. The account administration server 26 then closes the graphical display of the details of the online bank account or credit card, as indicated by block 96, and records the disabled status of the bank account in the status log file on the account status database 30, as indicated by block 98. Typically, the date and time of deactivation are also recorded.

FIG. 9 of the drawings describes the process 42, in which the account holder may access and query the account status database 30. At block 100, the account holder requests the status log file from the account status database, from the client terminal, which in this embodiment of the invention, is in the form of the computer 22. This request is routed via the account administration server 26. The account administration server 26, then submits a request for the status log file to the account status database 30, as indicated by block 102, and the account administration server 26 then displays the status log file, as indicated by block 104. Typically, the status log file is displayed graphically in the form of an HTML webpage. It is also possible for an account holder to request a full transaction record or statement, as well as authorisation request log file of the online bank account. These requests are then processed in a similar fashion, and will be described in further detail below, with reference to FIGS. 15 and 17.

It is also envisaged that the transaction authorisation system 20 will be implemented with an existing credit card or bank account system, in which case, a regular credit card or bank account will be authorised using the system 20. In this case, the account may be enabled or disabled using the transaction system 20 as described above, i.e. a client terminal 22 connected to a server may process an account holders request to enable or disable an account via the Internet. However, the transaction system 20 could also be implemented over a telecommunication network, or a wireless communication network. In this case, an account holder may request an account to be enabled via a voice activated interface over a wireless communication network. This request would enable the account, and cause a record of the enabled status to be logged on the account status database 30. Once enabled, the account holder could transact using the account in either the "real world", or the "online world". After completing a desired transaction, the account holder could then disable the account in a similar fashion. The system would also possibly include similar authentication facilities, or alternatively, the account could be enabled or disabled by dialing a pre-specified telephone number, or by sending a username and password via SMS. In addition or instead, digital interactive TV, broadband or the like may be used for the client to interact with the transaction authorisation system 20.

The system 20 as described above, using an online bank account, could be optionally controlled via a mobile communication network. Specifically, WAP enabled mobile telephones could be used as the client terminal, or alternatively, a voice activated interface could also be used to enable or disable the account.

Furthermore, the system 20 is also suitable for use in connection with telephonic transactions, which may be conducted after the account holder has enabled the account, thereby preventing later unauthorised use of the account by a third party who intercepts the account details used during the telephonic transaction.

Referring now to FIG. 12 of the drawings, which shows a screen layout of one embodiment of an online bank account user interface, generally indicated by reference numeral 106, which is superimposed over a merchant transaction page. After the account holder has been authenticated in either process 36 or 38, the details of the online bank account or credit card are displayed to the account holder, typically in the form of an online bank account user interface 106, defined within a supplementary browser window. The online bank account user interface 106, includes a display area 108, which displays the account holders name 110, the account number 112 and the expiry date 114.

Furthermore, the online bank account user interface 106 includes a number of user controls. Firstly, a "deactivate and close" button 116, which disables the online bank account and closes the browser window, in accordance with the steps described above with reference to process 44. The online bank account user interface 106 also includes a "make transaction notes" button 118, which enables the account holder to document each transaction. When button 118 is activated, the online bank account user interface 106 displays a transaction notes template, as shown in FIG. 14, which caters for a number of default input fields 134. These notes are then written to a transaction notes file, also stored on the account status database 30, and may be viewed by activating the "view activation log and notes" button 119. When button 119 is activated, the transaction record or statement of the online bank account is displayed together with the status log file and any added transaction notes, in the form of an HTML webpage, as shown in FIG. 15.

The online bank account user interface 106 further includes a "view authorisation requests" button 120, which enables the account holder to view all authorisation requests, i.e. any interrogation of the account status database 30. These requests are all logged in an authorisation request log file stored on the account status database 30, and may be graphically displayed in the form of an HTML page as shown in FIG. 17. This enables the account holder to view attempted fraudulent transactions using the account, while it was not enabled. It is also possible for the transaction authorisation system 20 to transmit SMS or e-mail warning messages to the account holder in the event of unsuccessful requests for authorisation.

A "view statement" button 122, is also provided, which enables the account holder to view the transaction record or statement (see FIG. 15) independently of the status log file or transaction notes.

Thus, an account holder can view a detailed statement, together with any personal transaction notes, as well as a record of the status of the online bank account or credit card at the time of each transaction. This streamlines the processing of disputes concerning the validity or authenticity of each transaction. The request and subsequent display of the transaction record or statement, together with the status log file and transaction notes is handled in accordance with the steps outlined in the description of process 42 above.

The online bank account user interface 106 is also provided with a "preferences" button 124, which activates the display of a preferences interface, as shown in FIG. 18, and enables the user to specify certain options associated with the online bank account or credit card, such as a default time intervals during which the account should remain enabled or disabled. It is therefore possible for the account holder to pre-specify that the account be automatically disabled after each transaction, or that it be disabled after a predesignated time interval. Furthermore, it is also possible for the account holder to specify specific time intervals during which the account is automatically enabled, which facilitates automatic transactions, such as monthly debit orders through the account.

The account is thus suitable for use as a supplementary account, or "child" or employee account, as it is possible to pre-specify specific times during which the account can be enabled and thus capable of being operated on. For example, the account may be activated for a specific duration or interval at a specific time during which a child or employee may use the account, e.g. to purchase clothing, pay tuition fees or the like.

In the case where the account is used in conjunction with an existing credit/debit card or bank account, these preferences could be specified via a voice activated interface or SMS message.

The online bank account user interface 106 also includes a facility to enable the bank account details to be automatically transferred to the merchant transaction interface. This is accomplished via button 128, which when activated will automatically insert the required details into the merchant transaction interface, such as the account holders name 110, the account number 112, expiry date 114, as well as the actual amount and currency of the transaction, which may be entered in to the field 126. This transaction is then also automatically written to the transaction record or statement on the status account database 30.

The online bank account user interface 106 also includes an authorisation request feedback field 130, which may indicate to the account holder, in real-time, that authorisation has been given for a particular transaction. This is indicated, by changing the colour or format of the field, as shown in FIG. 16. Furthermore, details of the transaction for which authorisation has been given are also displayed in the text area 132.

A further, simplified version of the online bank account user interface 106 is shown in FIG. 13 of the drawings.

In use, before performing a transaction over the Internet or telephonically, using the online bank account or credit/debit card, the account holder accesses the authentication webpage of the account administration server 26, as shown in FIG. 11, and logs into the account administration server 26, as described above, with reference to processes 36 or 38. The account administration server 26, then authenticates the account holder on the account administration database 28, and enables the online bank account or credit card, as described above. The online account details are then presented to the account holder, via the online bank account user interface 106, and the account holder can then perform an online, or any other transaction, by manually inserting the account details, or by automatically transmitting them using the automatic data transfer facility. Alternatively, the account holder may recite the account details over the telephone, in the case of a telephonic transaction.

Once the account has been enabled, its enabled status is recorded in the status log file on the account status database 30. Thus, when the merchant requests authorisation from the authorisation institution, or clearing house, the authorisation institution may in addition to, for example, checking for the necessary funds or credit in the bank account, may also check that the bank account is currently enabled, by interrogating the account status database 30. The authorisation institution may thus, at its discretion, incorporate this additional security check, thereby to reduce the occurrence of unauthorised or fraudulent transactions.

Once the transaction has been authorised and completed, the account holder can then disable the account, by closing the online bank account user interface 106.

It is envisaged that the account may assume several states, as is illustrated generally by reference numeral 210 in FIG. 19 of the drawings, and as is described below.

Prior to issuance and approval of a credit/debit card account by an issuing authority the state of the account is designated "unissued" as is shown by block 211. Once the authority approves a user's account application the online account status is altered to "issued/logged-off" status as is shown by block 212. Once the user is authenticated by successfully logging into the system 20 as is described with reference to FIG. 3 of the drawings, the status is altered to "logged-in" as is shown by block 213. Once logged in two sub-states are possible, namely deactivated/disabled 216 or activated/enabled 217 depending on whether or not the user has disabled or enabled the account in accordance with the method described above. The system 20 is also provided with an "account suspended" 215 and an "account closed" status 214.

Referring to FIG. 20 of the drawings, reference numeral 220 represents the log-in and log-off procedure in more detail. Once the account has been altered to "issued/logged-off" status 212 the user is able to access the user interface 106 (also referred to as the PSOCA console), as is shown schematically by reference numeral 221. Once the log-in process is initiated, as is shown by reference numeral 225, the user is able to retrieve his username or password 136, 138 in the event that the details thereof are forgotten, as is shown by reference numerals 229 and 228. The user is also able to correct an incorrect log-in procedure, as is shown by reference numeral 222, and as is described in more detail below, with reference to FIG. 22 of the drawings.

Referring to FIG. 21 of the drawings, reference numeral 240 shows another authorisation interface of the system 20. The interface 240 is similar to the interface shown in FIG. 11 of the drawings, and includes input fields 242 and 243 for entering the user name and password. The interface also includes provision for forgotten log-in details 241, as is described above with reference to FIG. 20 of the drawings. The interface 240 also provides the account holder with means to bookmark the user interface 240, by activating button 244.

Referring to FIG. 20 of the drawings, once the log-in has been successfully achieved, the status automatically reverts to the "issued/logged-off" status 212 after a pre-set time has elapsed without any activity, as is shown by the log-in time-out block 223, or the user may initiate a log-off as is shown by the log-off block 227.

Referring to FIG. 22 of the drawings, reference numeral 222 shows a flow sheet of the management of an incorrect log-in 222. As is shown by block 222.2 the user re-enters his user name and password and as is shown by block 222.3. The details thereof are re-confirmed by communicating with the account database 30 and the administration server 26. If the log-in is successful, the user is entitled to continue as is shown by block 222.4. A count loop 222.5 sets the number of log-in attempts allowed after which a time delay 222 prevents further intermediate attempts. During this time period, intrusion detection processes and other security mechanisms may be operative.

Referring to FIG. 23 of the drawings, reference numeral 225 shows a flow sheet of the log-in process, illustrated in FIG. 20, in more detail. The system 20 communicates with the account status database 30 and administration server 26 to verify the user name and password as is shown by block 225.1. Once verified, as is shown by block 225.2, the user interface indicates that the status is "deactivated/log-in" 216. Once logged in, the enabling or activation is able to commence as is shown by block 262 and as is described in more detail below with reference to FIG. 24 of the drawings. As is also shown by blocks 290, 300, once logged-in, other conventional bank account features may be accessed. The time-out log-in system 223 (also shown in FIG. 20 of the drawings) is described in more detail below with reference to FIG. 26 of the drawings.

Referring now to FIG. 24 of the drawings, the enabling/activation process 262 is described in more detail with reference to a flowchart.

Once the user has selected the enable/activate function on the user interface 106, as is shown by block 262.1, the system 20, optionally, requests a password as is shown by block 262.2. The password is then checked by interrogating the account database 30 and administration server 26 as is shown schematically by blocks 266.3 and 266.4. If the password is accepted, the card is activated by obtaining the account details from the institution as is shown schematically by blocks 266.5 and 266.6. If the other rules of the financial institution are verified, as is shown by block 266.10, the online account or card is then ready for transacting with the merchant, and the card is in the activated state 217, as is shown by block 266.7. An activation time-out management procedure 264 is also provided, as is described in more detail below. In the event that the rules of the financial institution are not satisfied, an account validity error message 266.8 occurs. The rules may include a pre-set credit or transaction amount limit and, thus, the system may optionally provide that the input transaction amount is entered at the commencement of the activation process, as is shown by block 400. As is shown by block 266.9, if the password verification is unsuccessful, an activation error management procedure 261 is initiated, as is described in more detail below with reference to FIG. 25.

Referring to FIG. 25, a flow sheet of the activation error management procedure 261 is shown in more detail. The process is, in principle, the same as the log-in error management procedure described in FIG. 22 and, accordingly, is not described in detail.

Referring now to FIG. 26 of the drawings, a flowchart of the time-out management procedure 264 (shown in FIG. 24 of the drawings) is described in more detail. The purpose of the time-out management system is to deactivate the account after a pre-selected time has elapsed without any activity. Once a pre-specified time has elapsed, as is shown by blocks 264.1 and 264.2, the user is provided with a re-set or re-enable option 264.3. If the account is not re-enabled or re-set, as is shown by block 264.4, the account is deactivated, as is shown by 264.7. If the card is re-enabled or re-set as is shown by 264.5, the time count begins again until the pre-specified time has elapsed as is shown in block 264.1. A counter loop 264.8 is also provided so that after a pre-specified number of attempts to activate or re-set the account, the user is warned as is shown by block 264.6 and the card is deactivated.

Referring to FIG. 27 of the drawings, reference numeral 280 generally shows a flow sheet of an automatic deactivation process which may take place after an additional authorisation request.

As described above with reference to FIG. 6 of the drawings, the system 20 waits for the additional authorisation request 80 once initial conventional authorisation 78 is given. Blocks 281.9 and 281.1 denote the receipt of the additional authorisation request from an authorising institution, such as a bank, or by others, for example a merchant. The system 20 then interrogates the database 30 to determine the status of the account and responds as is shown sequentially by reference numerals 281.2 to 281.5. As indicated above, optionally, a pre-specified amount may be included in the request, in which case the transaction amount may be queried as is shown by reference numeral 281.10. Additional data may be provided to the authorising institution, for example, time and duration of the previous account activation, or the like. This data may serve to adjust the response data in order to allow for a tolerance, as is shown by reference numeral 281. A similar adjustment tolerance process 282 may be provided in respect of the transaction amount. Block 281.6 shows the automatic deactivation of the account once the account has been authorised. In other words, the system 20 is configured to deactivate the account after one transaction.

Referring now to FIG. 28 of the drawings, reference numeral 290 shows a general overview of the "make transaction notes" process described above with reference to the user interface 106. As is indicated in FIG. 28, the user is able to make transaction notes 291 without altering the state in either the logged-in/deactivated 216 or logged-in/activated state 217. Referring also to FIG. 29 of the drawings, the make transaction notes process 291 is described in more detail. Once the make transaction notes function has been selected, as indicated by block 291.1, the relevant information, is inputted by a user as is shown by block 291.2. The database 30 is interrogated to establish whether or not any notes in respect of the transaction already exist as is indicated by block 291.3. If no notes exist, as is shown by block 291.4, the user is able to add notes as is shown by block 291.7 which are stored on the account status database 30. If existing notes exist, a warning is displayed as is shown by block 291.5 and the option of overwriting the existing notes is provided as is shown by block 291.6

Referring to FIG. 30 of the drawings, reference numeral 300 represents a schematic overview of an information retrieval process 300. The information retrieval process includes retrieving the activation log and notes, the authorisation requests and the statement as is described above with reference to FIG. 12. The "retrieve statement details", "authorisation request retrieval" and "view activation log" options are indicated by reference numerals 301, 302 and 303 in FIG. 30. As is shown in FIG. 30, these information retrieval options may be viewed without altering the logged-in/deactivated status 216 or the logged-in/activated status 217. Referring also to FIG. 31 of the drawings, a flow sheet of the statement retrieval process 301 is shown. Once the view statement option is selected, shown by block 301.1, the user is prompted to input a range of dates applicable as is shown by block 301.2. The range of dates is interrogated for validity as is shown by blocks 301.3 and 301.4. If valid, the statement is displayed as is shown by block 301.5. If not, the user is requested to re-input the range of dates. An example of a user interface presented to the account holder in respect of the date selection is shown by reference numeral 304 in FIG. 32 of the drawings. FIG. 33 shows another example of a screen layout of an online transaction record or statement in a user discernible format in which transaction data 305 is complemented with data from the account status database 306. This allows for a convenient and consistent check for the account holder in respect of a particular transaction.

Referring to FIG. 34 of the drawings, reference numeral 302 shows a flow sheet of the authorisation requests retrieval shown in FIG. 30. Each of the successive stages are identified by reference numeral 302.1 to 302.5 and, in principle, are the same as the steps set out above in FIG. 31 and, accordingly, are not described again in detail. Referring to FIG. 35 of the drawings, reference numeral 304 generally indicates a screen layout of the user interface in order to enter the start and finish dates for an authorisation request. Referring to FIG. 36 of the drawings, reference numeral 304.1 shows a screen layout of a statement presented to a user after an authorisation request 302 has been retrieved.

Referring to FIG. 37 of the drawings, reference numeral 303 shows a flow chart for retrieving an activation log 303. The specific steps are identified by reference numerals 303.1 to 303.5 and are, in principle, the same as the steps described above with reference to FIG. 31 of the drawings and, accordingly, are not described again in detail. Referring to FIG. 38 of the drawings, reference numeral 304 shows a screen layout for entering the start to finish dates when selecting a specific log period. Referring to FIG. 39 of the drawings, reference numeral 304.1 shows a screen layout of a statement after successful completion of the process 303.

Referring to FIG. 40 of the drawings, reference numeral 227 shows a flow sheet of the log-off procedure shown in FIG. 20 of the drawings, in more detail. Once the log-off procedure is selected, as shown in block 227.1, the account status database 30 is interrogated to determine whether or not the account is activated as is shown by block 227.2. If the card is activated, as is shown by block 227.3, a warning to this effect is presented to the user. If the user cancels the log-off request 227.1 as is shown by blocks 227.7 and 227.8 the logged in activated state is retained. If the user continues with the logging off procedure, the card is deactivated as is shown by blocks 228.4, 228.5 and 228.6 and the status of the bank account is altered accordingly.

Referring to FIG. 41 of the drawings, reference numeral 250 generally shows another account holder user interface which is presented to the user during the log-off procedure described above with reference to FIG. 40.

Referring to FIG. 42 of the drawings, reference numeral 223 shows the time-out management log-off process shown in FIG. 20 of the drawings in more detail. As is shown by block 223.1, once a pre-specified time has elapsed in respect of which there has been no activity, the user is warned of this as is shown by block 223.3. The user has an opportunity to reset the system to allow a further time period to elapse as is shown by blocks 223.4 and 223.5. Failing to do this will result in an automatic log-off as is shown by block 223.6.

Referring to FIG. 43 of the drawings, reference numeral 260 generally represents an overview of the activation process which is described above. The flow chart describes the changing of status of the bank account from the logged-in/deactivated status 216 to the logged-in/activated status 217 (via the activation process 262 described above) and back to the logged-in deactivated status 216 (via either the time-out process 264 or the completion of a transaction authorisation 265 described above). The system may also be manually deactivated (not illustrated). The user, as described above, may also deliberately log off from the system as is illustrated schematically by block 227 thereby reverting the status to issued/logged-off 212.

Referring now to FIG. 44 of the drawings, reference numeral 240 shows the user interface described with reference to FIG. 21 of the drawings, displayed in an Internet browser window and superimposed over a merchant payment Internet page, displayed in a separate browser window.

Referring now to FIG. 45 of the drawings, reference numeral 250 shows another user interface in accordance with the invention, similar to the interface shown in FIG. 12 of the drawings. The interface 250 is presented to the account holder after the successful completion of the log-in process described above. Reference numerals 251 to 257 represent the make transaction notes, view activation log and notes, view authorisation requests, view statement, preferences and transfer data automatically functions described above with reference to FIG. 12. The graphical representation of the online credit/debit card is shown by reference numeral 230. The fields identified by reference numeral 259 initiate the activation process and the field identified by reference numeral 258 enables the user to log off from the system, as is described above.

Referring to FIG. 46 of the drawings, reference numeral 249 shows the user interface 250, prior to activation, superimposed over a merchant payment page 249 similar to the example illustrated in FIG. 12 of the drawings. FIG. 47 shows the user interface 250 after logging in to the system. The different graphical representations of the online credit card account 230 in FIGS. 46 and 47 clearly enable the user to distinguish between the logged-in/deactivated state 216 and the logged-in/activated state 217.

Referring to FIG. 48 of the drawings, reference numeral 250.1 represents another user interface similar to the user interface shown in FIGS. 46 and 47. However, instead of, or in addition to, the online account is activated by the account holder for a pre-specified amount. The specified amount is inputted by the user in appropriate fields as is shown schematically by reference numerals 235 and 236 and is stored in the account status database 30. When the bank is interrogating the account status database 30 for additional authorisation, i.e. whether the online account is in the activated state 217 or deactivated state 216, the pre-specified amount 236 may, in addition, be transmitted to the bank. Thus, the bank may base its decision, whether to finally authorise a transaction to a merchant or not, also on the difference between the pre-specified amount 236 and the amount which the merchant is seeking authorisation for. Typically, the bank would allow a window of tolerance to account for minor deviations as a result of, for example, exchange rates or the like.

Referring to FIG. 49 of the drawings, the user interface 250 is shown when the activated card time-out warning, described above, with reference to FIG. 42 of the drawings, is shown. The user may be prompted to continue the session with the online card or account activated by pressing the button 267. Referring to FIG. 50 of the drawings, the user interface 250 is shown when the user has extended the activation in excess of a pre-selected upper limit and in which a message showing that the account has automatically been deactivated is shown as is described above with reference to FIG. 26. Referring to FIG. 51 of the drawings, the user interface 250 is shown when the user has timed out or has extended his activation too many times and a forced deactivation has occurred. As is shown in FIG. 52, the user is prompted to press the button 270 and enter a password 243 to re-activate.

Referring to FIG. 53 of the drawings, reference numeral 250 represents the user interface once the authorisation process has been completed. A message, for example as is shown by reference numeral 237, may be shown to the user. Referring to FIG. 54 of the drawings, reference numeral 250 shows the user interface after the successful completion of the make transaction notes process, described above. A number of data entry fields represented by reference numeral 292, 293, 294 and 295 are provided to enter information in respect of the date, time, amount, currency, merchant details and other miscellaneous notes 296.

Referring to FIG. 55 of the drawings, reference numeral 500 generally shows a schematic overview of the system 20 and method in accordance with the invention. Reference numeral 504 shows a conventional flow sheet of the steps associated with a customer-not-present transaction between a merchant and a user and reference numeral 502 shows the system in accordance with the invention.

Reference numerals 201 to 204 illustrate the process up until a point when a card issuing authority 204 receives an authorisation request for the customer-not-present transaction from a merchant 201 via the card association network 203. Once the authorisation is given (for example, as is identified by reference numeral 78 in FIG. 6 of the drawings) the account status database 30 is interrogated to determine whether or not the card holder has designated as activated via the client terminal 22 before authorising the transaction. Reference numeral 205 shows a schematic representation of the user interface described previously identified by reference numerals 106 and 250 displaying the account status as activated.

The Inventors believe that the invention, as illustrated, provides an enhanced system 20 and method for reducing the unauthorised use of bank account details for online or other transactions in which a physical signature is not required (i.e. "customer-not-present" transactions). The transaction authorisation system 20 includes a computer 22, which enables an account holder to log onto an account administration server 26, and enable an online bank account for a fixed duration, typically the duration during which a particular transaction may be completed. The enabled status of the bank account is then recorded on an account status database 30, which provides authorisation institutions with an additional check when authorising a transaction performed using the online bank account. Furthermore, once an account holder has completed a transaction, the account can be disabled once again either automatically by the system 20 after a preselected time duration, or by means of an active instruction from the account holder. Thus, third parties in possession of illegally acquired account details of the online bank account cannot perform transactions using the account.

The transaction authorisation system 20 may also be used in conjunction with existing bank accounts, thereby providing increased security for regular bank accounts or credit cards, thus similarly preventing the use of the illegally acquired account details to perform transactions in cases where a physical signature is not required and, as described above, the authorisation system 20 may be used with an online facility to enable/activate and/or disable/deactivate a conventional credit and/or debit card facility, or a wireless communication network may be used to enable and disable the account.

However, typically the transaction authorisation system 20 is to be implemented with new bank accounts. In this case the bank account number will indicate to the authorisation institution that the bank account is equipped with the additional security provided by the transaction authorisation system 20.

The Inventors also believe that the online bank account or credit card is particularly advantageous, from a security point of view, as there is typically no physical embodiment of the card, and therefore, the account details cannot readily be acquired, illegally. All communications between the account holder/client and the bank account are encrypted.

The transaction authorisation system 20 also provides for online statements, which record all transactions performed using the online bank account, together with the status of the account during each transaction, which enables an account holder to check whether a transaction has been performed illegally. Thus, the private sphere of the credit card holder is protected, i.e. details around the transaction are not accessible to third parties other than the account holder, the credit card clearing company and the merchant. Furthermore the provision of a transaction notes facility and facilities for the comparison of the status log file and the transaction record enables disputes between merchants and the account holder to be settled more efficiently.

Recent years have seen a strong increase of commerce conducted on the Internet. Payment procedures on the Internet have become an issue. Credit cards are the predominant medium to settle accounts. However, due to the open architecture of the Internet and the absence of clearly identifying signatures in the online world, consumers have developed strong concerns about using their credit card in online purchases. In particular, consumers worry that third parties will reuse their credit card details in online purchases, once their credit card data becomes known to them through data interception, hacking of consumer databases and other means. Thus, even though most of these credit card transactions on the Internet use encrypted data transfer to protect third parties from intercepting the transmitted credit card details, encryption alone does not resolve all security problems around Internet credit card payments, as all of these transactions bear the problem that no physical signature is provided by the cardholder. This has the consequence that the merchant who receives the payment has no clear indication that the payment is actually initiated by the card holder. Merchants are not less concerned. While credit cards are a globally accepted payment standard and therefore particularly suitable to conduct global Internet commerce, merchants lose business because their customers are not willing to provide their credit card details online. Also, in case of disputes, merchants most often lose the payment as they cannot provide the appropriate proof that the cardholder has actually initiated the transaction. In summary, at least the following concerns arise in connection with online credit card payments by customers and merchants. Firstly, credit card details get "intercepted" on the Internet and used for an Internet purchase (in case of non-encrypted transmission of credit card details). Also, credit card details get "intercepted" in the physical world (e.g. restaurant) and used for Internet purchases. Furthermore, credit card details are stored by the merchant's web site, and are vulnerable to employees or hackers who obtain it from there, and use it for an Internet purchase. In addition, family members or close friends ("the kids or their friends") "find" a credit card at home and use it for an Internet purchase. The inventors believe that the system 20 at least offers a solution to the above problems associated with online, or other transactions, in which a physical signature is not required.

In addition, the transaction authorisation system 20 is particularly useful, as it does not require the establishment of an "industry standard". Thus, no new processes or systems need to be implemented by either the account holders or merchants. Instead, the transaction system 20 provides authorisation institutions with an additional authorisation option whereby the status of a bank account can be considered before authorisation is given to the merchant. This additional feature increases the security of the bank account as only an authentic bank account holder can enable or activate the bank account prior to conducting a transaction.

The invention claimed is:

1. A computer-implemented transaction authorisation system which includes
    a server having an account status database having a record of a status of at least one bank account, said status designating the bank account as either enabled or disabled independent of whether the bank account is in good standing;
    an account holder interface connectable to the account status database which provides an account holder with an account status altering facility for allowing the account holder to change the designated status of the bank account.

2. A system as claimed in claim 1, which includes an authorisation interface connectable to the account status database for allowing an authorisation institution or facility to interrogate the account status database thereby to check said status of the bank account.

3. A system as claimed in claim 1 or claim 2, in which the account status altering facility is configured to allow an account holder to specify that the account is to change status once a pre-selected condition has been met.

4. A system as claimed in claim 1, which includes an authentication facility for authenticating the identity or capacity of the bank account holder before permitting the account holder access to the account holder interface.

5. A system as claimed in claim 1, in which the account status altering facility is configured to pre-specify an amount for which the account holder intends to designate the account as enabled.

6. A system as claimed in claim 1, in which the account holder interface is configured to access and interrogate the account status database to obtain a transaction record or statement as well as a status log file of the bank account, and in which the account holder interface is configured to allow the account holder to compare the transaction record or statement with the status log file.

7. A system as claimed in claim 6, in which the transaction record or statement includes a transaction notes input facility for allowing an account holder to input notes.

8. A system as claimed in claim 1, in which the system includes an account administration server connectable to a communication network and to an account administration database on which details of the bank account are stored, and in which the account holder interface includes a client terminal connectable to the account administration server via the communication network enabling the account holder to access and login to the account administration server to access the bank account details and to enable or disable the bank account.

9. A system as claimed in claim 8, in which the client terminal is capable of executing a network browser program to access the account administration server.

10. A system as claimed in claim 9, in which the communication network is the Internet, and in which the account holder interface is provided on a webpage hosted by the account administration server, said network browser being in the form of an Internet Web Browser, enabling the account holder to access and login to the account administration server via the webpage to access and change the status of the bank account.

11. A system as claimed in claim 10, in which the bank account is enabled automatically when the account holder logs into the account administration server and accesses the bank account.

12. A system as claimed in claim 10, in which the webpage includes a separate facility which provides the enabling and disabling of the bank account, at the option of the user.

13. A system as claimed in claim 1, which is configured for notifying the account holder of attempted unauthorized transactions initiated while the bank account is designated disabled.

14. A system as claimed in claim 1, in which the account holder interface allows an account holder to initiate the transmission of the bank account details to a merchant.

15. The system of claim 1, wherein the account status altering facility allows the account holder to change the designated status of the bank account without any interaction with a payee.

16. A computer-implemented system comprising:
    a first server having a client-server module providing an account holder interface having an account status altering facility, for allowing an account holder, operating a client terminal, to submit instructions to the first server to alter a status of a bank account, the bank account having a selectively enabled or disabled status independent of whether the bank account is in good standing;
    an account status altering module for altering the bank account status on the basis of instructions received from the account client-server module; and
    a first database interface for logging the status of the bank account, on an account status database.

17. A system as claimed in claim 16, further comprising a remote module capable of being executed on a remote server, the remote module providing a second database interface to the account status database, thereby to allow third parties to interrogate the account status database.

18. The system as claimed in claim 16, wherein the account status altering module alters the bank account status based on pre-selected condition has been met, the condition including an elapsed period of time.

19. A computer-implemented method of authorising a transaction, the method including
    selectively designating a bank account status as enabled or disabled independent of whether the bank account is in good standing, on an instruction of an account holder issued from a remote device, thereby to selectively authorise transactions performed using the bank account; and
    recording the status of the bank account in an account status database on a server.

20. A method as claimed in claim 19, in which the method includes interrogating the account status database during a transaction involving the bank account to determine the status of the bank account and authorising the transaction if the account is designated as enabled.

21. A method as claimed in claim 19 or claim 20, in which the method includes authenticating an identity of the bank account holder before permitting the status of the bank account to be changed.

22. A method as claimed in claim 19, in which the method includes logging a transaction record or statement of the bank account, containing a log of all transactions performed using the bank account and logging the status of the bank account in relation to said transactions within a status log file.

23. A method as claimed in claim 19, in which the method includes transmitting the bank account details to a merchant during a transaction with the merchant on the instruction of the account holder via the account holder interface.

24. A method as claimed in claim 19, in which the method includes notifying an account holder of attempted unauthorised transactions initiated while the bank account is disabled.

25. The transaction authorisation system as claimed in claim 3, wherein the condition includes an elapsed period of time.

26. The method of authorising a transaction as claimed in claim 19, wherein the instruction includes a pre-selected condition being met, the condition including an elapsed period of time.

* * * * *